(12) United States Patent
Motomura et al.

(10) Patent No.: US 8,131,116 B2
(45) Date of Patent: *Mar. 6, 2012

(54) IMAGE PROCESSING DEVICE, IMAGE PROCESSING METHOD AND IMAGE PROCESSING PROGRAM

(75) Inventors: Hideto Motomura, Nara (JP); Katsuhiro Kanamori, Nara (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 917 days.

This patent is subject to a terminal disclaimer.

(21) Appl. No.: 12/085,698

(22) PCT Filed: Aug. 24, 2007

(86) PCT No.: PCT/JP2007/066476
§ 371 (c)(1),
(2), (4) Date: May 29, 2008

(87) PCT Pub. No.: WO2008/026518
PCT Pub. Date: Mar. 6, 2008

(65) Prior Publication Data
US 2009/0304299 A1    Dec. 10, 2009

(30) Foreign Application Priority Data
Aug. 31, 2006  (JP) .................................. 2006-236132

(51) Int. Cl.
*G06K 9/32* (2006.01)
(52) U.S. Cl. ...................................................... 382/299
(58) Field of Classification Search ........... 382/298–301
See application file for complete search history.

(56) References Cited

U.S. PATENT DOCUMENTS

| 7,203,381 B2 | 4/2007 | Motomura et al. |
| 7,657,122 B2 * | 2/2010 | Tanida et al. .................. 382/299 |
| 7,688,363 B2 * | 3/2010 | Sato et al. .................. 348/240.2 |
| 2005/0152619 A1 | 7/2005 | Motomura et al. |
| 2005/0244081 A1 * | 11/2005 | Zhou et al. .................... 382/299 |
| 2006/0126952 A1 | 6/2006 | Suzuki et al. |
| 2007/0133903 A1 * | 6/2007 | Zomet et al. .................. 382/299 |

FOREIGN PATENT DOCUMENTS

| JP | 2006-174415 A | 6/2006 |
| WO | WO-2005/067294 A1 | 7/2005 |

(Continued)

OTHER PUBLICATIONS

Shinji Araya, "Clear Commentary on 3D Computer Graphics," published by Kyoritsu Shuppan Co., Ltd., Sep. 25, 2003. (p. 144, line 5 from the bottom to p. 145, line 1 from the bottom.) with partial translation.

(Continued)

*Primary Examiner* — Jingge Wu
(74) *Attorney, Agent, or Firm* — Harness, Dickey & Pierce, P.L.C.

(57) ABSTRACT

The resolution of an image of an object is increased. The illumination equation parameters of the object are estimated, and a resolution-increasing process is performed on the estimated illumination equation parameters. Then, the resolution-increased illumination equation parameters are synthesized together to produce a high-resolution image. If there is a pixel for which the estimation precision of the estimated illumination equation parameters does not satisfy a predetermined precision, the illumination equation parameters are estimated again while feeding back the resolution-increased illumination equation parameters.

4 Claims, 39 Drawing Sheets

FOREIGN PATENT DOCUMENTS

WO    WO-2006/033257 A1    3/2006

OTHER PUBLICATIONS

H. Greenspan et al., "Image enhancement by non-linear extrapolation in frequency space", SPIE vol. 2182 Image and Video Processing II (1994).

Makoto Nakashizuka, et al., "Image Resolution Enhancement on Multiscale Gradient Planes," in the Institute of Electronics, Information and Communication Engineers, D-II, vol. J81-D-II, No. 10, pp. 2249-2258, Oct. 1998 with partial translation.

"Image Processing Handbook" edited by Image Processing Handbook Editorial Committee, Shokodo Co., Ltd., Jun. 8, 1987 with partial translation.

Norihito Tanaka and Shoji Tominaga, "A Method for Estimating Refractive Index of Inhomogenous Material from Images," Technical Report of EIECE, The Institute of Electronics, Information and Communication Engineers, PRMU2002-175, (Jan. 2003) with partial translation.

* cited by examiner

FIG.3
(a) Reflection
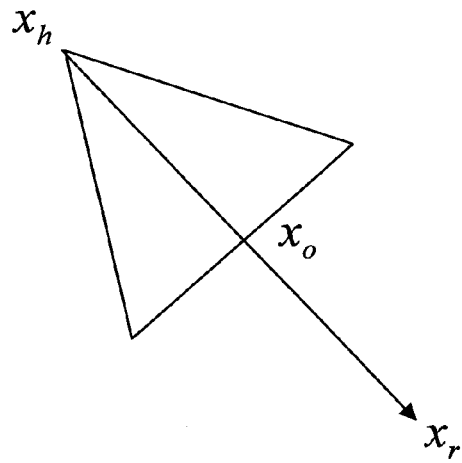
(b) Expansion
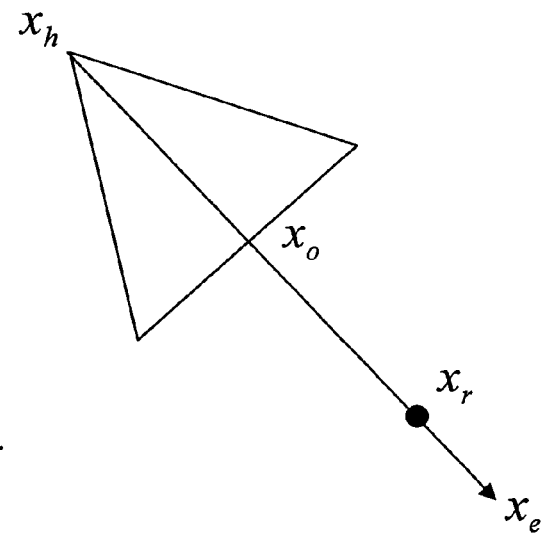
(c) Contraction
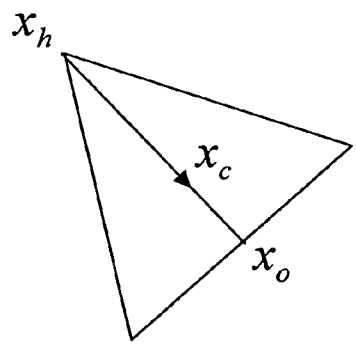

Image feature vector (w1, w2, ... , wp)
P = 3n + 1

FIG.7
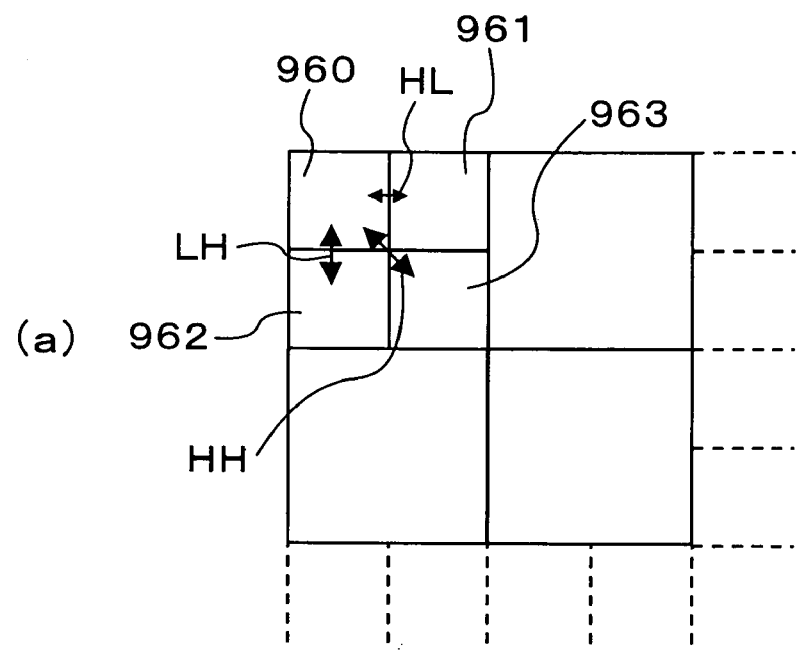
(a)
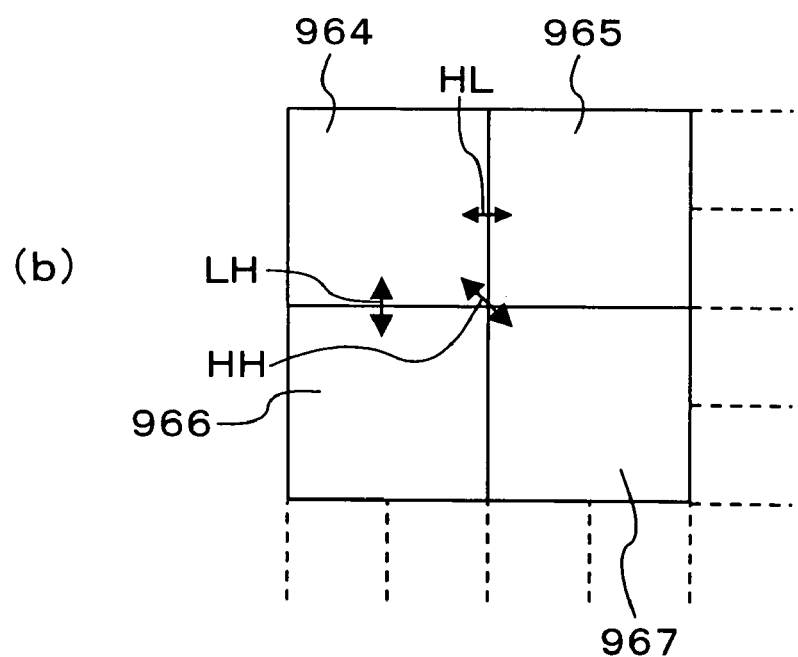
(b)

Parameter output image feature vector number PIOUTFVN

Parameter output image feature vector PIOUTFV

FIG.14
(a)
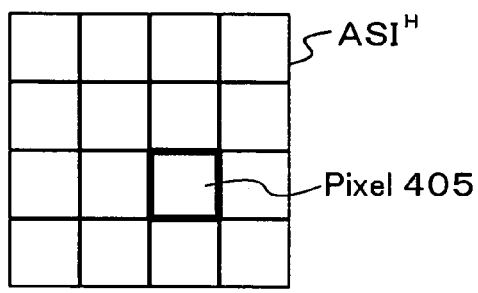
ASI^H
Pixel 405
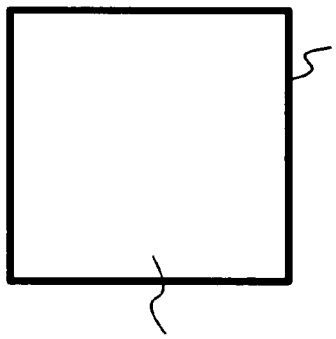
ASI^L
Pixel 406
(b)
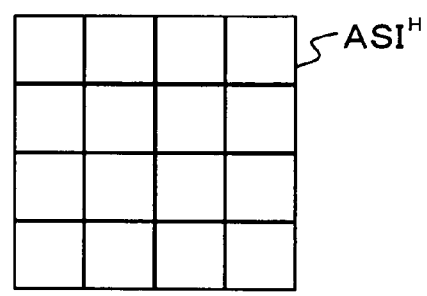
ASI^H
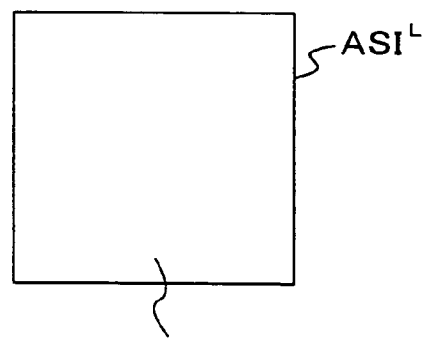
ASI^L
Pixel 406

FIG.21
(a) Where angle DAG is small
(b) Where angle DAG is intermediate
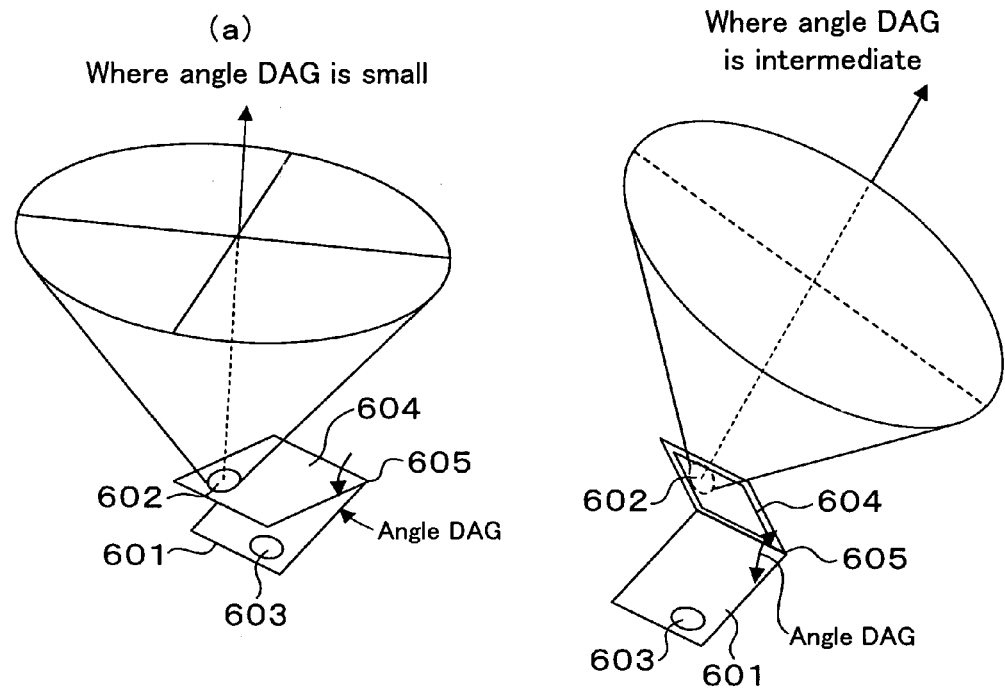
(c) Where angle DAG is large
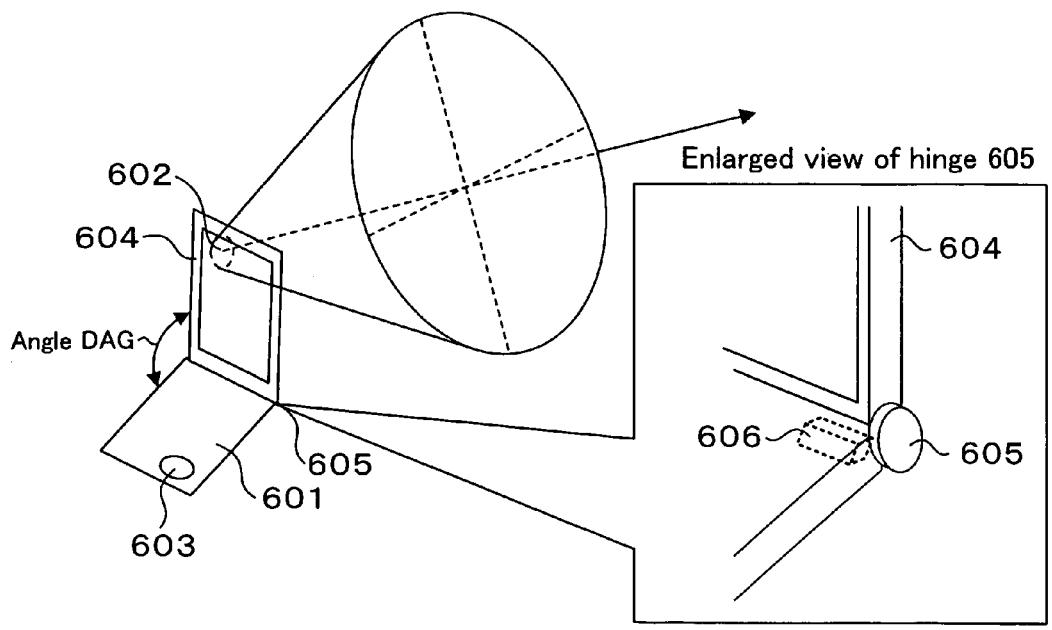
Enlarged view of hinge 605

FIG.30
(a)
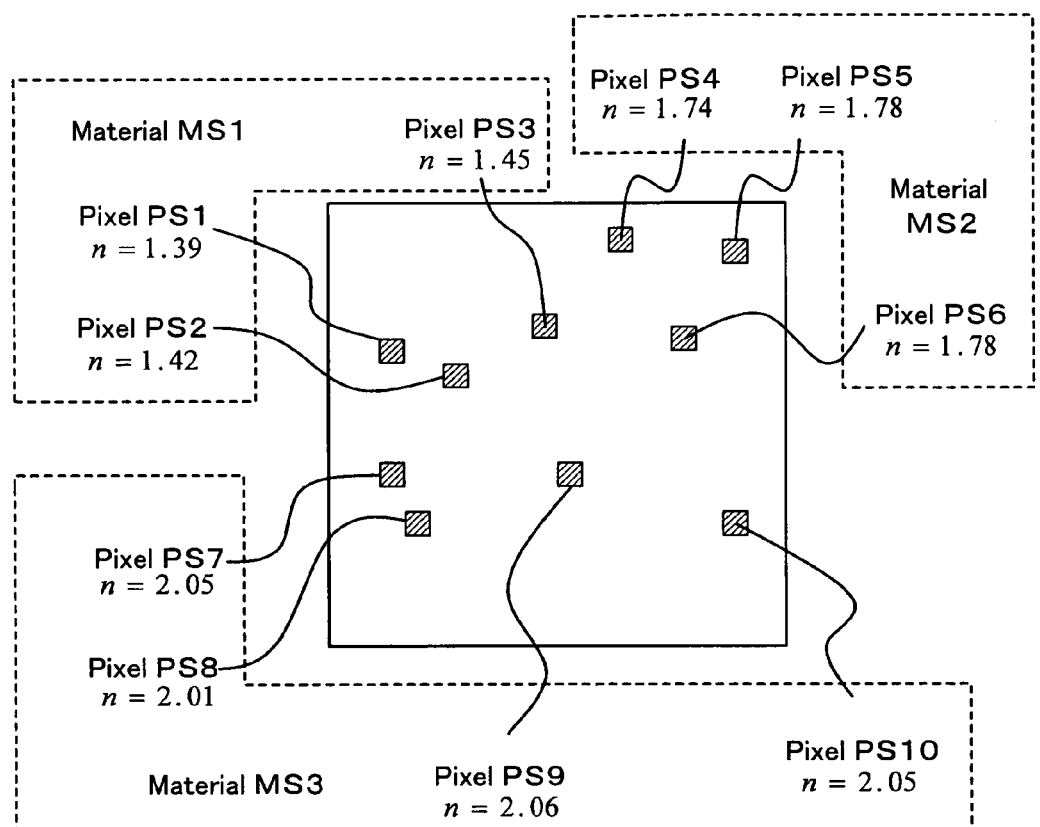
(b)
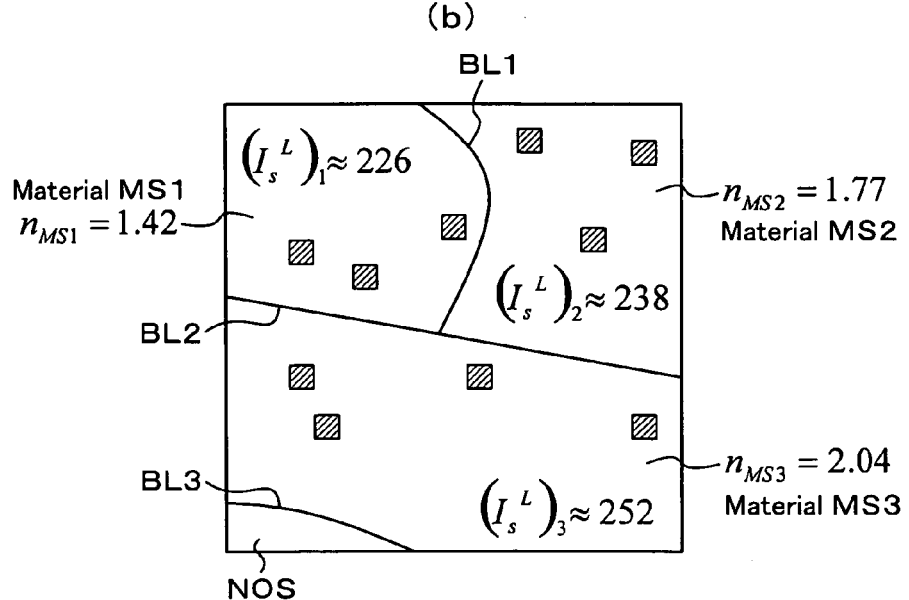

FIG.33
(a)
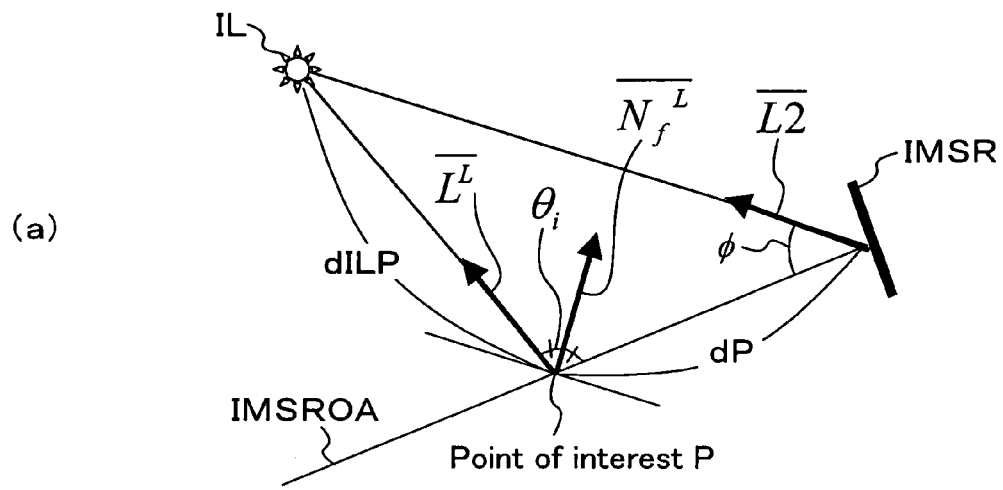
(b)
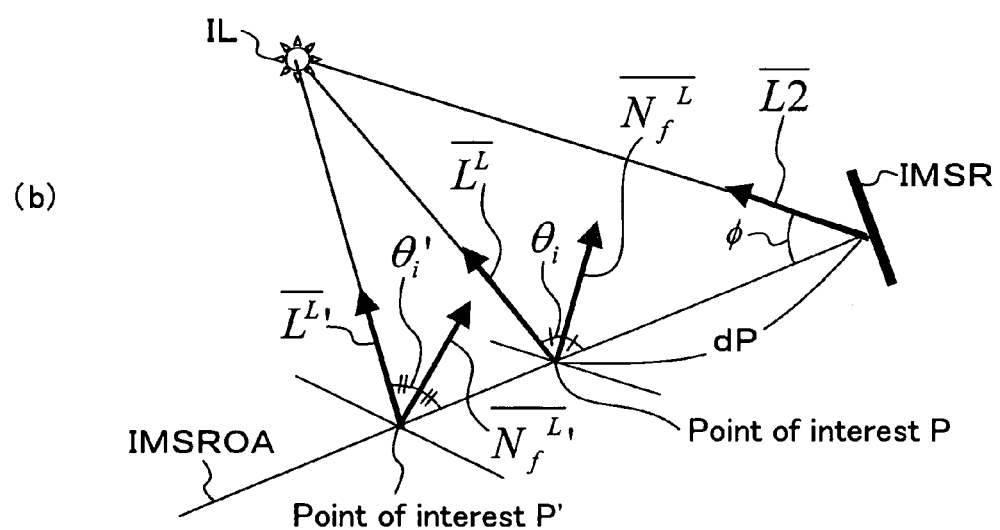

FIG.37
(a)
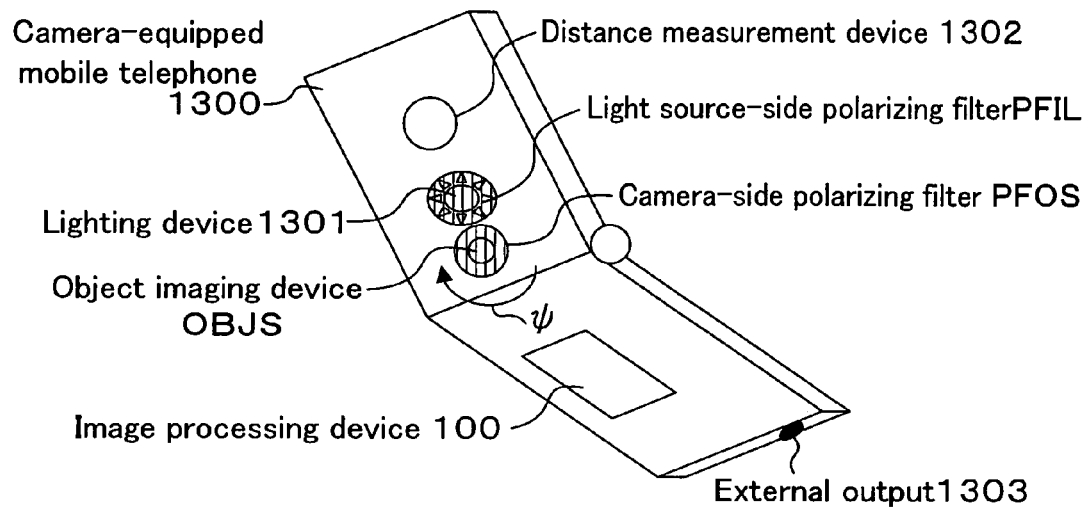
(b)
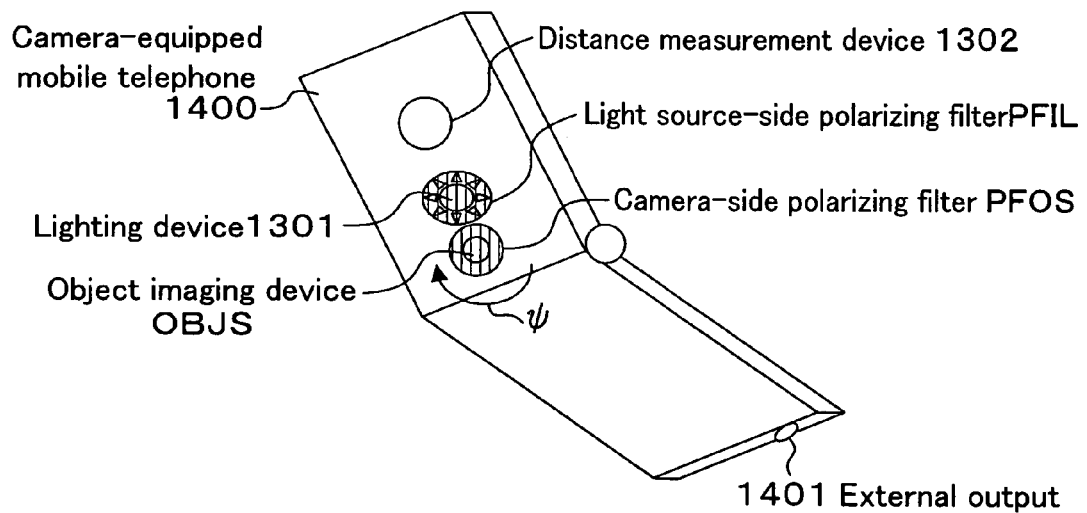

FIG.38
(a)
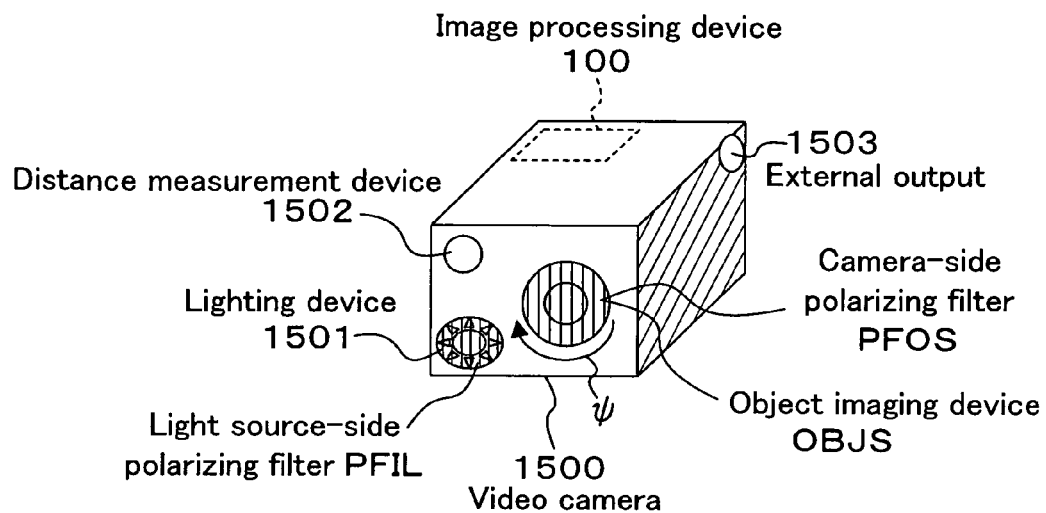
(b)
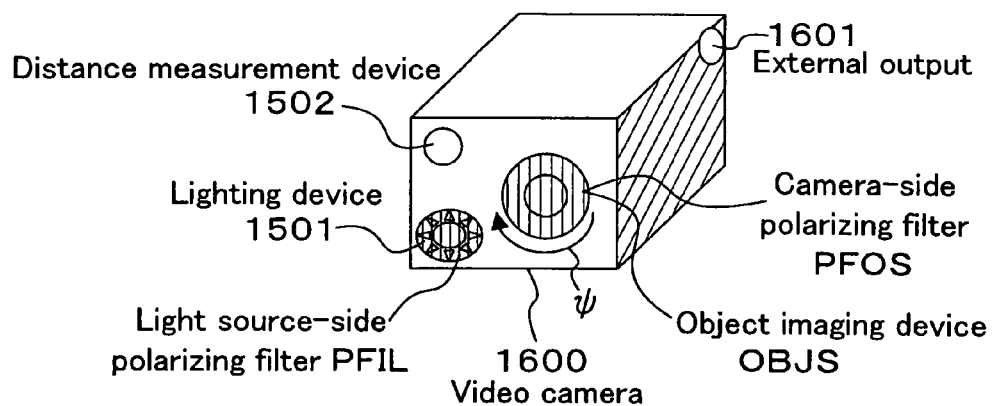

IMAGE PROCESSING DEVICE, IMAGE PROCESSING METHOD AND IMAGE PROCESSING PROGRAM

TECHNICAL FIELD

The present invention relates to image conversion, and more particularly to a technique for realizing an image enlargement while preserving the feel of the texture.

BACKGROUND ART

Through digitization of image devices and networks, it is now possible to connect any image devices to one another, increasing the degree of freedom in exchanging images. There has been prepared an environment where a user can freely handle images without being restricted by differences between systems. For example, a user now can output an image taken by a digital still camera to a printer, have it open to the public on a network, or view it on a household television set.

However, each system now needs to be compatible with various image formats, and there is naturally a need for improvements to image format conversions. For example, image size conversions are done frequently, and there is needed an up-converter (a conversion device for increasing the number of pixels, the number of lines, etc.). For example, printing on A4 paper (297 mm×210 mm) with a resolution of 600 dpi requires an original of 7128 pixels×5040 lines, but the resolution of most digital still cameras is lower than this, thus requiring an up-converter. For an image being open to the public on a network, the ultimate form of output has not been determined, whereby such an image needs to be converted to an appropriate image size each time an output device is determined. For household television sets, digital terrestrial television services have been started, and conventional standard television images and HD (High Definition) television images coexist, whereby image size conversions are used frequently.

Conventional image enlargement processes are based on the difference in luminance value between pixels. That is, for image enlargement, luminance values are interpolated by a bilinear method or a bicubic method in order to newly produce pixel data that were not present at the time of sampling (see, Non-Patent Document 1). With interpolation, it is only possible to produce intermediate values between sampled data, and the sharpness of an edge, or the like, tends to deteriorate. In view of this, techniques have been disclosed in the art in which an interpolated image is used as an initial enlarged image, after which edge portions are extracted and the edges are selectively enhanced (see Non-Patent Document 2 and Non-Patent Document 3). Particularly, Non-Patent Document 3 provides an improvement by incorporating the multiresolution representation and the Lipschitz index, whereby the edge enhancement is done selectively according to the sharpness of the edge.

However, if an image enlarging conversion is performed by using the difference in luminance between pixels, it is difficult to separate between an edge component and noise, and it is likely that an image conversion deteriorates the sharpness of an edge or the texture (the pattern appearing on the surface of an object). Specifically, in image enlargement, the process enhances edge portions of an initial enlarged image, which have been blurred by interpolation, whereby it may also enhance noise along with edge portions, thus deteriorating the image quality. Moreover, the edge enhancement of an interpolated image in an image enlargement is an empirical approach with no explicit countermeasures against noise, and it is therefore not possible to guarantee the image quality after image conversion.

In order to solve the problem set forth above, a technique has been disclosed in the art in which the texture of an input image is analyzed so as to produce a spatially super-resolution image by using the analyzed texture feature quantity and a super-resolution texture feature quantity obtained from a super-resolution image having a higher spatial resolution (see Patent Document 1). The texture feature quantity is produced from the spatial frequency response quantity obtained by a Fourier transformation, a wavelet transformation, or the like, and the texture of the input image is determined based on a feature quantity histogram formed by a combination of the resolution and the material. Then, a super-resolution process is performed on the texture feature quantity by using a texture feature quantity vector conversion table to thereby produce a super-resolution texture feature quantity vector. The super-resolution texture feature quantity vector is converted to a luminance image through an inverse conversion of the conversion process performed on the spatial frequency response for producing the texture feature quantity from an input image, thus obtaining a resolution-increased output image. As described above, the texture feature quantity is subjected to the super-resolution process for each material, thereby enabling an image enlargement without deteriorating the feel of the material texture, thus providing an effect that there is no image quality deterioration.

However, the feature quantity histogram and the texture feature quantity vector conversion table need to be stored as a database. For example, when the condition of the lighting illuminating the object changes, the luminance value of each pixel changes, and thus the texture feature quantity changes. Therefore, it will be necessary to produce, and add to the database, the feature quantity histogram and the texture feature quantity vector conversion table each time as necessary.

In order to solve the problem set forth above, it is effective to decompose the luminance Iv captured by a camera CAM into geometric characteristics and optical characteristics of an object OBJ and a visual environment VE to classify the parameters into resolution-independent parameters and resolution-dependent parameters, as shown in FIG. 39, wherein the feature quantity histogram and the texture feature quantity vector conversion table are produced only for the resolution-dependent parameters. Thus, even if the resolution-independent parameters vary, it is not necessary to add the feature quantity histogram and the texture feature quantity vector conversion table. Consider a case where the luminance Iv captured by the camera CAM is given by an illumination equation of (Expression 1).

[Formula 1]

$$I_v = I_a + I_d + I_s \qquad \text{(Expression 1)}$$
$$= I_a + E_i(k_d \rho_d + k_s \rho_s)$$

Herein, Ia is the luminance of the ambient light, Id is the luminance of the diffuse reflection component, Is is the luminance of the specular reflection component, Ei is the illuminance at the point of interest P, the vector N is the surface normal vector, the vector L is the light source vector representing the direction of the light source IL, ρd is the diffuse reflection component bidirectional reflectance, ρs is the specular reflection component bidirectional reflectance, kd is the diffuse reflection component ratio, and ks is specular reflection component ratio, wherein kd+ks=1. Moreover, the specular reflection component bidirectional reflectance vector ρs is given by (Expression 2), for example, and is decomposed into a plurality of geometric parameters and optical parameters.

[Formula 2]

$$\rho_s = \frac{F_\lambda}{\pi} \frac{DG}{(N \cdot V)(N \cdot L)} \quad \text{(Expression 2)}$$

$$D = \frac{1}{4m^2 \cos^4 \beta} e^{-[(\tan \beta)/m]^2}$$

$$G = \min\left\{1, \frac{2(N \cdot H)(N \cdot V)}{(V \cdot H)}, \frac{2(N \cdot H)(N \cdot L)}{(V \cdot H)}\right\}$$

$$F_\lambda = \frac{1}{2} \frac{(g-c)^2}{(g+c)^2}\left(1 + \frac{[c(g+c)-1]^2}{[c(g-c)+1]^2}\right)$$

$$g^2 = n^2 + c^2 - 1$$

$$c = (L \cdot H)$$

Herein, H is the middle vector between the viewpoint vector V and the lighting vector L, β represents the angle between the middle vector H and the surface normal vector N. Herein, m is a coefficient representing the roughness of the object surface, wherein when m is small, a strong reflection is exhibited in an area where the angle β is small, i.e., in the vicinity of the surface normal vector N, and when m is large, the reflection distribution expands to an area where the angle β is large, i.e., an area distant from the surface normal vector N. G is the geometric attenuation factor, and represents the influence of shading due to irregularities on the substrate surface. Herein, n is the refractive index.

Among all the illumination equation parameters of (Expression 1) and (Expression 2), the light source vector L, the viewpoint vector V and the illuminance Ei of the lighting are those dependent on the visual environment VE, and are constant or vary smoothly across all the pixels, thus being highly dependent of the image resolution. The diffuse reflection component ratio kd, the specular reflection component ratio ks, the object surface roughness m and the refractive index n are those dependent on the material of the object OBJ, and are constant or vary smoothly across all the pixels within the same material, thus being highly independent of the image resolution. The surface normal vector N and the diffuse reflection component bidirectional reflectance pd are not bound by the visual environment VE and the material of the object OBJ, and may take various parameter values for each pixel, thus being highly dependent on the image resolution.

Thus, super-resolution processes performed on different parameter images are classified into three as shown in FIG. 40. First, since the light source vector L, the viewpoint vector V and the illuminance Ei of the lighting are constant or vary smoothly across all the pixels and are highly independent of the image resolution, the low-resolution parameter images $L^L$, $V^L$ and $(Ei)^L$ can be converted to the high-resolution parameter images $L^H$, $V^H$ and $(Ei)^H$ by copying the pixel values of the low-resolution images or interpolating the pixel values from adjacent pixels. Second, since the diffuse reflection component ratio kd, the specular reflection component ratio ks, the object surface roughness m and the refractive index n are constant or vary smoothly across all the pixels within the same material and are highly independent of the image resolution, the low-resolution parameter images $ks^L$, $m^L$ and $n^L$ can be converted to the high-resolution parameter images $ks^H$, $m^H$ and $n^H$ by determining the material through texture analysis sections TA1 to TA3 and copying the pixel values of the low-resolution images or interpolating the pixel values from adjacent pixels for each material. Third, since the surface normal vector N and the diffuse reflection component bidirectional reflectance ρd are highly dependent on the image resolution, the super-resolution process is performed by texture feature quantity vector conversion through texture super-resolution sections TSR1 and TSR2. Therefore, the resolution and the material of the low-resolution parameter images $N^L$ and $\rho d^L$ are determined based on a feature quantity histogram through texture analysis sections TA4 and TA5, and the texture feature quantity vector conversion is performed by the texture super-resolution section TSR1 and TSR2 to obtain the high-resolution parameter images $N^H$ and $\rho d^H$.

As described above, the texture feature quantity is subjected to the super-resolution process for each material, thereby enabling an image enlargement without deteriorating the feel of the material texture, thus providing an effect that there is no image quality deterioration.

Non-Patent Document 1: Shinji Araya, "Meikai 3-Jigen Computer Graphics (3D Computer Graphics Elucidated)", Kyoritsu Shuppan Co., Ltd., pp. 144-145, Sep. 25, 2003

Non-Patent Document 2: H. Greenspan, C. H. Anderson, "Image enhancement by non-linear extrapolation in frequency space", SPIE Vol. 2182, Image and Video Processing II, 1994

Non-Patent Document 3: Makoto Nakashizuka, et al., "Image Resolution Enhancement On Multiscale Gradient Planes", Journal of the Institute of Electronics, Information and Communication Engineers D-II Vol. J81-D-II, No. 10, pp. 2249-2258, October 1998

Non-Patent Document 4: Image Processing Handbook Editing Committee ed., "Image Processing Handbook", Shokodo Co., Ltd., pp. 393, Jun. 8, 1987

Non-Patent Document 5: Norihiro Tanaka, Shoji Tominaga, "A Method For Estimating Refractive Index Of inhomogeneous Material from Images", Technical Report of the Institute of Electronics, Information and Communication Engineers, PRMU2002-175, pp. 37-42 January 2003

Patent Document 1: International Publication WO2005/067294 (FIG. 11)

DISCLOSURE OF THE INVENTION

Problems To Be Solved By The Invention

With conventional techniques, however, it is in some cases impossible to measure or estimate illumination equation parameters of a low-resolution image to be enlarged. For example, the surface normal vector N can be measured by a range finder, or the like, based on the principle of triangulation (see, for example, Non-Patent Document 4). The principle of triangulation is based on the fact that a triangle is uniquely defined by one side thereof and the angles of two corners at the opposite ends of the side. As shown in FIG. 41, where the point P is seen from two points A and B, spaced apart from each other by a known distance of 1, at angles α and β, respectively, the coordinates (x, y) of the point P are given as follows.

[Formula 3]

$$\begin{cases} x = \dfrac{l\tan\beta}{\tan\alpha + \tan\alpha'} \\ y = \dfrac{l\tan\alpha\tan\beta}{\tan\alpha + \tan\alpha'} \end{cases} \quad \text{(Expression 3)}$$

A range finder includes a laser light source placed at the point A to irradiate the point P on the object surface with laser light, and the laser light from the point P is captured by a camera at the point B to thereby measure the coordinate values (x, y) of the point P. Thus, it is a prerequisite that the reflected laser light from the point P reaches the camera at the point B. However, if the reflectance at the point P is low (i.e., the point is on a black object), the intensity of the reflected laser light is low and the point P cannot be captured by the camera. In a case where most of the optical characteristics of the point P are specular reflection components, the laser light reflection at the point P is a regular reflection (arrow SR in FIG. 41) and cannot be captured by the camera at the point B. While a range finder is an example of a method for measuring the surface normal vector N, the measurement may be impossible with any method, and there is an increasing possibility that some illumination equation parameters cannot be measured taking into consideration parameters other than the surface normal vector.

Moreover, it is practically difficult to directly measure some of the illumination equation parameters. For example, while the reflectance can be measured as a ratio with respect to the intensity of the reflected light from a perfect reflector, it is very difficult in practice to always have a perfect reflector installed at the point of interest P. Therefore, a model of (Expression 2) is assumed, for example, and model parameters are estimated, thereby obtaining the specular reflection component bidirectional reflectance ρs. For example, Non-Patent Document 5 discloses a method for estimating the refractive index n from images measured by a calibrated CCD camera. Since an analytic approach is used, the total optimum is attained, but a problem remains with the suboptimum, and there may remain some pixels for which the parameter estimation precision is not within the acceptable margin of error, thus causing errors in the illumination equation parameters of the low-resolution image. Moreover, the total optimum by an analytic approach is attainable only when a certain amount of additional information is obtained. For example, the refractive index n cannot be estimated unless the additional information defined in Non-Patent Document 5 as a prerequisite is available.

Moreover, as a matter of implementation, it may not be possible to use the measurement equipment under an ideal condition due to limitations on the size or weight, the power consumption, the cost, etc., of the equipment, whereby parameters of the low-resolution image cannot be measured. In addition, the amount of additional information obtained from the measurement may be insufficient, whereby the parameter estimation precision deteriorates or the estimation process itself may fail.

In view of the problems set forth above, an object of the present invention is to realize an image enlargement using illumination equation parameters, wherein the image enlargement can be realized with a desirable precision even where parameters cannot be measured or the parameter estimation precision deteriorates.

Means For Solving The Problems

The present invention realizes an image enlargement for increasing the resolution of an image of an object, in which a specular reflection image and a diffuse reflection image are separated from a plurality of object images captured via a polarizing filter while illuminating the object with a light source via the polarizing filter therebetween, and illumination equation parameters are estimated by using the obtained specular reflection image and diffuse reflection image. When estimating the illumination equation parameters, an error evaluation function is compared with a threshold to determine the estimation precision. Specifically, if the error evaluation function exhibits a value lower than the threshold, it is assumed that the estimation precision satisfies a predetermined criterion and the pixel of interest is determined to be a "qualified pixel". If the error evaluation function exhibits a value higher than the threshold, it is assumed that the estimation precision does not satisfy a predetermined criterion and the pixel of interest is determined to be an "unqualified pixel". For a qualified pixel, a resolution-increasing process is performed on a group of low-resolution parameters including the estimated illumination equation parameters, thus obtaining a group of high-resolution parameters. In this process, a database-based super-resolution process is performed on the surface normal vector and the diffuse reflection component bidirectional reflectance among the group of low-resolution parameters. Based on such a physical fact that material-dependent illumination equation parameters, such as the refractive index, have the same value within the same material, the super-resolution process for such parameters is performed by spatially copying pixels of the low-resolution illumination equation parameter image. As a result, the estimation precision of some parameters of a pixel, of which the estimation precision was unqualified in the low-resolution image, may now satisfy the criterion in the high-resolution image. If there is no unqualified pixel in the image as a result of such a super-resolution process, the group of high-resolution parameters are synthesized together into a luminance image to thereby produce a high-resolution image. If there is an unqualified pixel in the image as a result of the super-resolution process as described above, the process again estimates the illumination equation parameters of the unqualified pixel by using the group of high-resolution parameters of the qualified pixels. If an unqualified pixel still remains in the image after this estimation process, the group of high-resolution parameters are subjected to a resolution-decreasing process, and the obtained group of low-resolution parameters are fed back, as a qualified pixel, to the process of estimating the illumination equation parameters of the low-resolution image. This process is repeated until all the pixels in the image become qualified pixels.

Thus, the present invention improves the estimation precision of the low-resolution parameters by using high-resolution parameters obtained by subjecting the low-resolution parameters to a super-resolution process.

For material-dependent illumination equation parameters, the super-resolution process is realized by copying values of illumination equation parameters between pixels existing within the same material. Therefore, for unqualified pixels existing within the same material, the estimation precision improves by copying from qualified pixels.

The database-based super-resolution process realizes a super-resolution process by giving resolution-increasing additional information to the low-resolution parameters. Herein, the information added for increasing the resolution is new additional information that cannot be obtained when estimating the low-resolution parameters. Therefore, it is likely that unqualified pixels that could not be estimated with low-resolution parameters can be estimated if the estimation is performed with high-resolution parameters with new additional information added thereto.

Thus, by estimating unqualified pixels in the high-resolution parameters and by decreasing the resolution of the estimation results, it is possible to increase the number of qualified pixels in the low-resolution parameters. An increase in the number of qualified pixels means an improvement to the possibility of estimating unqualified pixels. Therefore, if the parameter estimating process is repeated by using newly calculated qualified pixels, unqualified pixels in the low-resolution parameters can be estimated one after another. By repeating the process above until high-resolution parameters are calculated for all the pixels, it is possible to realize an image enlargement even if the measurement of the original low-resolution parameters is incomplete.

EFFECTS OF THE INVENTION

According to the present invention, even if the measurement of geometric and optical parameters of the object and the visual environment is incomplete, the incompleteness of the parameter measurement can be compensated for by using, in the parameter estimating process, additional information for increasing the resolution, which is obtained in the database-based super-resolution process. Therefore, it is possible to widen the applicability of an image enlargement process using an illumination equation with a high texture reproducibility in terms of the applicable environments, device configurations, etc.

BRIEF DESCRIPTION OF THE DRAWINGS

FIG. 3 is a diagram illustrating a simplex updating process in two dimensions.

FIG. 7 is a diagram illustrating a wavelet transformation.

FIG. 14 is a diagram illustrating a process of decreasing a resolution of a qualification indicating image.

FIG. 21 is a diagram showing a configuration of a folding-type mobile telephone capable of changing the direction of the camera.

FIG. 30 is a diagram illustrating an operation of an LR illumination equation parameter estimating section.

FIG. 33 is a diagram illustrating a method for estimating a light source position by a light source position estimating section.

FIG. 37 is a diagram illustrating an example of a configuration for performing an image conversion of the present invention by using a camera-equipped mobile telephone.

FIG. 38 is a diagram illustrating an example of a configuration for performing an image conversion of the present invention by using a video camera.

Figure 1:
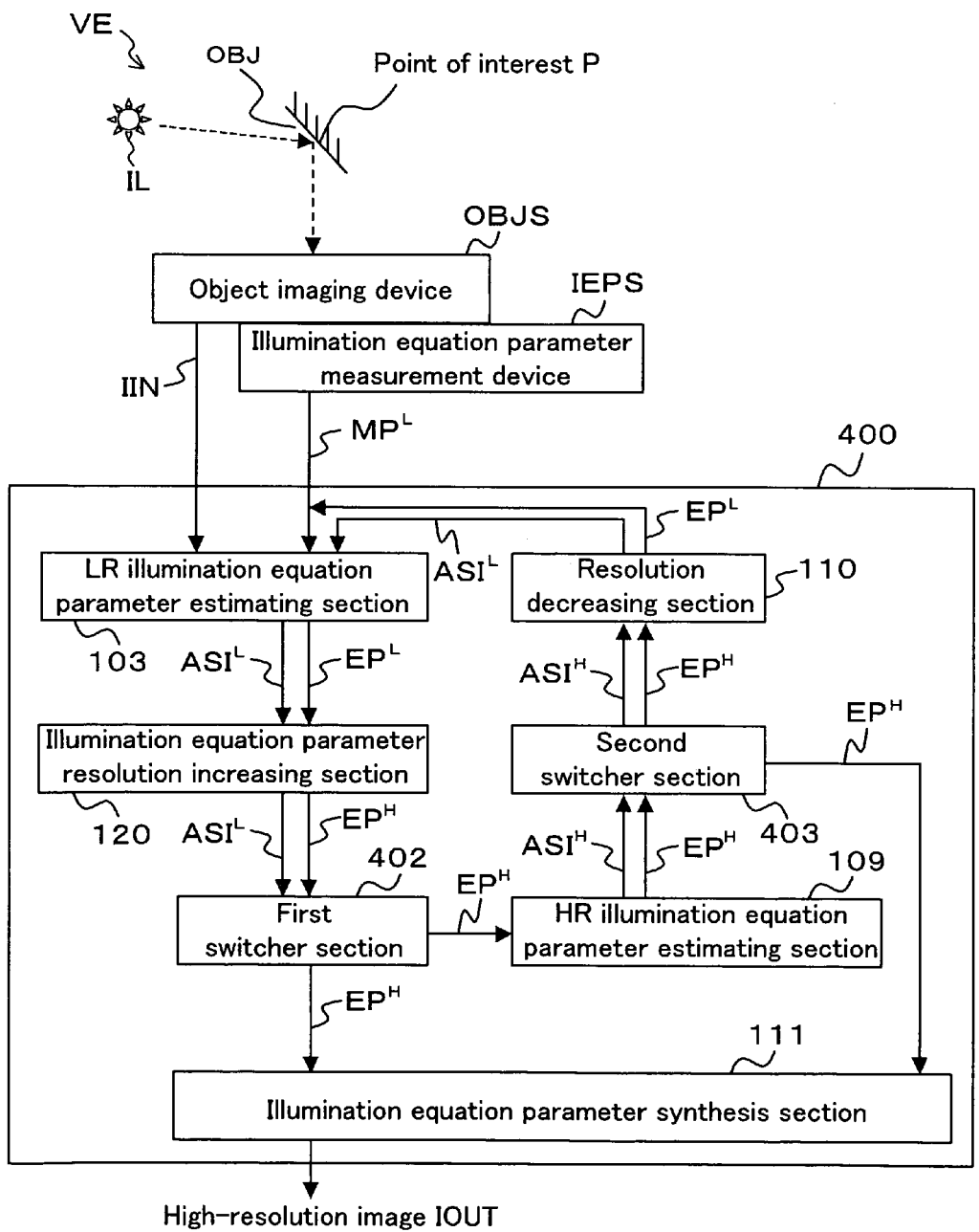
FIG. 1 is a block diagram showing a configuration of an image processing device according to Embodiment 1 of the present invention.

DESCRIPTION OF REFERENCE NUMERALS 100, 200, 300, 400 Image processing device
101 Light source direction calculating section
102 Specular reflection/diffuse reflection separating section
103, 203, 302 Low-resolution illumination equation parameter estimating section
109 High-resolution illumination equation parameter estimating section
110 Resolution decreasing section
111 Illumination equation parameter synthesis section
120 Illumination equation parameter resolution increasing section
201 Shape estimating section
33 Parameter input image feature vector database section
34 Parameter image feature vector number substitution table
35 Parameter output image feature vector database section
OBJ Object
IL Light source
PFIL Light source-side polarizing filter
PFOS Camera-side polarizing filter
OBJS Object imaging device
ILS Light source imaging device
IIN Object image
IIL Light source image
Is Specular reflection image
Id Diffuse reflection image
N Surface normal vector
ρd Diffuse reflection component bidirectional reflectance
L Light source vector
IOUT High-resolution image

BEST MODE FOR CARRYING OUT THE INVENTION

A first aspect of the present invention is directed to an image processing method for increasing a resolution of an image of an object, including: a first step of estimating illumination equation parameters of the object; a second step of performing a resolution-increasing process on the estimated illumination equation parameters; and a third step of synthesizing together the resolution-increased illumination equation parameters to produce a high-resolution image, wherein if there exists a pixel for which an estimation precision of the illumination equation parameters estimated in the first step does not satisfy a predetermined precision, the illumination equation parameters are estimated again while feeding back the resolution-increased illumination equation parameters in the second step.

A second aspect of the present invention is directed to an image processing device for increasing a resolution of an image of an object, including: a low-resolution illumination equation parameter estimating section for estimating illumination equation parameters of the object and determining an estimation precision thereof to distinguish between a qualified pixel that satisfies a predetermined precision and an unqualified pixel that does not satisfy the predetermined precision; an illumination equation parameter resolution increasing section for performing a resolution-increasing process on the illumination equation parameters estimated by the low-resolution illumination equation parameter estimating section; a high-resolution illumination equation parameter estimating section for estimating a resolution-increased illumination equation parameter of the unqualified pixel by using a resolution-increased illumination equation parameter of the qualified pixel output from the illumination equation parameter resolution increasing section; and a resolution decreasing section for, if there exists an unqualified pixel in an output of the high-resolution illumination equation parameter estimating section, decreasing a resolution of the resolution-increased illumination equation parameter of the qualified pixel and the output of the high-resolution illumination equation parameter estimating section and feeding the decreased parameters back to the low-resolution illumination equation parameter estimating section.

A third aspect of the present invention is directed to an image processing device for increasing a resolution of an image of an object, receiving a plurality of object images obtained by imaging the object via a polarizing filter while illuminating the object by a light source via a polarizing filter, and including: a specular reflection/diffuse reflection separating section for separating a specular reflection image and a diffuse reflection image from the plurality of object images; a low-resolution illumination equation parameter estimating section for estimating illumination equation parameters by using the specular reflection image and the diffuse reflection image obtained by the specular reflection/diffuse reflection separating section and determining an estimation precision thereof to distinguish between a qualified pixel that satisfies a predetermined precision and an unqualified pixel that does not satisfy the predetermined precision; an illumination equation parameter resolution increasing section for performing a resolution-increasing process on a group of low-resolution parameters including the illumination equation parameters estimated by the low-resolution illumination equation parameter estimating section to obtain a group of high-resolution parameters, wherein the illumination equation parameter resolution increasing section performs a database-based super-resolution process on a surface normal vector and a diffuse reflection component bidirectional reflectance of the object among the group of low-resolution parameters; an illumination equation parameter synthesis section for, if an unqualified pixel does not exist in the group of high-resolution parameters obtained by the illumination equation parameter resolution increasing section, synthesizing together the group of high-resolution parameters into a luminance image and outputting the luminance image as a high-resolution image; a high-resolution illumination equation parameter estimating section for, if an unqualified pixel exists in the group of high-resolution parameters obtained by the illumination equation parameter resolution increasing section, estimating the unqualified pixel in the group of high-resolution parameters; and a resolution decreasing section for, if an unqualified pixel still exists in the group of high-resolution parameters output from the high-resolution illumination equation parameter estimating section, performing a resolution-decreasing process on the group of high-resolution parameters, and giving the obtained group of low-resolution parameters as qualified pixels to the low-resolution illumination equation parameter estimating section.

A fourth aspect of the present invention is directed to the image processing device of the third aspect, including a light source direction calculating section for receiving a light source image obtained by imaging the light source with a light source imaging device, and calculating a light source vector from the light source image, wherein the light source vector calculated by the light source direction calculating section is given to the low-resolution illumination equation parameter estimating section.

A fifth aspect of the present invention is directed to the image processing device of the fourth aspect, including a shape estimating section for estimating a surface normal vector of the object from the plurality of object images and the light source image, wherein the surface normal vector estimated by the shape estimating section is given to the low-resolution illumination equation parameter estimating section.

A sixth aspect of the present invention is directed to the image processing device of the third aspect, wherein for the database-based super-resolution process, the illumination equation parameter resolution increasing section includes: a database storing a low-resolution image feature vector and a high-resolution image feature vector obtained by performing a spatial frequency analysis on a low-resolution parameter image and a high-resolution parameter image, respectively; and a table describing a correspondence between the low-resolution image feature vector and the high-resolution image feature vector.

A seventh aspect of the present invention is directed to the image processing device of the sixth aspect, wherein the spatial frequency analysis is performed by using a wavelet transformation.

An eighth aspect of the present invention is directed to the image processing device of the sixth aspect, wherein the resolution decreasing section performs the resolution-decreasing process by using the database and the table provided in the illumination equation parameter resolution increasing section.

A ninth aspect of the present invention is directed to the image processing device of the third aspect, wherein the low-resolution illumination equation parameter estimating section and the high-resolution illumination equation parameter estimating section perform an estimation process by using a simplex method.

A tenth aspect of the present invention is directed to an image processing method for increasing a resolution of an image of an object, including: a first step of separating a specular reflection image and a diffuse reflection image from a plurality of object images obtained by imaging the object via a polarizing filter while illuminating the object by a light source via a polarizing filter; a second step of estimating illumination equation parameters by using the specular reflection image and the diffuse reflection image obtained in the first step; a third step of performing a resolution-increasing process on a group of low-resolution parameters including the illumination equation parameters estimated in the second step to obtain a group of high-resolution parameters, and performing a database-based super-resolution process on a surface normal vector and a diffuse reflection component bidirectional reflectance of the object among the group of low-resolution parameters; a fourth step of, if an unqualified pixel does not exist in the group of high-resolution parameters obtained in the third step, synthesizing together the group of high-resolution parameters into a luminance image and outputting the luminance image as a high-resolution image; a fifth step of, if an unqualified pixel exists in the group of high-resolution parameters obtained in the third step, estimating the unqualified pixel in the group of high-resolution parameters; and a sixth step of, if an unqualified pixel still exists in the group of high-resolution parameters obtained in the fifth step, performing a resolution-decreasing process on the group of high-resolution parameters and performing the second step again by using the obtained group of low-resolution parameters as qualified pixels.

An eleventh aspect of the present invention is directed to an image processing program for instructing a computer to perform an image processing method for increasing a resolution of an image of an object, the program instructing the computer to perform: a first step of separating a specular reflection image and a diffuse reflection image from a plurality of object images obtained by imaging the object via a polarizing filter while illuminating the object by a light source via a polarizing filter; a second step of estimating illumination equation parameters by using the specular reflection image and the diffuse reflection image obtained in the first step; a third step of performing a resolution-increasing process on a group of low-resolution parameters including the illumination equation parameters estimated in the second step to obtain a group of high-resolution parameters, and performing a database-based super-resolution process on a surface normal vector and a diffuse reflection component bidirectional reflectance of the object among the group of low-resolution parameters; a fourth step of, if an unqualified pixel does not exist in the group of high-resolution parameters obtained in the third step, synthesizing together the group of high-resolution parameters into a luminance image and outputting the luminance image as a high-resolution image; a fifth step of, if an unqualified pixel exists in the group of high-resolution parameters obtained in the third step, estimating the unqualified pixel in the group of high-resolution parameters; and a sixth step of, if an unqualified pixel still exists in the group of high-resolution parameters obtained in the fifth step, performing a resolution-decreasing process on the group of high-resolution parameters and performing the second step again by using the obtained group of low-resolution parameters as qualified pixels.

Embodiments of the present invention will now be described in detail with reference to the drawings.

(Embodiment 1)

In the present embodiment, an illumination equation parameter measurement device measures some of the illumination equation parameters of the object, and an object imaging device images the reflected light from the object. Then, based on the measured information, the image processing device outputs an image of a higher resolution than that of an object imaging sensor.

FIG. 1 is a block diagram showing a configuration of an image processing device according to Embodiment 1 of the present invention. An image processing device 400 is a device for enlarging an object image IIN of an object imaging device OBJS, and includes a low-resolution (LR) illumination equation parameter estimating section 103, an illumination equation parameter resolution increasing section 120, a first switcher section 402, a high-resolution (HR) illumination equation parameter estimating section 109, a second switcher section 403, a resolution decreasing section 110, and an illumination equation parameter synthesis section 111.

Signals input to or output from different process sections that are accompanied by a superscript "L" are those of a low resolution, which coincides with the resolution of the object imaging device OBJS. Signals accompanied by a superscript "H" are those of a high resolution, meaning that they have a higher resolution than the object imaging device OBJS as a result of the resolution-increasing process to be described below.

An illumination equation parameter measurement device IEPS measures illumination equation parameters at the point of interest P of the object OBJ in the visual environment VE. As the illumination equation, (Expression 1) and (Expression 2) are used, for example. Thus, the surface normal vector and the light source vector at the point of interest P are measured. The measurement results are input to the image processing device 400 and given to the LR illumination equation parameter estimating section 103 as measured parameters $MP^L$.

The object imaging device OBJS captures the reflected light from the object OBJ. The captured result is input to the image processing device 400 and given to the LR illumination equation parameter estimating section 103 as an object image IIN.

The LR illumination equation parameter estimating section 103 estimates illumination equation parameters that are not those measured by the illumination equation parameter measurement device IEPS, based on the illumination equation of (Expression 1), for example. For example, if those measured by the illumination equation parameter measurement device IEPS are the light source vector $L^L$, the specular reflection image $Is^L$, the diffuse reflection image $Id^L$, the surface normal vector $N^L$, and the luminance $Ia^L$ of the ambient light, it estimates the illuminance $Ei^L$ at the point of interest P, the specular reflection component ratio $ks^L$, the object surface roughness (roughness coefficient) $m^L$, the refractive index $n^L$, and the diffuse reflection component bidirectional reflectance $\rho d^L$.

The present invention does not limit the method of estimation but any method can be used. A simplex method is used herein as an example to estimate optical parameter of the specular reflection component, i.e., the illuminance $Ei^L$, the specular reflection component ratio $kS^L$, the object surface roughness $m^L$, and the refractive index $n^L$. Then, the diffuse reflection component bidirectional reflectance $\rho d^L$ is calculated by using the illuminance $Ei^L$, the specular reflection component ratio $ks^L$ and the diffuse reflection image $Id^L$, which have been estimated. Similarly, for the illumination equation, the present invention provides no limitations but any model can be used.

Figure 2:
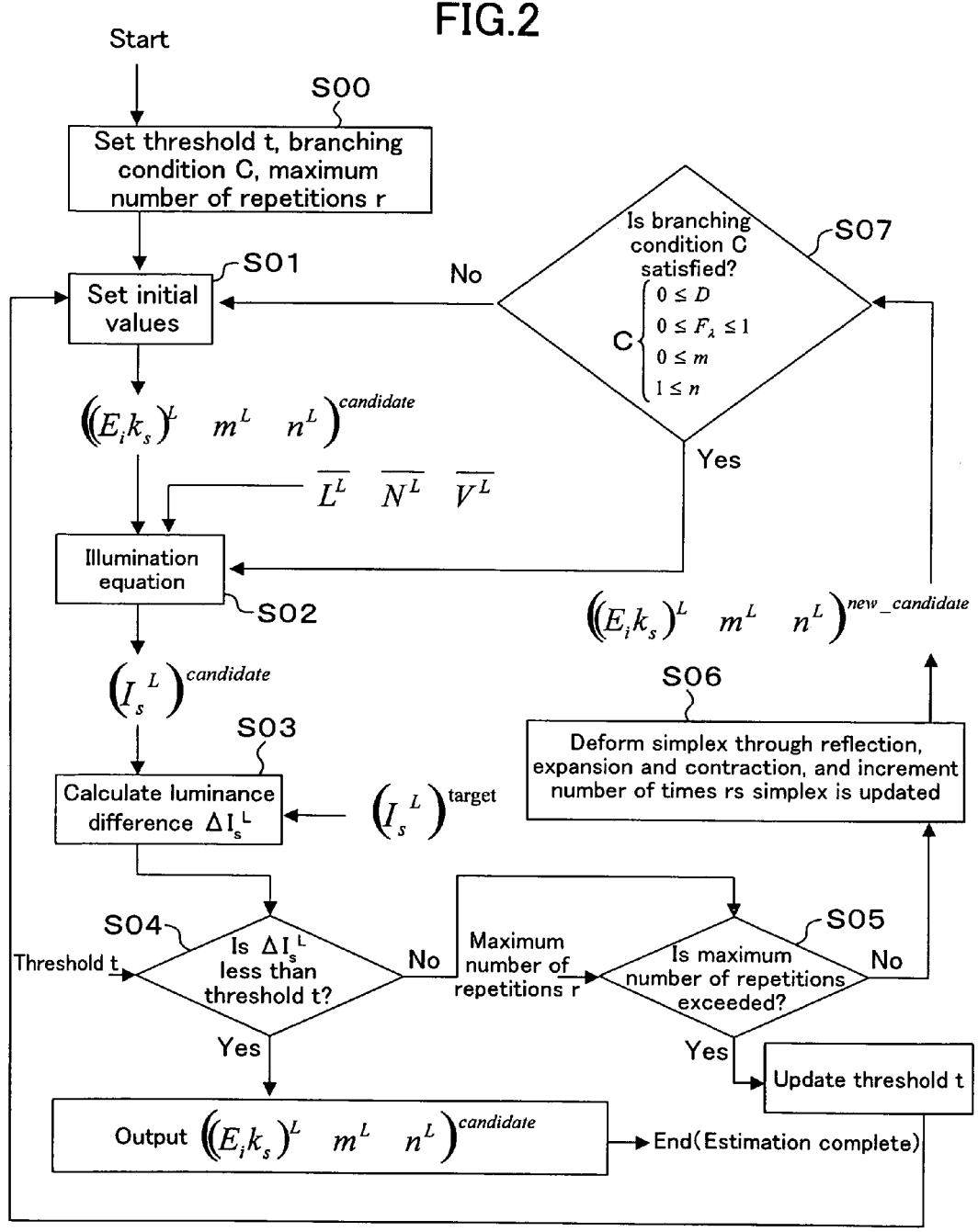
FIG. 2 is a flow chart showing a method for estimating the illuminance, the specular reflection component ratio, the object surface roughness and the refractive index at the point of interest, by a simplex method.

FIG. 2 shows a flow chart of estimating the illuminance $Ei^L$ at the point of interest P, the specular reflection component ratio $ks^L$, the object surface roughness $m^L$, and the refractive index $n^L$ by using the simplex method. From (Expression 1) and (Expression 2), it can be seen that the specular reflection image $Is^L$ is dictated by the following:

(1) Surface normal vector $N^L$;
(2) Light source vector $L^L$;
(3) Viewpoint vector $V^L$;
(4) Illuminance $Ei^L$ at the point of interest P;
(5) Specular reflection component ratio $ks^L$;
(6) Object surface roughness $m^L$; and
(7) Refractive index $n_L$.

Those among the illumination equation parameters that are input to the LR illumination equation parameter estimating section 103 are three parameters of (1) to (3). Therefore, illumination equation parameters estimated by the simplex method are four parameters of (4) to (7). However, Ei and ks are in a multiplication relationship with each other as shown in (Expression 1), and if Ei and ks are estimated as separate unknowns, there can be assumed an infinite number of combinations, thus failing to realize optimization. In view of this, in FIG. 2, Eiks is treated as a single unknown so that the illumination equation parameters to be estimated are the following three parameters $((Eiks)^L, m^L, n^L)$.

In the simplex method, the candidate estimate values are set as $((Eiks)^L, m^L, n^L)^{candidate}$, and (Expression 1) and (Expression 2) being the illumination equation are calculated to obtain the candidate specular reflection image $(Is^L)^{candidate}$, thereby obtaining, as an error evaluation function, the luminance difference $\Delta Is^L$ with respect to the specular reflection image $(Is^L)^{target}$ being a true value. If the luminance difference $\Delta Is^L$ being the error evaluation function is smaller than a threshold t, the candidate estimate values $((Eiks)^L, m^L, n^L)^{candidate}$ are employed as the estimation results. If the luminance difference $\Delta Is^L$ being the error evaluation function is greater than the threshold t, a shape called a "simplex" is deformed as will be described later to update the candidate estimate values $((Eiks)^L, m^L, n^L)^{candidate}$. Then, the candidate specular reflection image $(Is^L)^{candidate}$ is calculated again, and the luminance difference $\Delta Is^L$ with respect to the specular reflection image $(Is^L)^{target}$ being a true value is evaluated. The flow chart of FIG. 2 will be described based on the principle as set forth above.

Step S00 sets the threshold t, the branching condition C and the maximum number of repetitions r for the threshold process and the branching process and for checking the number of iterations of the repeated process to be described below. Step S01 gives initial values of the candidate estimate values $((Eiks)^L, m^L, n^L)^{candidate}$. Specifically, random number generation, or the like, is used. Step S02 inputs the candidate estimate values $((Eiks)^L, m^L, n^L)^{candidate}$, the light source vector $L^L$, the surface normal vector $N^L$ and the viewpoint vector $V^L$ to (Expression 1) being an illumination equation to calculate the candidate specular reflection image $(Is^L)^{candidate}$. Step S03 calculates the luminance difference $\Delta Is^L$ between the candidate specular reflection image $(Is^L)^{candidate}$ and the specular reflection image true value $(Is^L)^{target}$ being the target, and step S04 compares it with the threshold t (t=0.01, for example, where the luminance value is expressed in 8-bit 256 steps from 0 to 255).

Where the luminance difference $\Delta Is^L$ being the error evaluation function is smaller than the threshold t, the candidate estimate values $((Eiks)^L, m^L, n^L)^{candidate}$ are output as the estimation results to end the process of FIG. 2. The pixel being processed is determined to be a "qualified pixel" since the estimation precision satisfies a predetermined criterion (the error with respect to the true value being less than the threshold t).

Where the luminance difference $\Delta Is^L$ being the error evaluation function is greater than or equal to the threshold t, step S05 compares the number of times rs the simplex is updated with the maximum number of repetitions r, wherein if the number of times rs the simplex is updated is higher than the maximum number of repetitions r, the threshold t is increased to decrease the estimation precision, and the estimation is started over from the initialization of step S01. The pixel being processed is determined to be an "unqualified pixel" since the estimation precision does not satisfy a predetermined criterion (the error with respect to the true value being less than the threshold t). An unqualified pixel is fed back to the LR illumination equation parameter estimating section 103 via the first switcher section 402, the HR illumination equation parameter estimating section 109 and the resolution decreasing section 110 to be described below, and the parameter estimation is performed again by the LR illumination equation parameter estimating section 103. At this time, the setting is brought back to the initial threshold t to estimate the illumination equation parameters of the unqualified pixel at an initial level of estimation precision. Where the number of times rs the simplex is updated is not higher than the maximum number of repetitions r, the simplex is deformed through reflection, expansion and contraction in step S06 to update the candidate estimate values $((Eiks)^L, m^L, n^L)^{candidate}$ and calculate the next candidate estimate values $((Eiks)^L, m^L, n^L)^{new\_candidate}$.

A simplex is a collection of (n+1) points in an n-dimensional space. Where n=2, the simplex is a triangle. In FIG. 2, the simplex is a tetrahedron since three variables of $(Eiks)^L$, $m^L$ and $n^L$ are being handled. A vertex of the simplex is represented by a vector $x_j$, and new vectors $x_h$, $x_s$, $x_1$ and $x_0$ are defined as follows.

[Formula 4]

$$\begin{cases} x = \dfrac{l\tan\beta}{\tan\alpha + \tan\alpha'} \\ y = \dfrac{l\tan\alpha\tan\beta}{\tan\alpha + \tan\alpha'} \end{cases} \quad \text{(Expression 14)}$$

Then, the following three operations are performed to change the size and shape of the simplex to optimize the function.

[Formula 5]

$$\begin{cases} x = \dfrac{l\tan\beta}{\tan\alpha + \tan\alpha'} \\ y = \dfrac{l\tan\alpha\tan\beta}{\tan\alpha + \tan\alpha'} \end{cases} \quad \text{(Expression 15)}$$

Herein, $\alpha$ (>0), $\beta$ (>1) and $\gamma$ (1>$\gamma$>0) are coefficients, and values such as $\alpha=1$, $\beta=2$ and $\gamma=\frac{1}{2}$ are used, for example.

FIG. 3 shows a case where these operations are performed in two dimensions. The function optimization of the simplex method is based on the assumption that if one selects one of the vertices of the simplex that has the largest function value, the function value in the mirror image thereof is small. If this assumption is correct, the minimum value of a function can be obtained by repeating the same process. The function in FIG. 2 is the luminance difference $\Delta Is^L$ being the error evaluation function. The luminance difference $\Delta Is^L$ decreases as $(Eiks)^L$, $m^L$ and $n^L$ are updated by (Expression 14) and (Expression 15), and the optimization process ends when it becomes smaller than the threshold t, thus determining the estimate values of $(Eiks)^L$, $m^L$ and $n^L$.

Step S07 confirms whether the next candidate estimate values $((Eiks)^L, m^L, n^L)^{new\_candidate}$ and the known parameters satisfy all of the branching condition C. If so, the process returns to step S02 to again perform a comparison with the threshold t. If the next candidate estimate values $((Eiks)^L, m^L, n^L)^{new\_candidate}$ and the known parameters do not satisfy all of the branching condition C, the process returns to step S01 to re-set the initial values.

For example, the branching condition C is that the refractive index n of (Expression 2) is 1 or more, the Fresnel coefficient F$\lambda$ is 0 or more and 1 or less, the object surface roughness m is 0 or more, and the microfacet distribution function D is 0 or more. These conditions are for confirming whether the parameter values are physically legitimate, and if even one of these conditions is not satisfied, it is determined that the illumination equation parameters contain a physical contradiction and the illumination equation parameters are then discarded. Even though the function optimization appears to be progressing from an estimation method point of view, it can be considered to be moving into a contradicting solution space from a physical point of view. Thus, if the process continues to update the simplex, it will not be able to move out of a physically contradicting solution space. Therefore, the process returns to step S01 to re-set the initial values and to thereby move out of the physically contradicting solution space.

As described above, the illuminance Ei, the specular reflection component ratio ks, the object surface roughness m and the refractive index n are estimated by the process of FIG. 2, thus determining a "qualified pixel" for which the estimation is completed without updating the threshold t and an "unqualified pixel" for which the estimation is completed after updating the threshold t.

While the simplex method is one example, the present invention may use a Newton-Raphson method in which $f(x)=0$ is obtained by an iterative method. Specifically, a pixel is a qualified pixel if $f(x)=0$ is satisfied within a predetermined error, with $f(x)$ being the difference between the true value and the estimate value. The Newton-Raphson method is based on the fact that $f(x_o+\Delta x)=f(x_o)+f'(x_o)\Delta x$ holds true for a minute change $\Delta x$ of x, when taking only first-degree terms after a Taylor expansion of $f(x)$ at $x=x_o$, which is close to the root of $f(x)=0$. By the method, the root of $f(x)=0$ can be obtained by repetitively obtaining the intersection $x_1$ between the tangential line to $y=f(x)$ at point $(x_o, y_o)$ and the x axis. The present invention does not limit the method of parameter estimation, but any estimation method can be used.

The diffuse reflection component ratio kd is given by 1−ks, and the illuminance $Ei^L$ and diffuse reflection image $Id^L$ are known, whereby it is possible to calculate the diffuse reflection component bidirectional reflectance $\rho d^L$, which is output from the LR illumination equation parameter estimating section 103.

Thus, the LR illumination equation parameter estimating section 103 completes the estimation of illumination equation parameters, and outputs the estimation results as estimated parameters $EP^L$. The qualification indicating image $ASI^L$ is responsible for the distinction between a qualified pixel and an unqualified pixel included in the estimated parameters $EP^L$. Specifically, the qualification indicating image $ASI^L$ is a 1-bit image of the same image sizes as the input image IIN, and records a qualified pixel as "1" and an unqualified pixel as "0".

There can be assumed various reasons for an unqualified pixel to occur. For example, a problem may occur in the measurement of the surface normal vector, as described above with reference to FIG. 41, whereby the estimation precision at the LR illumination equation parameter estimating section 103 does not satisfy a predetermined criterion, thus making the pixel being processed an unqualified pixel. In order to improve the estimation precision for such unqualified pixels, it is necessary to add new additional information and then again estimate the remaining unqualified pixels. In view of this, a database-based type process is used as the super-resolution process, wherein a super-resolution process is performed with high-resolution parameters from the database, and a parameter estimation is performed again while using high-resolution parameters as new additional information. Specifically, the super-resolution process is performed by the material-based interpolation section 105 and a texture super-resolution section 107, but the texture super-resolution section 107 obtains high-resolution information by referring to the database as will be described later. The obtained high-resolution information is new additional information that cannot be obtained from the illumination equation parameter measurement device IEPS and, therefore, the possibility of estimating an unqualified pixel with a predetermined estimation precision is increased by adding the illumination equation parameters, which have been subjected to the super-resolution process by the texture super-resolution section 107, to a qualified pixel.

The predetermined criterion based on which the estimation precision is determined is typically determined by the image quality demanded by the user. Thus, it is considered to be qualified if the image quality demanded by the user is satisfied, and unqualified otherwise. The image quality demanded by the user varies depending on the purpose or the device to be used. For example, a higher image quality is typically demanded when the user watches a painting on a display than when the user is obtaining information from a news program.

As to the difference between devices, a higher image quality is demanded for an installed large-size display for use in a home theater system, or the like, than for a portable small-size display.

The criterion for the estimation precision may vary from one area of an image to another. Specifically, consider a case where an image includes a person in the foreground and a building in the background. The focus of the camera is on the person in the foreground, and the building in the background is out of the depth of field and is blurred. Then, a high image quality is demanded for the person in the foreground, and a high image quality is not demanded for the background. Then, different determination criteria may be assigned to the foreground and to the background, whereby it is possible to ensure the qualification of the estimation precision with less calculation.

Hereinafter, as the internal configuration of the illumination equation parameter resolution increasing section 120, a texture analysis A section 104 and the material-based interpolation section 105 for performing an interpolation-based super-resolution process will be described, and a texture analysis B section 106 and the texture super-resolution section 107 for performing a database-based super-resolution process will be described. Then, the HR illumination equation parameter estimating section 109 and the resolution decreasing section 110 will be described as a mechanism for feeding the output of the texture super-resolution section 107 back to the estimation of the illumination equation parameters.

Figure 4:
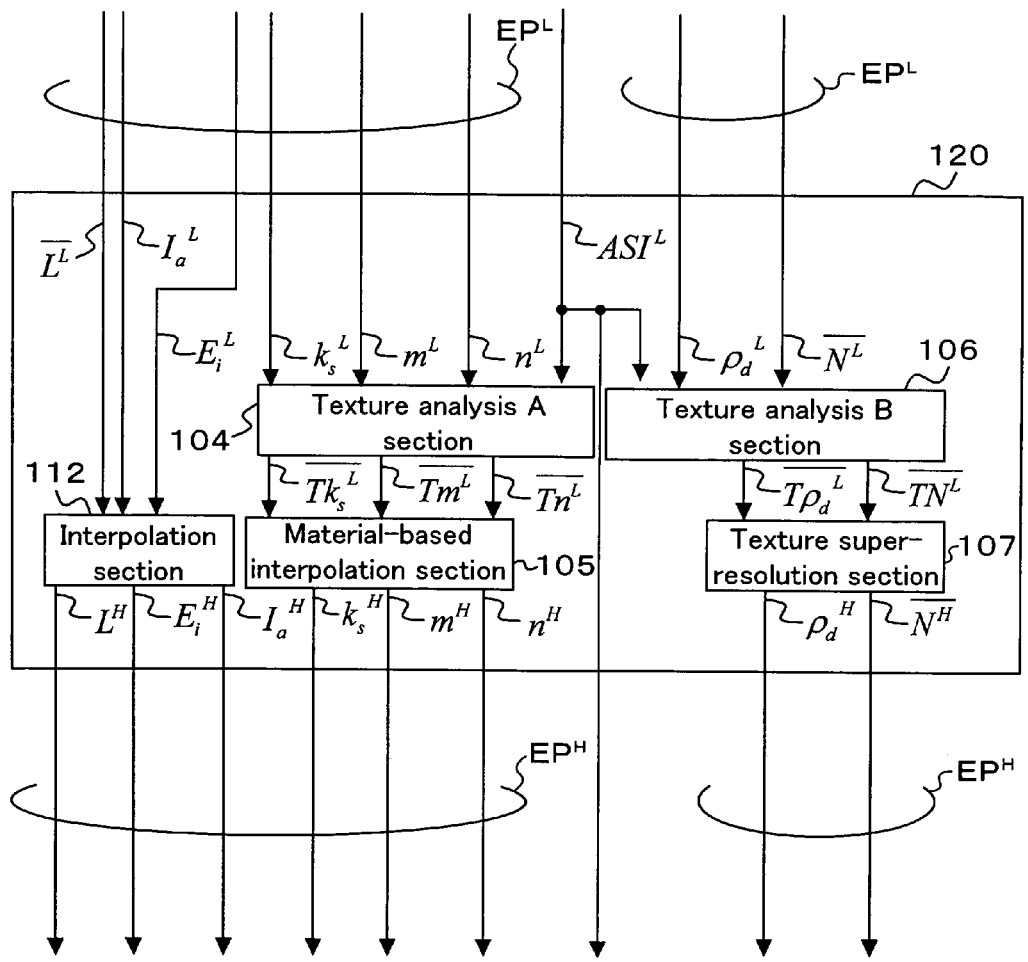
FIG. 4 is a diagram illustrating an internal configuration of an illumination equation parameter resolution increasing section in FIG. 1.

FIG. 4 is a diagram illustrating the internal configuration of the illumination equation parameter resolution increasing section 120. The texture analysis A section 104 serves to perform a preliminary process before the resolution-increasing process by the material-based interpolation section 105 to be described below. It is believed that the specular reflection component ratio $ks^L$, the object surface roughness $m^L$ and the refractive index $n^L$ are optical characteristics parameters depending on the material of the object, and each take a constant value for each material. In view of this, the texture analysis A section 104 determines the material based on the texture difference, and the material-based interpolation section 105 interpolates parameter values for each material. On the other hand, the diffuse reflection component bidirectional reflectance $\rho d^L$ and the surface normal vector $N^L$ are parameters independent of particular binding conditions and, therefore, there is no ground that an interpolation-based resolution-increasing process is sufficient in terms of the image quality. Thus, the resolution-increasing process employs a method in which a texture feature quantity vector conversion table is referred to. Specifically, low-resolution images and high-resolution images are obtained and stored in a database in advance using a plurality of samples. In the super-resolution process, the database is referred to using a low-resolution image to obtain a high-resolution image from the database. Then, the texture analysis B section 106 identifies the material and the resolution using a feature quantity histogram, and the texture super-resolution section 107 subjects the texture feature quantity to the super-resolution process by referring to the texture feature quantity conversion table.

An interpolation section 112 increases the resolution by interpolating or spatially copying the light source vector $L^L$, the ambient light luminance $Ia^L$ and the illuminance $Ei^L$, which are highly independent of the resolution, to output the light source vector $L^H$, the ambient light luminance $Ia^H$ and the illuminance $Ei^H$.

Hereinafter, the details of the resolution-increasing process will be described by a combination of the texture analysis A section 104 and the material-based interpolation section 105, and a combination of the texture analysis B section 106 and the texture super-resolution section 107.

The qualification indicating image $ASI^L$ is input to the illumination equation parameter resolution increasing section 120, and the qualification indicating image $ASI^L$ is given to each of the texture analysis A section 104 and the texture analysis B section 106. The illumination equation parameter resolution increasing section 120 increases the resolution of the illumination equation parameters only for qualified pixels by referring to the qualification indicating image $ASI^L$. Thus, it is possible to reduce the amount of process. However, it is understood that the resolution of the illumination equation parameters may be increased for all pixels.

Figure 5:
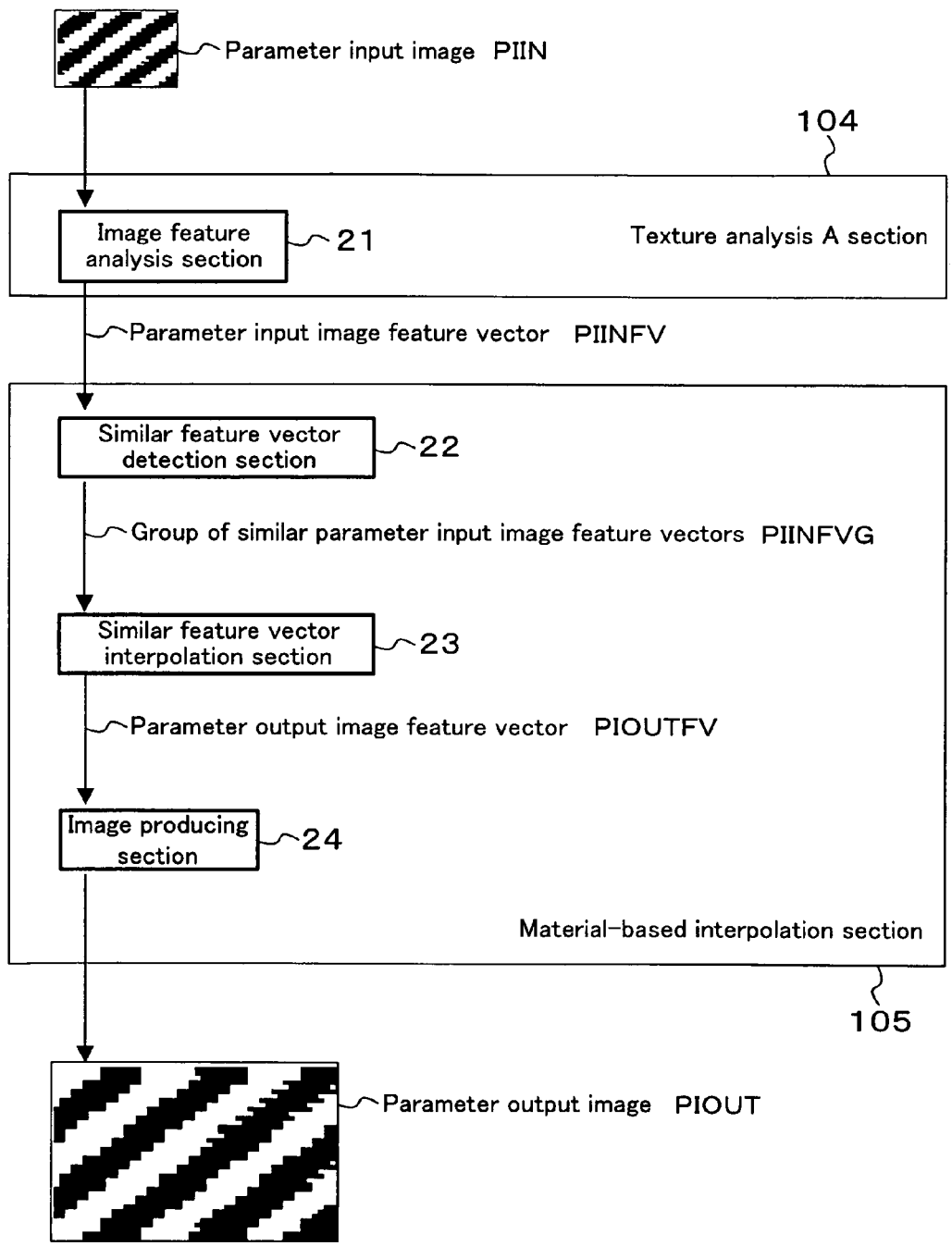
FIG. 5 is a block diagram showing the details of a texture analysis A section and a material-based interpolation section.

FIG. 5 is a block diagram showing the details of the texture analysis A section 104 and the material-based interpolation section 105. Each of the specular reflection component ratio $ks^L$, the object surface roughness $m^L$ and the refractive index $n^L$ is input to the texture analysis A section 104 as a parameter input image PIIN where the parameter value is the pixel value.

Figure 6:
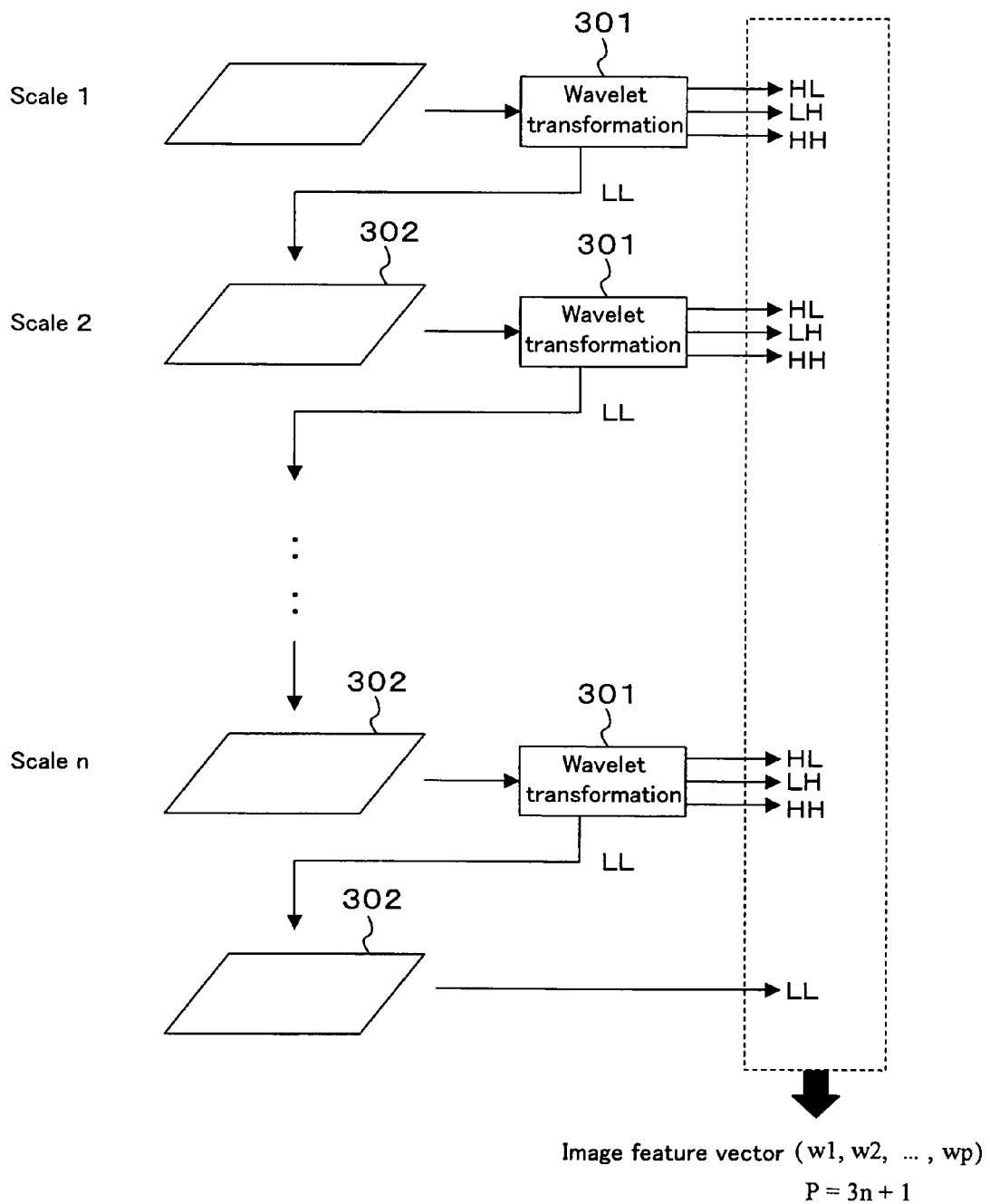
FIG. 6 is a diagram illustrating a method for producing an image feature vector by a wavelet transformation.

The texture analysis A section 104 performs a spatial frequency analysis at an image feature analysis section 21 to output a parameter input image feature vector PIINFV representing the texture information. While any method may be used for the spatial frequency analysis, a wavelet transformation as shown in FIG. 6 is used, for example. The outputs HL, LH, HH and LL of wavelet transformation are obtained in each of n iterations of scaling, and a (3n+1)-dimensional vector obtained by combining them together for each level is used as a parameter input image feature vector PIINFV.

Referring to FIG. 7(a), in a case where a Haar-type mother wavelet is used, HL is the difference value between a pixel 960 of interest and a right-side adjacent pixel 961, LH is the difference value between the pixel 960 of interest and a lower-side adjacent pixel 962, HH is the difference value between the pixel 960 and a lower-right adjacent pixel 963, and LL is the average value of the four pixels 960 to 963, including the pixel 960 of interest and the right-side, lower-side and lower-right adjacent pixels. FIG. 7(a) corresponds to scale 1, and FIG. 7(b) corresponds to scale 2. In scale 2, the output LL being the average value of the four pixels 960 to 963 in scale 1 is used in the calculation of the difference value. Specifically, the output HL in scale 2 is the difference value between a block 964 and a block 965, the output LH in scale 2 is the difference value between the block 964 and a block 966, and the output HH in scale 2 is the difference value between the block 964 and a block 967. Moreover, the output LL in scale 2 is the average value of the blocks 964 to 967.

Figure 8:
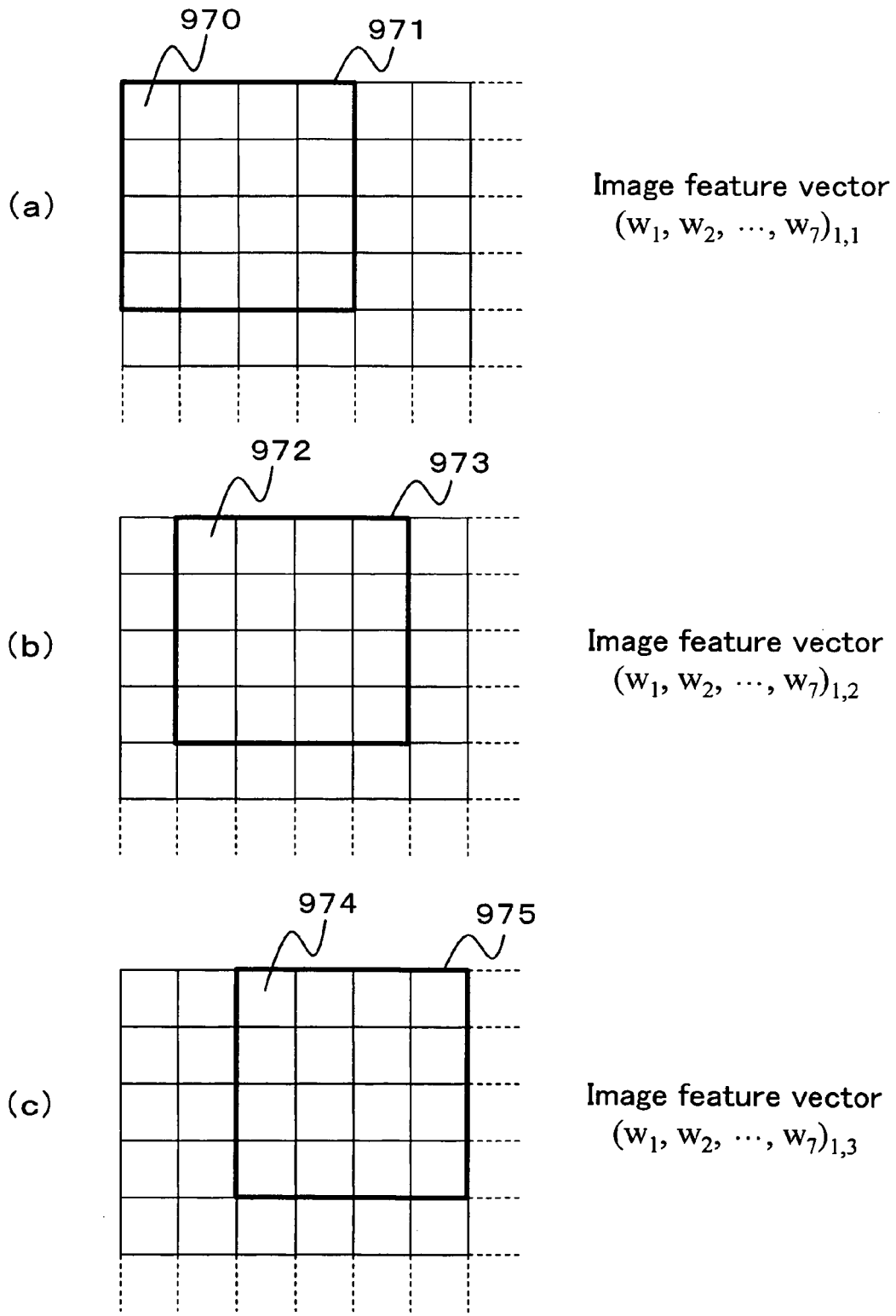
FIG. 8 is a diagram illustrating a method for calculating an image feature quantity.

FIG. 8 is a diagram illustrating a method for calculating the image feature quantity for each pixel for an example where the scale level n=2. FIG. 8(a) shows a method for calculating the image feature quantity $(w_1, w_2, \ldots, w_7)_{1,1}$ of a pixel 970, wherein 16 pixels in a block 971 are referred to in the wavelet transformation to calculate the seven-dimensional image feature quantity. Similarly, FIG. 8(b) shows a method for calculating the image feature quantity $(w_1, w_2, \ldots, w_7)_{1,2}$ of a pixel 972, wherein 16 pixels in a block 973 are referred to in the wavelet transformation to calculate the seven-dimensional image feature quantity. FIG. 8(c) shows a method for calculating the image feature quantity $(w_1, w_2, \ldots, w_7)_{1,3}$ of a pixel 974, wherein 16 pixels in a block 975 are referred to in the wavelet transformation to calculate the seven-dimensional image feature quantity. As described above, the image feature quantity is calculated for each pixel as the block to be referred to in the wavelet transformation moves by one pixel.

A similar feature vector detection section 22 finds a vector close to the parameter input image feature vector PIINFV, for all the pixels of the parameter input image PIIN. The similarity between vectors can be detected based on the inner product between the two vectors, and a group of similar parameter input image feature vectors PIINFVG is formed by taking three largest inner products for all the pixels.

Figure 9:
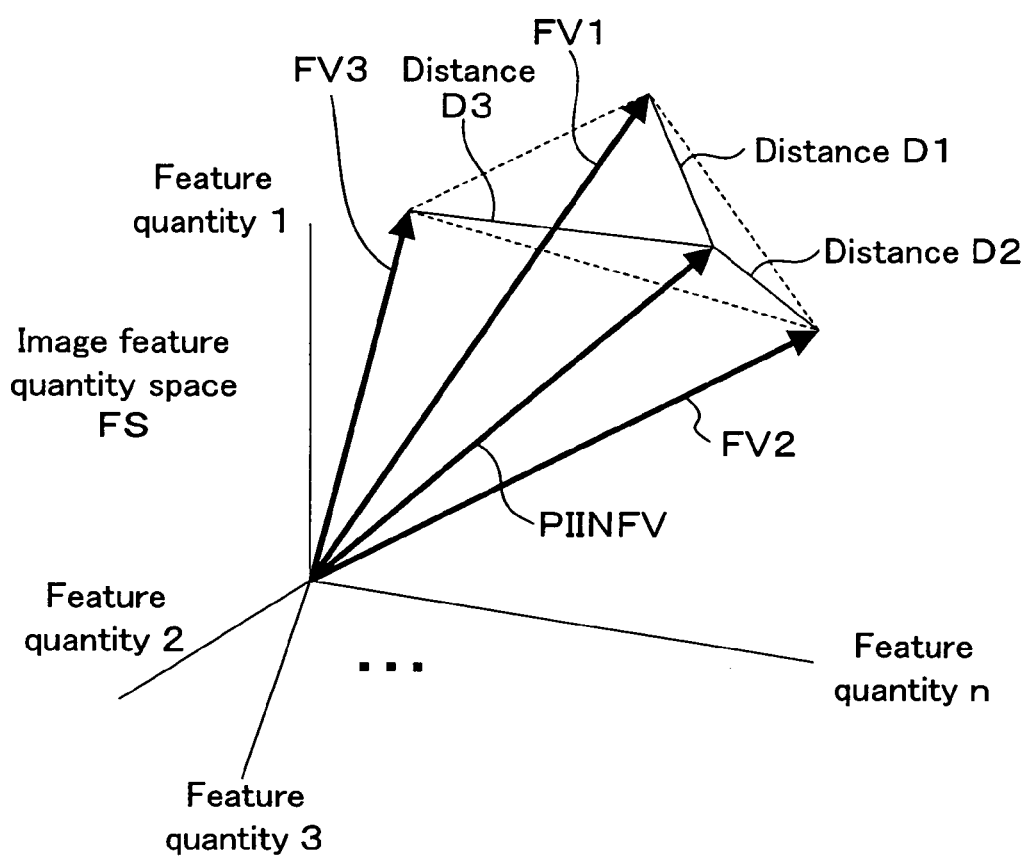
FIG. 9 is a diagram showing an example of a positional relationship between a group of parameter input image feature vectors and a group of similar parameter input image feature vectors in an image feature quantity space.

FIG. 9 shows an example of a positional relationship between the parameter input image feature vector PIINFV and the group of similar parameter input image feature vectors PIINFVG in the image feature quantity space FS. Vectors FV1 to FV3 represent elements of the group of similar parameter input image feature vectors PIINFVG detected by the similar feature vector detection section 22.

A similar feature vector interpolation section 23 obtains the distances D1 to D3 between the parameter input image feature vector PIINFV and the group of similar parameter input image feature vectors PIINFVG, and performs interpolation based on (Expression 16) to calculate the parameter output image feature vector PIOUTFV.

[Formula 6]

$$\overline{PIOUTFV} = \left(1 - \frac{D_1}{D}\right)\overline{FV_1} + \left(1 - \frac{D_2}{D}\right)\overline{FV_2} + \left(1 - \frac{D_3}{D}\right)\overline{FV_3}$$
$$D = D_1 + D_2 + D_3$$

(Expression 16)

An image producing section 24 performs an inverse transformation to that of the image feature analysis section 21 (e.g., an inverse wavelet transformation) on the parameter output image feature vector PIOUTFV. As a result, the parameter output image PIOUT of the specular reflection component ratio $ks^H$, the object surface roughness $m^H$ and the refractive index $m^H$ is output from the material-based interpolation section 105.

Figure 10:
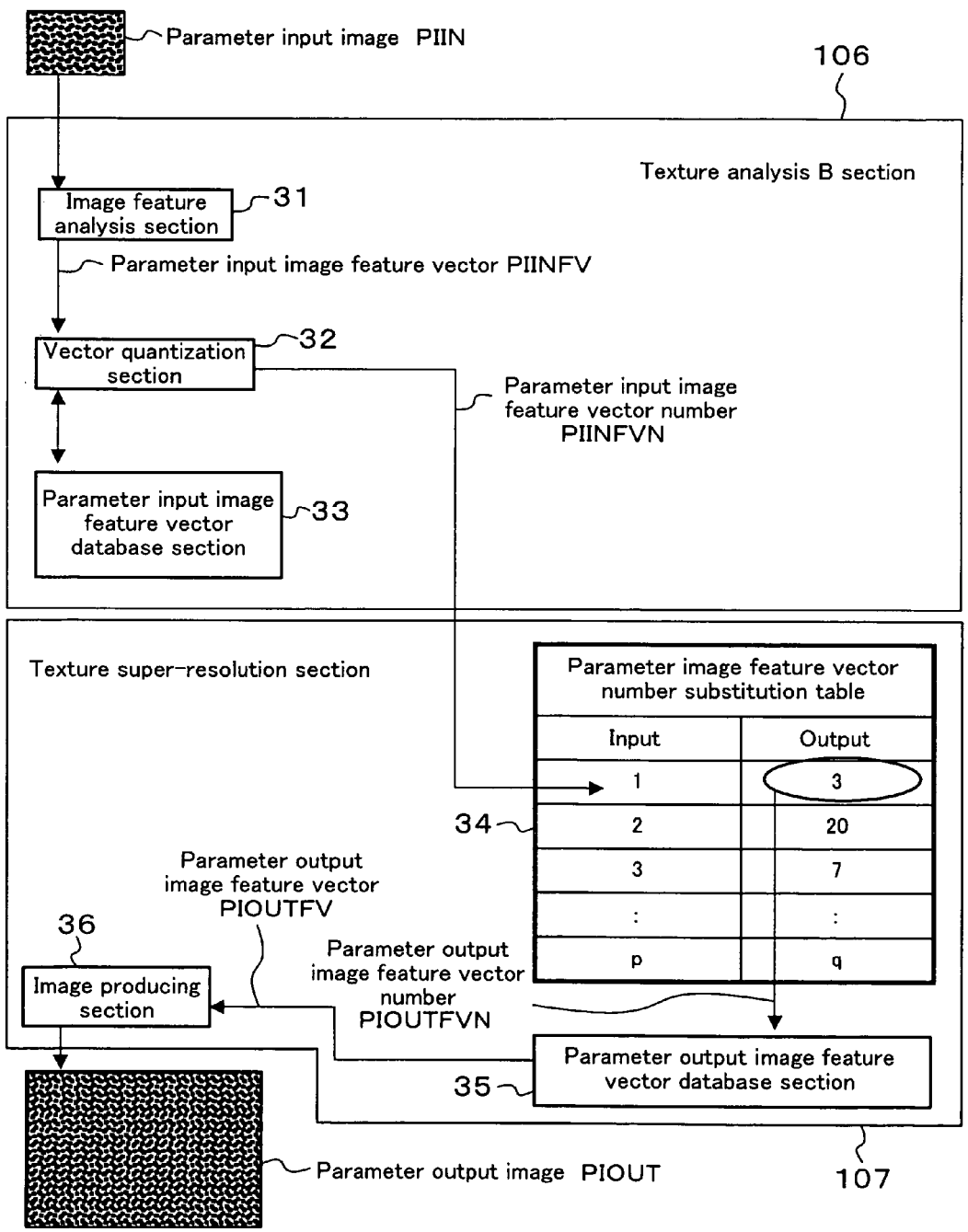
FIG. 10 is a block diagram showing the details of a texture analysis B section and a texture super-resolution section.
Figure 11:
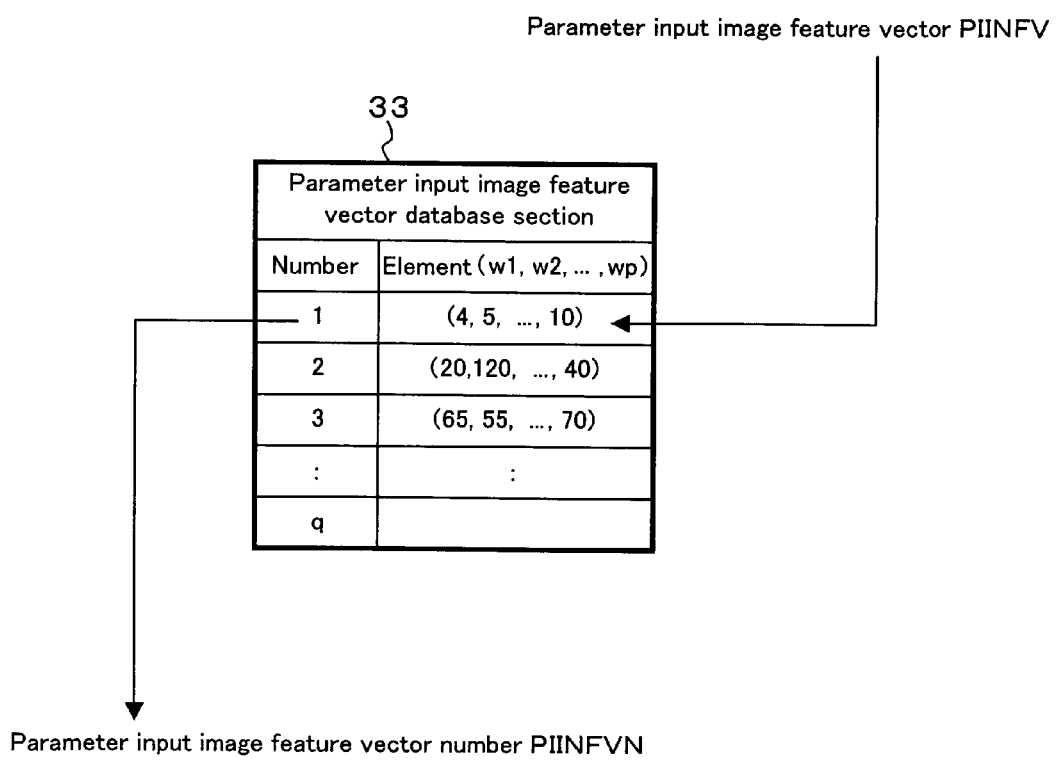
FIG. 11 is a diagram showing the details of a parameter input image feature vector database section.

FIG. 10 is a block diagram showing the details of the texture analysis B section 106 and the texture super-resolution section 107. Each of the diffuse reflection component bidirectional reflectance $\rho d^L$ and the surface normal vector $N^L$ is input to the texture analysis B section 106 as a parameter input image PIIN where the parameter value is the pixel value. At this point, an initial enlargement is performed. An image feature analysis section 31 performs a spatial frequency analysis of the parameter input image PIIN to output the parameter input image feature vector PIINFV representing the texture information. The wavelet transformation of FIG. 6 is used for the spatial frequency analysis. A vector quantization section 32 detects a vector closest to the parameter input image feature vector PIINFV from among the image feature vectors stored in a parameter input image feature vector database section 33. The parameter input image feature vector database section 33 includes sets of the parameter input image feature vector and the parameter input image feature vector number as shown in FIG. 11, and is produced in advance using a plurality of sample images. Thus, the texture analysis B section 106 outputs texture information, being the diffuse reflection component bidirectional reflectance $\rho d^L$ or the surface normal vector $N^L$, to the texture super-resolution section 107 as the parameter input image feature vector number PIINFVN.

Figure 12:
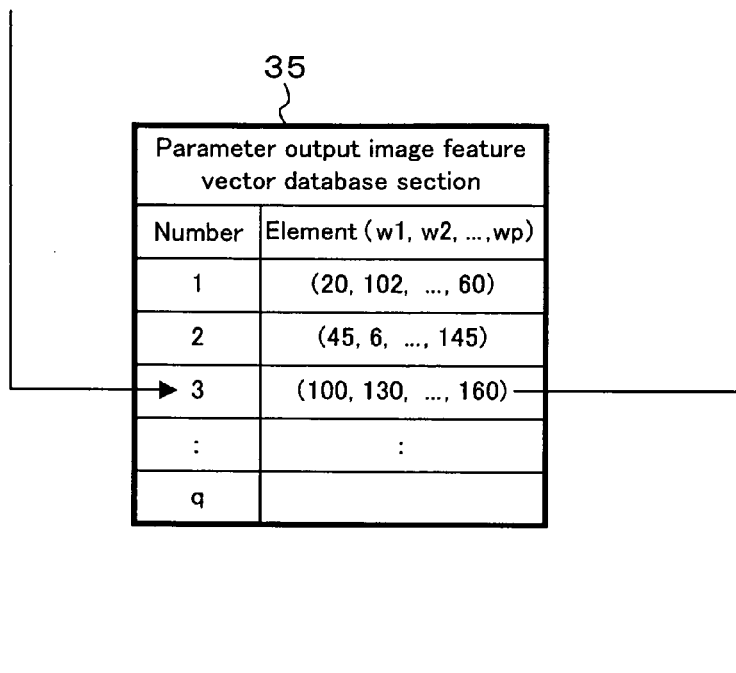
FIG. 12 is a diagram showing the details of a parameter output image feature vector database section.

The texture super-resolution section 107 substitutes the parameter input image feature vector number PIINFVN with the parameter output image feature vector number PIOUTFVN by using a parameter image feature vector number substitution table 34. Thus, the super-resolution process is performed. Specifically, a parameter output image feature vector database section 35 describes how the parameter output image feature vector number PIOUTFVN is associated with the super-resolution image feature quantity vector as shown in FIG. 12, and the super-resolution process is realized essentially by number substitution at the parameter image feature vector number substitution table 34.

Figure 13:
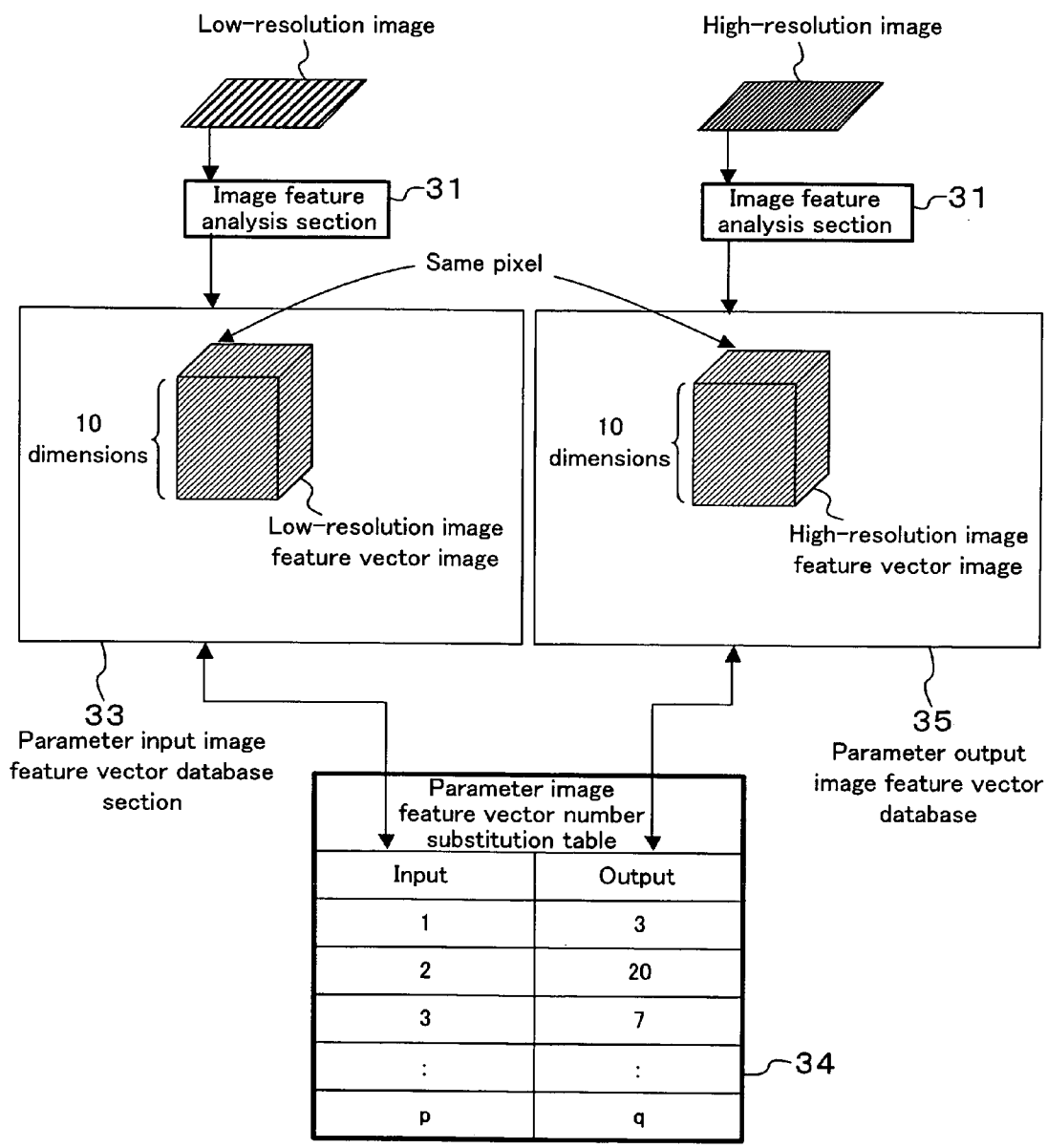
FIG. 13 is a diagram illustrating a parameter image feature vector number substitution table.

The parameter image feature vector number substitution table 34 is produced from the image feature quantity vector relationship between the low-resolution image and the high-resolution image in advance using a plurality of samples as shown in FIG. 13. The image feature of the low-resolution image is stored in the parameter input image feature vector database 33, and the image feature of the high-resolution image is stored in the parameter output image feature vector database 35. The example of FIG. 13 shows a 10-dimensional vector obtained by performing the wavelet transformation of FIG. 6 up to the scale level 3. The parameter image feature vector number substitution table 34 is constructed based on the correspondence between a pixel in the low-resolution image and the same pixel in the high-resolution image.

The parameter output image feature vector database section 35 takes out the parameter output image feature vector PIOUTFV indicated by the parameter output image feature vector number PIOUTFVN. An image producing section 36 performs an inverse transformation to that of the image feature analysis section 31 (e.g., an inverse wavelet transformation) to convert the parameter output image feature vector PIOUTFV to the parameter output image PIOUT. As a result, the diffuse reflection component bidirectional reflectance $\rho d_H$ or the surface normal vector $N^H$ is output from the texture super-resolution section 107.

Since the parameter image feature vector number substitution table 34 is constructed based on the correspondence between a pixel in the low-resolution image and the same pixel in the high-resolution image, as described above, it is necessary that the image size of the low-resolution image and that of the high-resolution image are equal to each other. Since the low-resolution image has a smaller image size than the high-resolution image, the low-resolution image may be initially enlarged to the same image size as the high-resolution image by a bilinear interpolation or a bicubic interpolation, for example. Therefore, the texture super-resolution section 107 essentially serves to add details, which are mainly the high-frequency components obtained from the database, to the initially-enlarged low-resolution image.

Thus, the super-resolution process is completed. At the same time, the parameter output image feature vector PIOUTFV taken out from the output image feature vector database section 35 is obtained as new additional information to be used for improving the estimation precision of unqualified pixels. The qualification indicating image $ASI^L$ is responsible for the distinction between a qualified pixel and an unqualified pixel included in the estimated parameters $EP^H$.

The first switcher section 402 refers to the qualification indicating image $ASI^L$ to check the presence/absence of an unqualified pixel and switch the output destination of the resolution-increased parameters from one to another. If all the pixels are qualified pixels, the estimated parameters $EP^H$ are output to the illumination equation parameter synthesis section 111. If there is an unqualified pixel, the estimated parameters $EP^H$ are output to the HR illumination equation parameter estimating section 109, and the process of estimating illumination equation parameters is performed again as will be described later.

The HR illumination equation parameter estimating section 109 performs an estimation of an unqualified pixel in the estimated parameters $EP^H$. The diffuse reflection component bidirectional reflectance $\rho d^H$ and the surface normal vector $N^H$ of the estimated parameters $EP^H$ are those obtained by referring to the parameter output image feature vector database section 35, and are considered to be new qualified pixels that cannot be measured by the illumination equation parameter measurement device IEPS. Therefore, by using the resolution-increased illumination equation parameters, it may be possible to estimate illumination equation parameters that could not be estimated by the LR illumination equation parameter estimating section 103. While the specific estimation method of the HR illumination equation parameter estimating section 109 may be any method, and the present invention provides no limitations thereto, a simplex method as described above with reference to FIG. 2 is used, for example. The error evaluation function is compared with a threshold to distinguish between a qualified pixel and an unqualified pixel, thus outputting the qualification indicating image $ASI^H$.

The second switcher section 403 refers to the qualification indicating image $ASI^H$ to check the presence/absence of an unqualified pixel. If all the pixels have become qualified pixels, the estimated parameters $EP^H$ are output to the illumination equation parameter synthesis section 111. If it is determined that there remains an unqualified pixel as a result of the estimation by the HR illumination equation parameter estimating section 109, the results are returned to the LR illumination equation parameter estimating section 103 to perform the parameter estimation process again with a low-resolution image. For this, it is necessary to decrease the resolution of the resolution-increased parameters. Therefore, the estimated parameters $EP^H$ being the output from the HR illumination equation parameter estimating section 109 are output to the resolution decreasing section 110, where a resolution-decreasing process is performed, and are then input to the LR illumination equation parameter estimating section 103.

The resolution decreasing section 110 performs the resolution-decreasing process on the estimated parameters $EP^H$ to output the results as the estimated parameters $EP^L$. The specific method of the resolution-decreasing process depends on the imaging characteristics of the object imaging device OBJS. Specifically, the process obtains a high-resolution image obtained by the object imaging device OBJS imaging the object OBJ at a short distance and a low-resolution image obtained by the object imaging device OBJS imaging the object OBJ at a long distance, and the variations in the luminance value therebetween are reflected to the resolution decreasing section 110. Specifically, the correspondence between parameter image feature vectors is constructed by pixels as shown in FIG. 13, and a low-resolution image can be obtained by following the flow of FIG. 10 in the reverse direction. In such a case, the parameter input image feature vector database section 33, the parameter image feature vector number substitution table 34 and the parameter output image feature vector database section 35 shown in FIG. 10 may be used.

Approximate methods include those in which a two-dimensional Gaussian function is convoluted to calculate a low-resolution image, and those in which the average value between adjacent pixels is used as a low-resolution image. Parameter image feature vectors, instead of the luminance, may be interpolated as shown in FIG. 9.

The qualification indicating image $ASI^L$ indicating the presence/absence of an unqualified pixel is produced by a method shown in FIG. 14 based on the qualification indicating image $ASI^H$ input from the second switcher section 403. It is assumed that, in the qualification indicating image $ASI^H$ of FIG. 14(a), a pixel 405 is an unqualified pixel and the other pixels are qualified pixels. In a case where a pixel 406 of the qualification indicating image $ASI^L$ is produced from 16 pixels of 4 pixels×4 lines of the qualification indicating image $ASI^H$ as a result of the resolution-decreasing process of the resolution decreasing section 110, the pixel 406 is influenced by the unqualified pixel 405. Thus, the pixel 406 is an unqualified pixel. On the other hand, with the qualification indicating image $ASI^H$ of FIG. 14(b), the 16 pixels of 4 pixels×4 lines, which influence the pixel 406 of the qualification indicating image $ASI^L$, are all qualified pixels. Then, the pixel 406 is a qualified pixel.

The estimated parameters $EP_L$ fed back from the resolution decreasing section 110 have been calculated with additional information necessary for the super-resolution process having been added thereto in the output image feature vector database section 35 of the texture super-resolution section 107. Thus, new information that cannot be obtained by the object imaging device OBJS or a shape measurement device NS has been added thereto. Therefore, it is considered that the process is likely able to estimate parameters for those that have been determined as unqualified pixels in the first estimation process in the LR illumination equation parameter estimating section 103.

By repeating the process as described above, the amount of information of the illumination equation parameters increases each time a super-resolution process is performed by the texture super-resolution section 107. Thus, the possibility that parameters of unqualified pixels can be estimated is increased, and it is possible that all the pixels become qualified pixels.

The illumination equation parameter synthesis section 111 uses the illumination equation of (Expression 1) to synthesize the resolution-increased parameters into a luminance image, and output the image as the high-resolution image IOUT.

Figure 15:
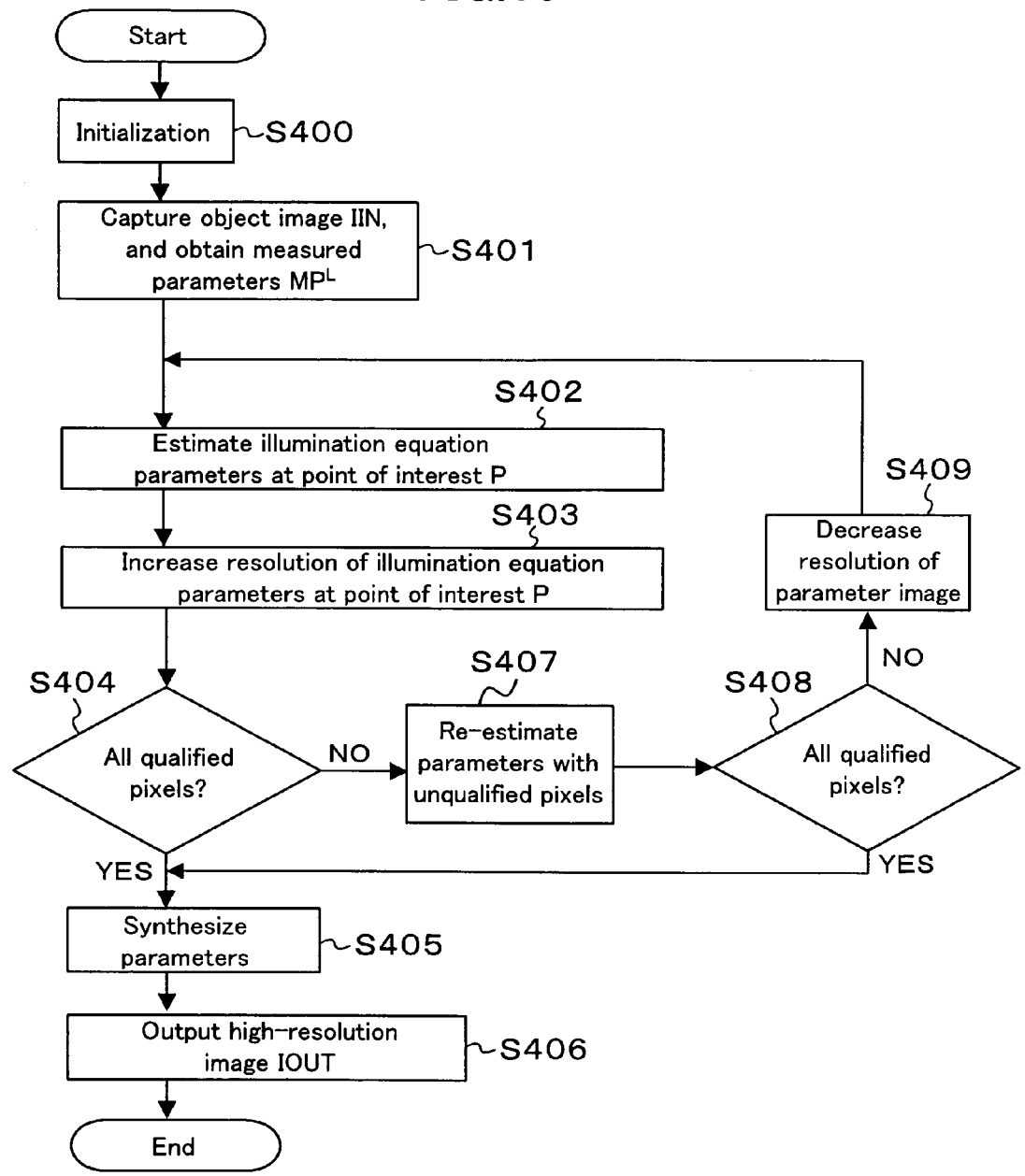
FIG. 15 shows an operation flow of an image processing device of FIG. 1.

FIG. 15 shows an operation flow of the block diagram of the image processing device 400 shown in FIG. 1. Step S400 sets initial values, threshold values, the branching condition, etc., for use in the estimation process performed by the LR illumination equation parameter estimating section 103 or the HR illumination equation parameter estimating section 109, as an initialization process. In step S401, the object imaging device OBJS images the object OBJ to obtain an object image IIN, and the illumination equation parameter measurement device IEPS measures the illumination equation parameters of the object OBJ. In step S402, the LR illumination equation parameter estimating section 103 estimates the illumination equation parameters at the point of interest P. In step S403, the illumination equation parameter resolution increasing section 120 increases the resolution of the illumination equation parameters at the point of interest P. Step S404 checks the presence/absence of an unqualified pixel. If all the pixels are qualified pixels, the process proceeds to step S405, a parameter synthesis process is performed in step S405, and the high-resolution image IOUT is output in S406. If an unqualified pixel is detected in step S404, the process proceeds to step S407, and an unqualified pixel is re-estimated by using the resolution-increased illumination equation parameters in step S407. Step S408 again checks the presence/absence of an unqualified pixel. If all the pixels are qualified pixels, the process proceeds to step S405, and the high-resolution image IOUT is output in step S406. If an unqualified pixel is detected in step S408, the process proceeds to step S409, the resolution of the high-resolution parameter image is decreased in step S409, and the process returns to step S402 to re-estimate an unqualified pixel with the low-resolution parameter image.

There may be a case where no matter how many times the parameter estimation is repeated by the LR illumination equation parameter estimating section 103, the threshold t does not decrease to a predetermined value and the estimation precision does not reach the target level. This means that there are too many unqualified pixels for the target estimation level. In such a case, the process needs to be ended by lowering the estimation precision. In view of this, the first switcher section 402 is provided with a counter, wherein when the parameter estimation is repeated more than a predetermined number of times, the process stops feeding back to the LR illumination equation parameter estimating section 103, and ends the resolution-increasing process by outputting the parameters to the illumination equation parameter synthesis section 111.

Thus, the image processing device 400 can output an image of a higher resolution than that of the object imaging sensor based on the object image IIN and the measured parameters $MP^L$, and is capable of enlarging an image without deteriorating the edge sharpness, the texture or the image quality. Even if there is an unqualified pixel because the measurement of the geometric and optical parameters of the object or the visual environment is incomplete or because the estimation of the illumination equation parameters is incomplete, it is possible to re-estimate parameters by using additional information for increasing the resolution, which are used in the super-resolution process, and to perform an image enlargement using illumination equation parameters. The present invention realizes an image enlargement even if parameters of the low-resolution image cannot all be measured due to some limitations, and can advantageously widen the applicability in terms of the applicable environments, device configurations, etc.

Figure 16:
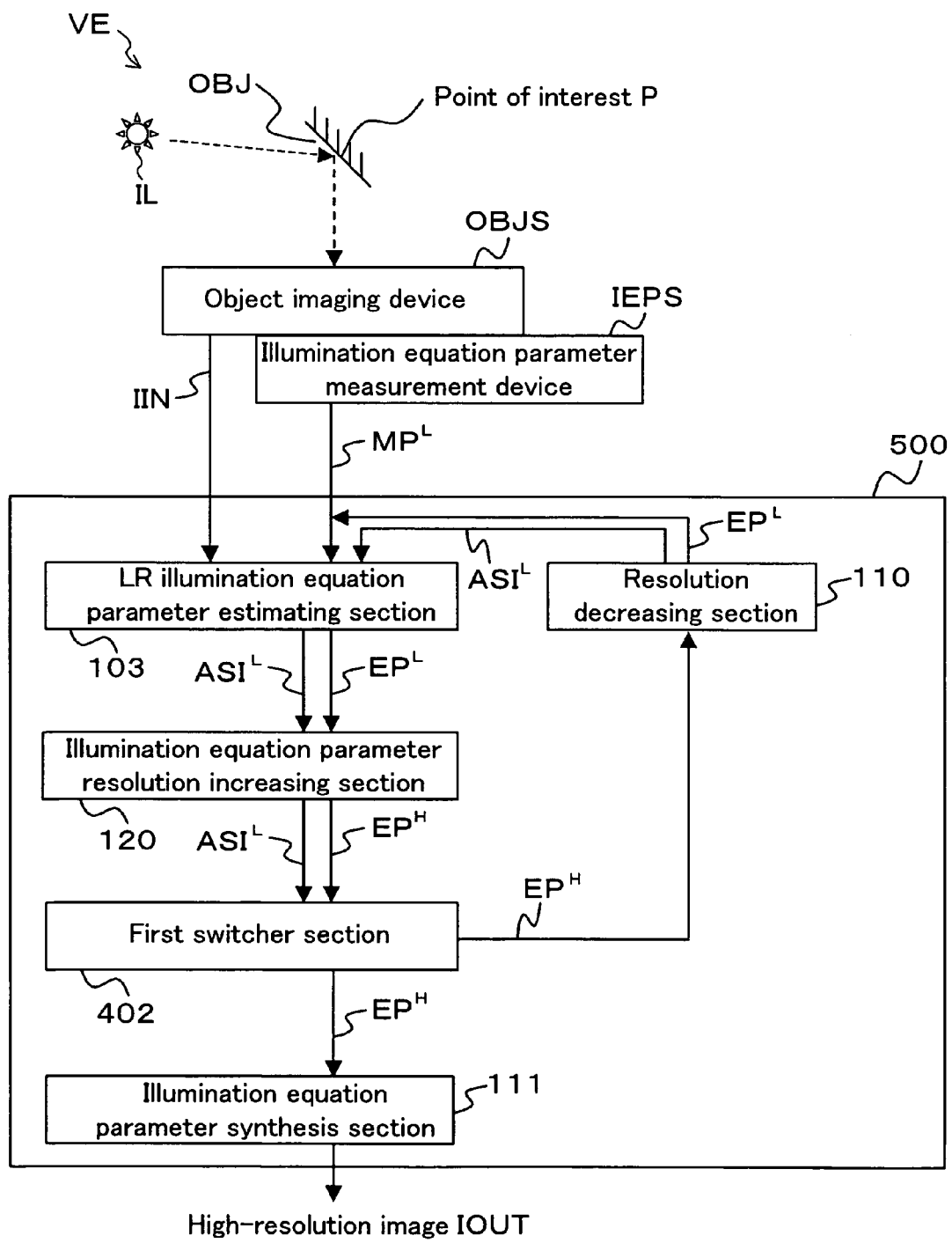
FIG. 16 is a block diagram showing an image processing device that estimates illumination equation parameters only for the low-resolution image.

FIG. 16 is a block diagram showing an image processing device 500 that estimates illumination equation parameters only for the low-resolution image. The image processing device 400 of FIG. 1 estimates, at the HR illumination equation parameter estimating section 109, the illumination equation parameters of remaining unqualified pixels by using the resolution-increased illumination equation parameters. On the other hand, the image processing device 500 of FIG. 16 estimates the illumination equation parameters with only the low-resolution image, without waiting for the estimation of the illumination equation parameters of the unqualified image using the resolution-increased illumination equation parameters. Thus, the second switcher section 403 is no longer needed, and the estimated parameters $EP^H$ are input to the resolution decreasing section 110 and fed back to the LR illumination equation parameter estimating section 103.

As compared with the image processing device 400, the image processing device 500 has a simplified configuration and provides an advantage that the device can be made smaller. Moreover, since the estimation of the illumination equation parameters is performed for the low-resolution image, the number of times the estimation process as shown in FIG. 2, for example, is performed is smaller as compared with a case where a high-resolution image is handled, thus increasing the speed of the estimation process.

However, in order to increase the estimation precision of an unqualified pixel, it is effective to estimate parameters with the high-resolution image, and the image processing device 400, which estimates the illumination equation parameters by using both the low-resolution image and the high-resolution image is more advantageous than the image processing device 500 in that the estimation precision of an unqualified pixel is improved. On the other hand, the image processing device 500 is more advantageous than the image processing device 400 in that the number of times the illumination equation parameters are estimated is smaller. Thus, it is important to selectively use the image processing device 400 and the image processing device 500 so as to make use of their advantages, i.e., the estimation precision and the estimation speed. If it is effective to increase the number of times the resolution-increased illumination equation parameters are fed back to the LR illumination equation parameter estimating section 103, the image processing device 500 should be used. If it is effective to estimate the illumination equation parameters of an unqualified pixel with an increased resolution, the image processing device 400 should be used.

(Embodiment 2)

In the present embodiment, a light source imaging device is used to image the light source, a shape measurement device is used to measure the surface normal vector of the object, a lighting arranged via a polarizing filter is used to illuminate the object with completely-polarized light, and an object imaging device arranged via a polarizing filter is used to capture the reflected light from the object. Then, based on the measured information, the image processing device outputs an image of a higher resolution than that of an object imaging sensor.

Figure 17:
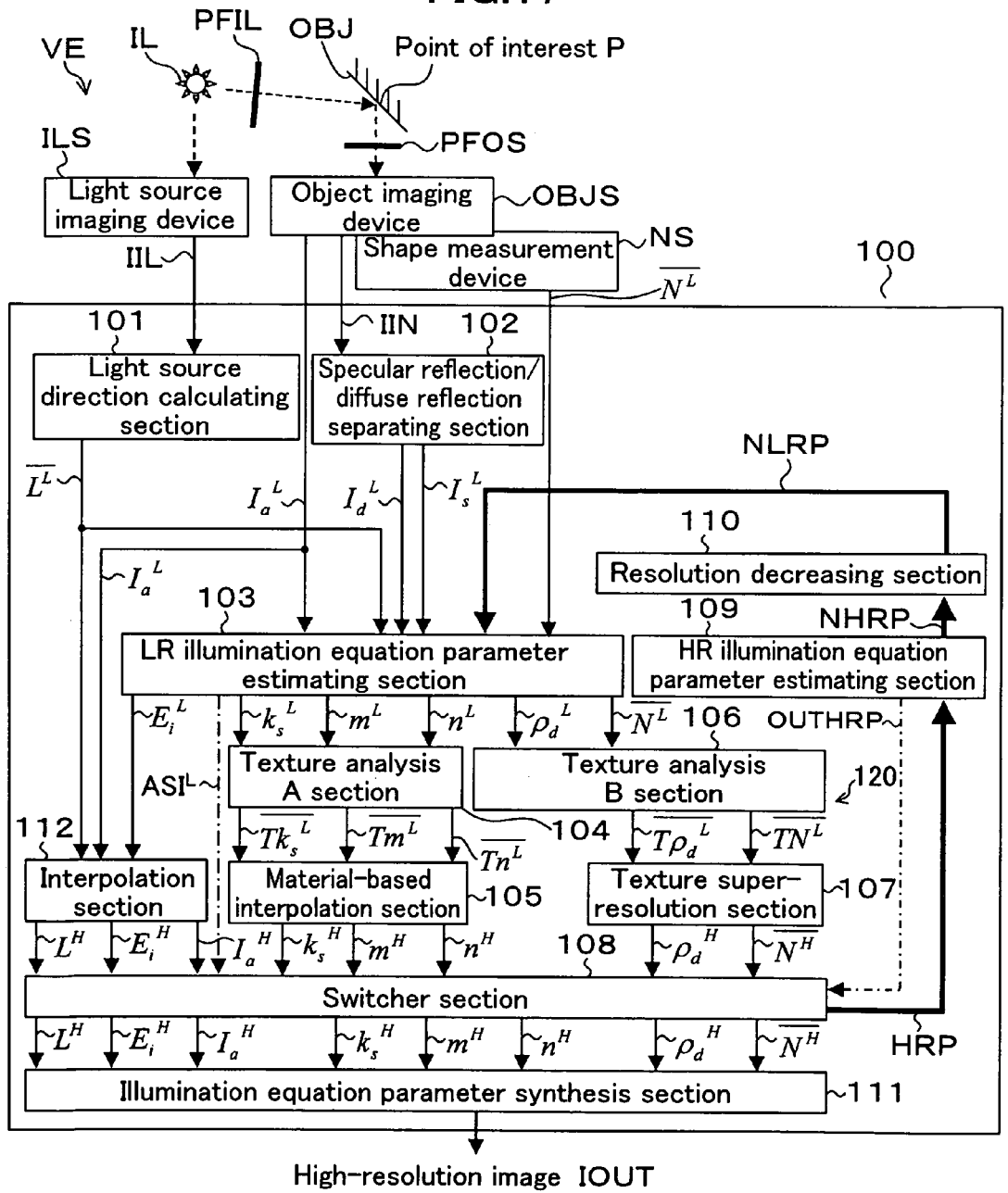
FIG. 17 is a block diagram showing a configuration of an image processing device according to Embodiment 2.

FIG. 17 is a block diagram showing a configuration of an image processing device according to Embodiment 2 of the present invention. An image processing device 100 is a device for enlarging the object image IIN of the object imaging device OBJS, and includes a light source direction calculating section 101, a specular reflection/diffuse reflection separating section 102, the LR illumination equation parameter estimating section 103, the texture analysis A section 104, the material-based interpolation section 105, the texture analysis B section 106, the texture super-resolution section 107, a switcher section 108, the HR illumination equation parameter estimating section 109, the resolution decreasing section 110, the illumination equation parameter synthesis section 111, and the interpolation section 112. The texture analysis A section 104, the material-based interpolation section 105, the texture analysis B section 106, the texture super-resolution section 107 and the interpolation section 112 together form the illumination equation parameter resolution increasing section 120. Like elements to those of the imaging device 400 shown in FIG. 1 are denoted by like reference numerals and will not be further described below.

Signals input to or output from different process sections that are accompanied by a superscript "L" are those of a low resolution, which coincides with the resolution of the object imaging device OBJS. Signals accompanied by a superscript "H" are those of a high resolution, meaning that they have a higher resolution than the object imaging device OBJS as a result of the resolution-increasing process to be described below.

Figure 18:
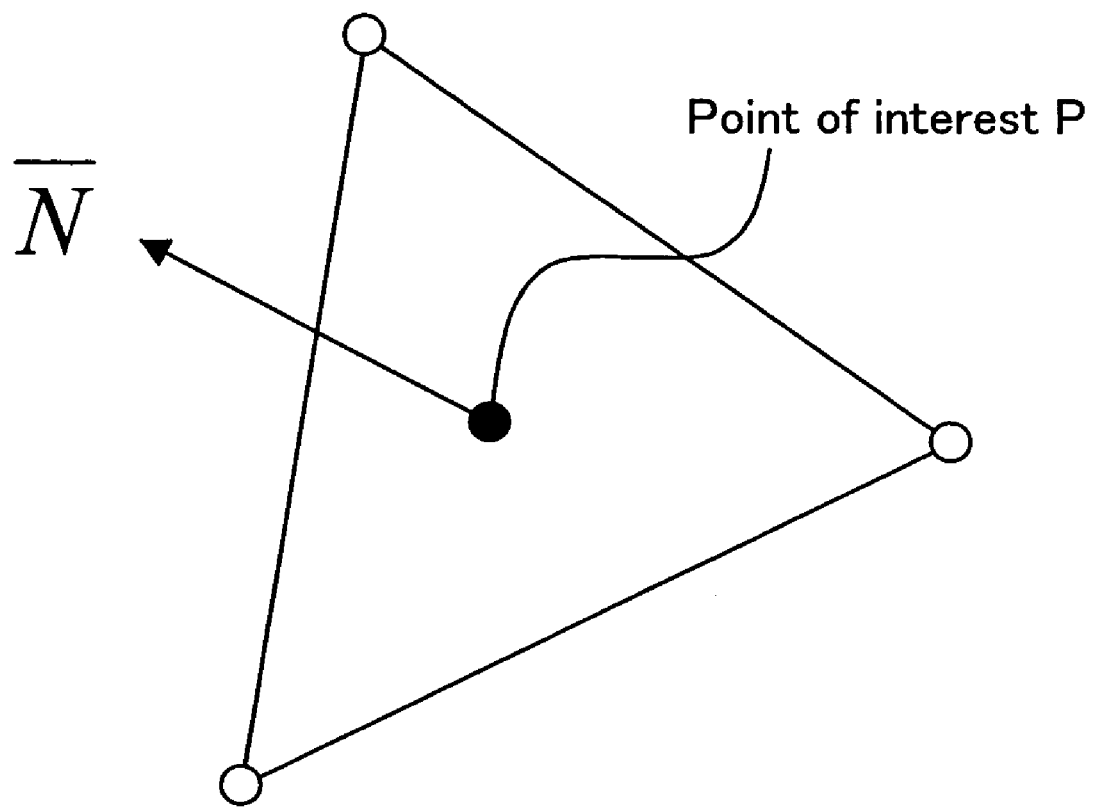
FIG. 18 is a diagram illustrating three points forming such a triangle that the point of interest P is included.
Figure 41:
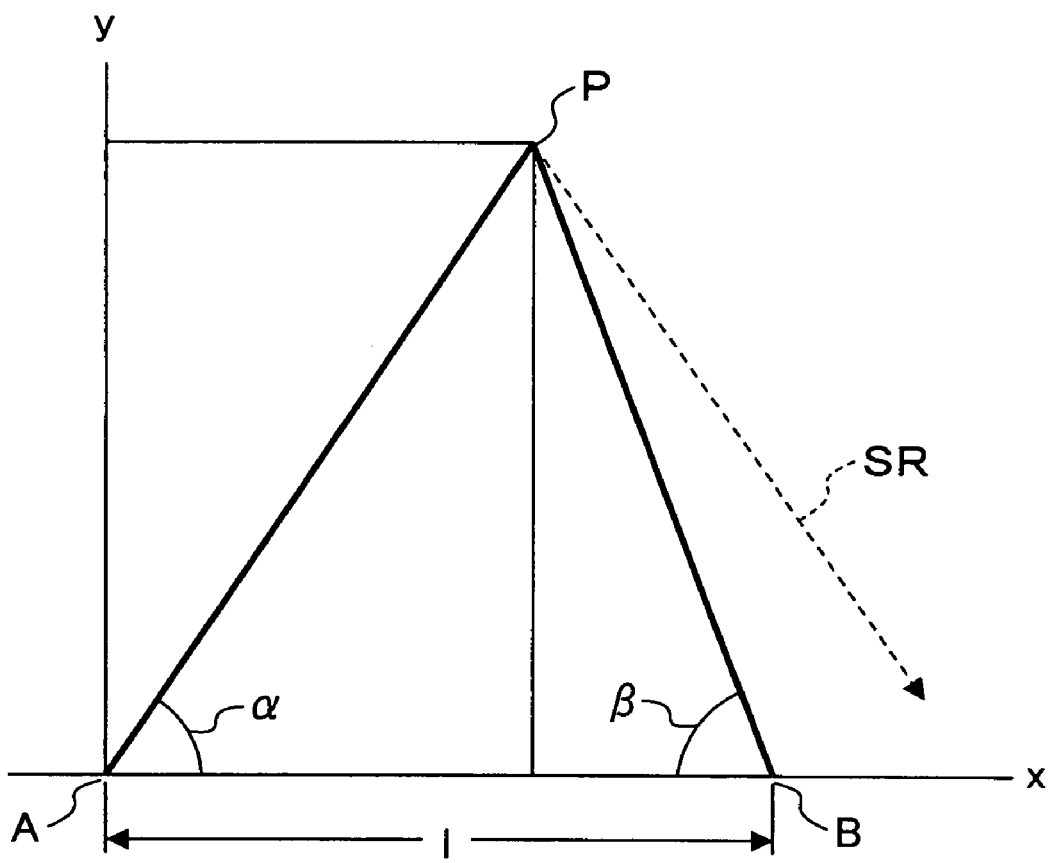
FIG. 41 is a diagram illustrating the principle of triangulation and an example where the surface normal vector cannot be measured.

A light source imaging device ILS images the light source IL in the visual environment VE, and inputs the light source image IIL to the image processing device 100. Moreover, the shape measurement device NS measures the shape of the object OBJ, and inputs the surface normal vector $N^L$ to the image processing device 100. The shape measurement device NS measures the three-dimensional positions of three points forming a triangle including the point of interest P therein as shown in FIG. 18 based on the principle of triangulation as shown in FIG. 41, and determines a vector having a length of 1 that is orthogonal to the plane of the triangle as the surface normal vector $N^L$. The shape measurement device NS is installed at substantially the same position as the object imaging device OBJS, and it is assumed that the optical axes of the two devices approximately coincide with each other. Note that Ia in (Expression 1) being the ambient light component is measured before image-capturing. As can be seen from (Expression 1), Iv=Ia holds if the illuminance Ei of the lighting is set to 0, whereby the ambient light luminance Ia can be measured. Thus, the ambient light luminance Ia can be measured by turning off, shading or removing the lighting IL illuminating the point of interest P.

The light source direction calculating section 101 calculates the three-dimensional position of the light source IL from the light source image IIL. It is assumed that light rays from the light source IL are all parallel, and the direction of the light source can be represented by a single vector. FIG. 19(a) shows the positional relationship between the light source IL and the light source image IIL. Consider a case where the position of the light source IL moves along the curved line LT. Light from the light source IL moving from the position PS1 to the position PS5 on the curved line LT enters an imaging sensor 403 of the light source imaging device ILS and is recorded from the position PX1 to the position PX5 on the straight line ST. A method for obtaining the light source vector L2 will now be described, in a case where the light source IL is at the position PS2, and where θ denotes the angle between the straight line ST and the x axis, φ denotes the angle between the straight line ST and the light source vector L2. FIG. 19(b) shows the imaging sensor 403 of FIG. 19(a) as viewed in the z axis, wherein d denotes the distance between the position PX1 and the coordinate origin O, and r denotes the distance between the position PX2 and the coordinate origin O. The position PX1 is at φ=0 and the coordinate origin O is at φ=90 degrees, and the light source position and the position of the imaging sensor 403 therebetween are linearly disposed. Thus, the angle φ of the position PX2 is given as follows.

[Formula 7]

$$\phi = \frac{r\pi}{2d} \quad \text{(Expression 4)}$$

Assuming that the pixel positions of the position PX1, the position PX2 and the coordinate origin O on the light source image are $(x_{L1}, y_{L1})$, $(x_{L2}, y_{L2})$ and $(x_O, y_O)$, respectively, the distance d between the position PX1 and the coordinate origin O is given as follows.

[Formula 8]

$$d = \sqrt{(x_{L1}-x_O)^2 + (y_{L1}-y_O)^2} \quad \text{(Expression 5)}$$

The distance r between the position PX2 and the coordinate origin O is given as follows.

[Formula 9]

$$r = \sqrt{(x_{L2}-x_O)^2 + (y_{L2}-y_O)^2} \quad \text{(Expression 6)}$$

FIG. 19(c) shows a triangle obtained by drawing an intersecting line LT extending in the z axis direction from the position PX2 and intersecting with the light source vector L2, wherein assuming that the length of the intersecting line LT is $z_{L2}$, the following expression is obtained.

[Formula 10]

$$z_{L2} = r\tan\left(\frac{r\pi}{2d}\right) \quad \text{(Expression 7)}$$

If the light source vector is defined as a unit vector having a length of 1, the following holds true.

[Formula 11]

$$\left[\frac{x_{L2}}{\sqrt{r^2+z_{L2}^2}} \quad \frac{y_{L2}}{\sqrt{r^2+z_{L2}^2}} \quad \frac{z_{L2}}{\sqrt{r^2+z_{L2}^2}}\right] = $$

$$\left[\frac{x_{L2}}{r\sqrt{1+\tan^2\left(\frac{r\pi}{2d}\right)}} \quad \frac{y_{L2}}{r\sqrt{1+\tan^2\left(\frac{r\pi}{2d}\right)}} \quad \frac{z_{L2}}{r\sqrt{1+\tan^2\left(\frac{r\pi}{2d}\right)}}\right]$$

(Expression 8)

The above calculation is derived from a three-dimensional coordinate system including the optical axis (z axis) of the light source imaging device ILS, and the x axis and the y axis on the imaging sensor 403, and it is needed to be converted to the three-dimensional coordinate system of the object imaging device OBJS.

Figure 20:
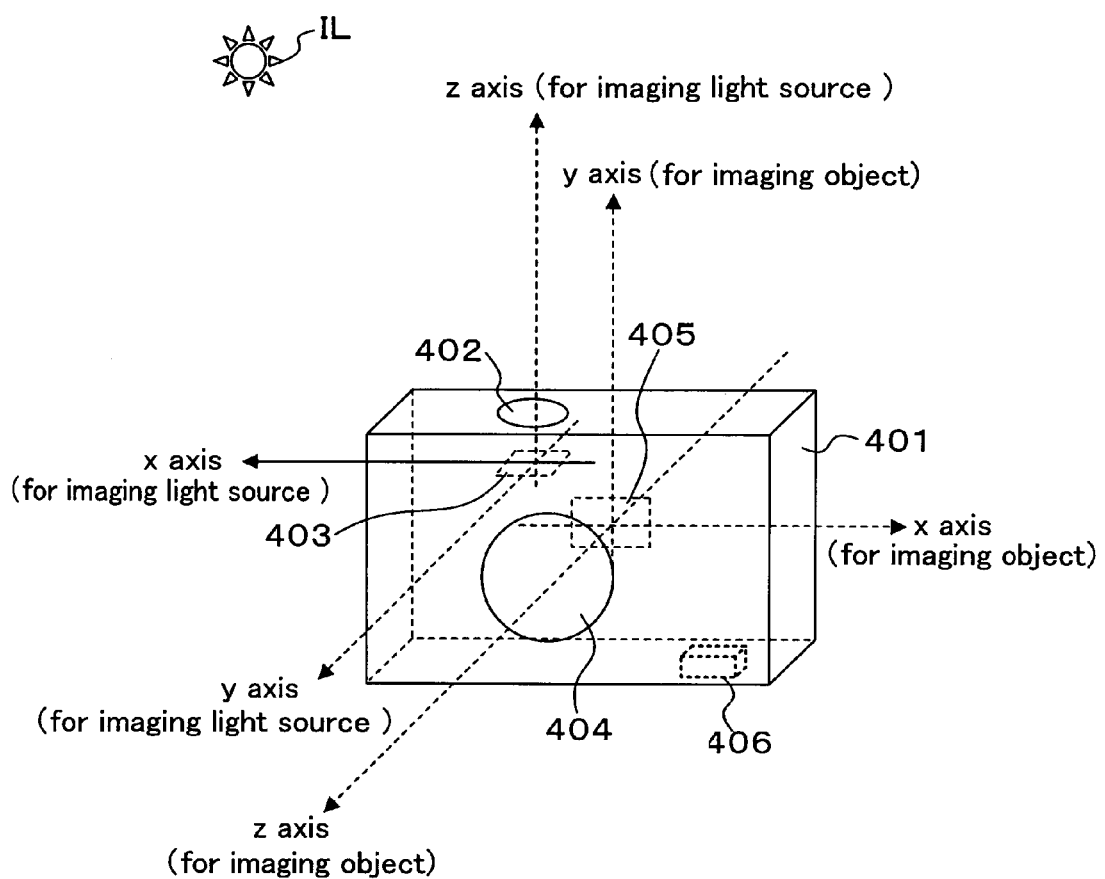
FIG. 20 is a diagram illustrating an example of a camera including an object imaging device and a light source imaging device put into a single casing.

FIG. 20 is a diagram illustrating an example of a camera including the object imaging device OBJS and the light source imaging device ILS put into a single casing. A camera 401 includes a light source imaging lens 402 and a light source imaging device 403 as the light source imaging device ILS, and includes an object imaging lens 404 and an object imaging device 405 as the object imaging device OBJS. Since the optical axis (z axis) of the object imaging device OBJS is directed to the object direction in a typical application of the camera 401, the light source imaging device ILS is preferably attached facing upward in order to capture the light source IL with the light source imaging device ILS. The conversion from the coordinate system of the light source imaging device ILS to the coordinate system of the object imaging device OBJS can be realized by converting each of the x axis, the y axis and the z axis. The vector $(x_{light,x}, y_{light,x}, z_{light,x})_{object}$ is a vector representing the x axis of the xyz three-dimensional coordinate system of the light source imaging device 403 in the xyz three-dimensional coordinate system of the object imaging device 405. The vector $(x_{light,x}, y_{right,x}, z_{light,x})_{light}$ is a vector representing the x axis of the xyz three-dimensional coordinate system of the light source imaging device 403 in the xyz three-dimensional coordinate system of the light source imaging device 403. Defining the y axis and the z axis, as is the x axis, the vector of each axis can be expressed as follows in relation to a 3×3 matrix M.

[Formula 12]

$$\begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{object} = \quad \text{(Expression 9)}$$

$$M \begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{light}$$

Solving this with respect to the matrix M yields the following.

[Formula 13]

$$M = \begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{object} \quad \text{(Expression 10)}$$

$$\begin{pmatrix} x_{light,x} & x_{light,y} & x_{light,z} \\ y_{light,x} & y_{light,y} & y_{light,z} \\ z_{light,x} & z_{light,y} & z_{light,z} \end{pmatrix}_{light}^{-1}$$

Figure 19:
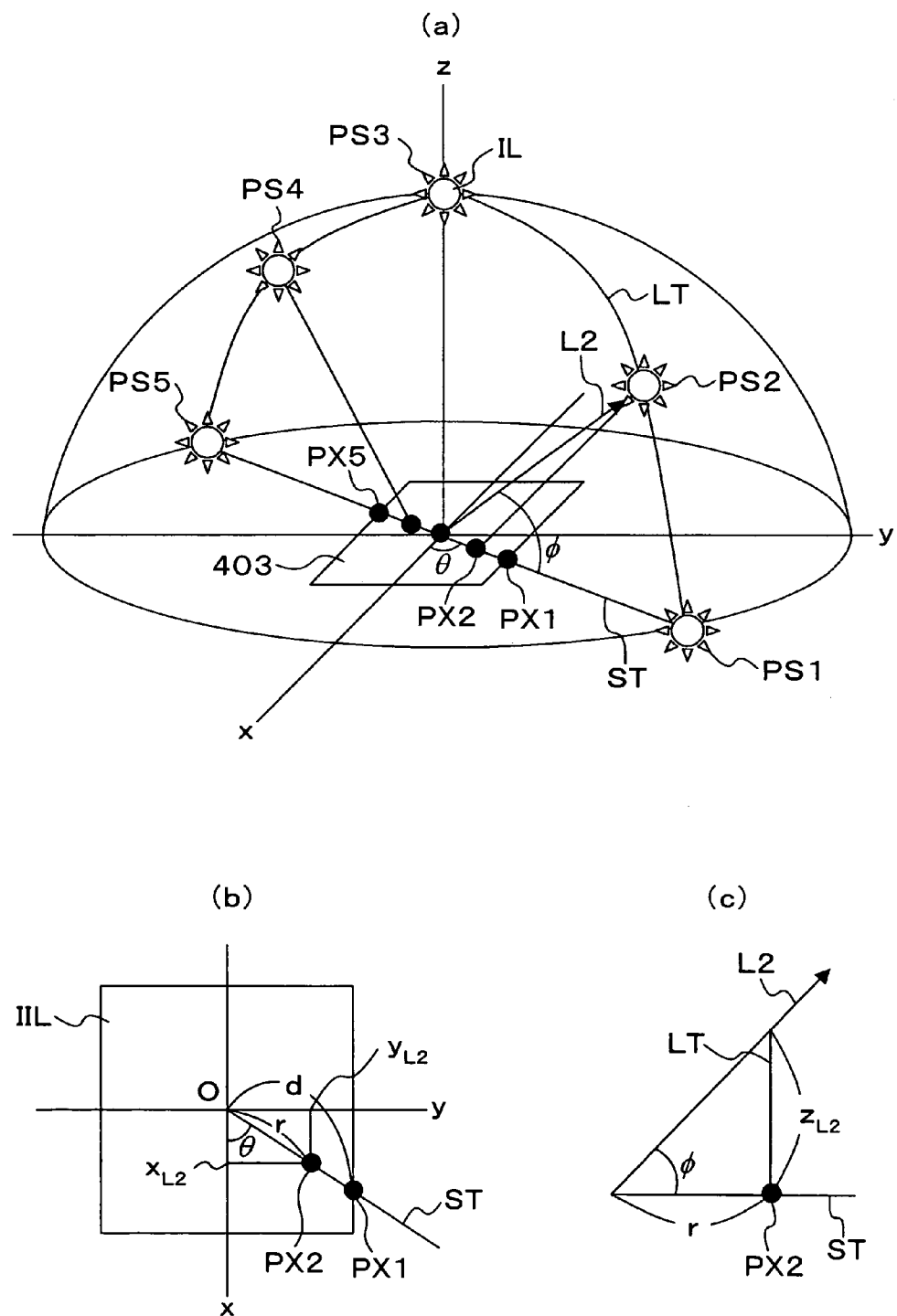
FIG. 19 is a diagram illustrating a method for calculating a three-dimensional position of a light source from a light source image.

By applying the matrix M to (Expression 9), the light source vector L2 of FIG. 19 is converted from the xyz three-dimensional coordinate system of the light source imaging device 403 to the xyz three-dimensional coordinate system of the object imaging device 405.

While the light source imaging device ILS is used to capture an image facing upward since the light source is located above the camera 401 in many cases, if the light source IL cannot be captured within the angle of view of the light source imaging device ILS because the angle of view is insufficient, the orientation of the camera 401 is changed so as to capture the light source IL within the angle of view. Since it is necessary to measure the change in the direction of the camera 401, a three-dimensional orientation sensor 406 (using an acceleration sensor, or the like) is provided in the camera 401, wherein the three-dimensional movement of the xyz three-dimensional coordinate axis of the light source imaging device 403 may be obtained from the three-dimensional orientation sensor 406 and subjected to a coordinate conversion in the same manner as (Expression 10). In a case where the light source IL and the object OBJ can be captured together within the angle of view by using a wide-angle lens whose angle of view is about 180 degrees, the light source imaging device ILS and the object imaging device OBJS can be put together into a lens and an imaging device.

The configuration of a folding-type mobile telephone is also effective as an alternative method for changing the direction of the camera. Specifically, as shown in FIG. 21, a mobile telephone 601 includes an object-side camera 602 (a camera for imaging an object in front of the user of the mobile telephone 601) and a user-side camera 603 (a camera for imaging the user of the mobile telephone 601), wherein the object-side camera 602 substantially changes its direction when a folded display section 604 is opened. Specifically, it captures above the mobile telephone 601 when the angle of opening DAG of the display section 604 is small as shown in (a), it captures the front side of the user of the mobile telephone 601 when the angle of opening DAG of the display section 604 is large as shown in (c), and it captures in an intermediate direction between above the mobile telephone 601 and the front side of the user of the mobile telephone 601 when the angle of opening DAG of the display section 604 is intermediate as shown in (b). In view of this, the angle of opening DAG of the display section 604 is detected by an angular sensor 606 provided in a hinge 605 to calculate the direction of the object-side camera 602. In the xyz three-dimensional coordinate system, where the coordinate origin is the focal point position of the user-side camera 603, for example, captured images of two cameras can be handled in the same xyz three-dimensional coordinate system based on (Expression 10) from the relationship with respect to the focal point position of the object-side camera 602, which is dictated by the structure of the mobile telephone 601. It is clear that the user-side camera 603 can also be used for imaging the light source. Thus, the light source vector $L_L$ can be calculated by the light source direction calculating section 101.

Figure 22:
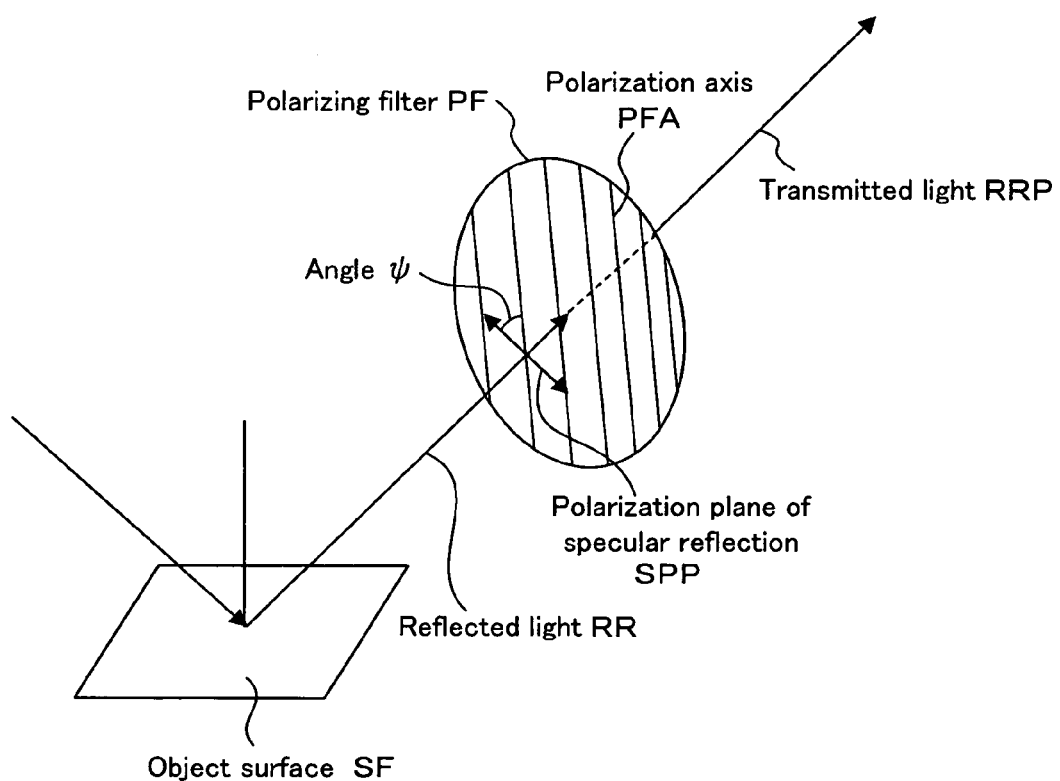
FIG. 22 is a diagram showing a method for observing reflected light through a polarizing filter.

The specular reflection/diffuse reflection separating section 102 separates the object image IIN into the specular reflection image $Is^L$ and the diffuse reflection image $Id_L$ by using the polarization characteristics. When light is reflected on the object surface, the reflected light is polarized because the Fresnel coefficient typically differs between an electric field component parallel to the light incident/reflecting plane and an electric field component perpendicular thereto. Therefore, while a specular reflection component is typically polarized, a diffuse reflection is an irregular reflection and does not therefore have a polarized property. As shown in FIG. 22, when the reflected light RR is observed through a polarizing filter PF, the intensity of the transmitted light RRP is the intensity of a component of the reflected light RR that is parallel to the polarization axis PFA of the polarizing filter PF. Thus, when the specular reflection component from the object surface SF is observed while rotating the polarizing filter PF, the intensity of the transmitted light RRP varies depending on the angle ψ between the polarization axis PFA of the polarizing filter PF and the polarization plane SPP of the specular reflection, and can be given as follows.

[Formula 14]

$$L(\psi) = L_d + \underbrace{\frac{1}{4}\{F_V(\theta'_i) + F_P(\theta'_i) - (F_V(\theta'_i) - F_P(\theta'_i))\cos 2\psi\}}_{L_s} \quad \text{(Expression 11)}$$

Herein, $L_d$ is the diffuse reflection component luminance, $L_s$ is the specular reflection component luminance, $\theta'_i$ is the angle of incidence of light at the minute reflective surface, $F_P$ is the Fresnel coefficient of the parallel electric field component with respect to an insulator, and $F_V$ is the Fresnel coefficient of the perpendicular electric field component with respect to an insulator.

Figure 23:
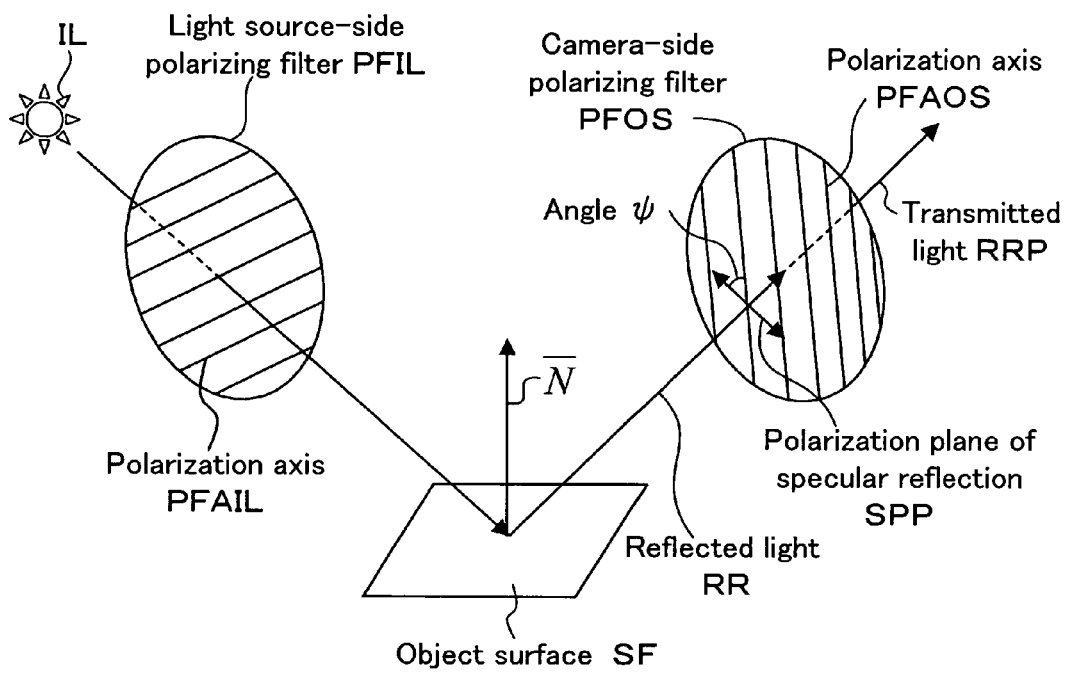
FIG. 23 is a diagram illustrating a method for capturing a specular reflection image by using polarization characteristics.
Figure 24:
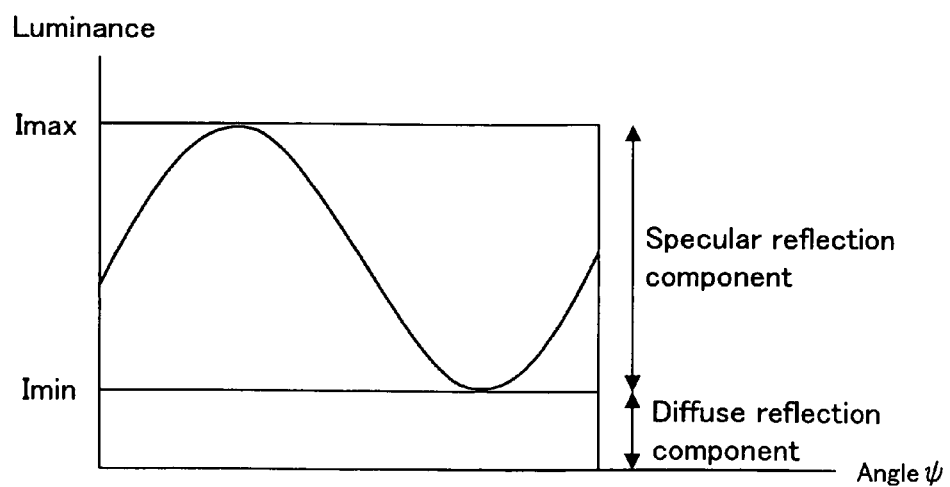
FIG. 24 is a diagram showing a transition of the luminance of transmitted light when a camera-side polarizing filter is rotated.

Based on the polarization characteristics as described above, if linearly-polarized light is created by using a light source-side polarizing filter PFIL also on the side of the light source IL as shown in FIG. 23, the specular reflection image IS can be captured by detecting the maximum luminance Imax and the minimum luminance Imin as the angle ψ changes. FIG. 24 shows the change in the luminance of the transmitted light RRP when a camera-side polarizing filter PFOS is rotated. Since diffuse reflection is unpolarized, only portions coinciding with the polarization axis PFAOS are transmitted to thereby give a constant luminance value Imin independent of the angle ψ. On the other hand, since specular reflection is reflected as it is without changing its polarization, the luminance value of the specular reflection component of the reflected light RR changes in a sine wave pattern according to the angle difference between the polarization axis PFAOS of the camera-side polarizing filter PFOS and the polarization axis PFAIL of the light source-side polarizing filter PFIL. When the angle difference between the polarization axis PFAOS and the polarization axis PFAIL is 0, the maximum luminance Imax is obtained. Taking into consideration the fact that the luminance drops by half through a polarizing filter, the specular reflection image Is and the diffuse reflection image Id are obtained as follows.

[Formula 15]

$$I_s = 2(I_{max} - I_{min}) \quad \text{(Expression 12)}$$

[Formula 16]

$$I_d = 2I_{min} \quad \text{(Expression 13)}$$

The LR illumination equation parameter estimating section 103 estimates the illuminance $Ei^L$ at the point of interest P, the specular reflection component ratio $ks^L$, the object surface roughness $m^L$, the refractive index $n^L$ and the diffuse reflection component bidirectional reflectance $\rho d^L$ from the light source vector $L^L$, the specular reflection image $Is^L$, the diffuse reflection image $Id^L$, the surface normal vector $N^L$ and the ambient light luminance $Ia^L$ based on the illumination equation of (Expression 1), for example. Geometric information such as the light source vector $L^L$ and the surface normal vector $N^L$ are described in the XYZ coordinate system of the object imaging device OBJS as described above with reference to FIG. 20. Therefore, the viewpoint vector $V^L$ coincides with the z axis of the object imaging device OBJS, and does not need to be measured.

While the present invention provides no limitations on the estimation method and any method may be used, a simplex method described above with reference to FIG. 2 is herein used to estimate optical parameters relating to the specular reflection component, i.e., the illuminance $Ei^L$, the specular reflection component ratio $ks^L$, the object surface roughness $m^L$ and the refractive index $n^L$. Then, the diffuse reflection component bidirectional reflectance $\rho d^L$ is calculated by using the illuminance $Ei^L$, the specular reflection component ratio $ks^L$ and the diffuse reflection image $Id^L$, which have been estimated. Similarly, for the illumination equation, the present invention provides no limitations but any model can be used.

As described above, a problem may occur in the measurement by the light source imaging device ILS or the shape measurement device NS, and an unqualified pixel may occur because of the light source vector $L^L$ or the surface normal vector $N^L$. For example, the light source imaging device ILS may have an insufficient sensitivity (where the sensitivity for dark portions is insufficient, and no output is detected from the imaging sensor) and an insufficient dynamic range (where the highlight exceeds the sensitivity range and is clipped at the maximum output), thus failing to capture the light source image IIL. For example, a problem in the measurement by the shape measurement device NS may occur when, as described above with reference to FIG. 41, laser light output from the point A is regularly reflected in the direction SR at the point P, whereby the camera installed at the point B cannot capture the laser light, or when the reflectance at the point P is low (i.e., black), whereby the camera installed at the point B cannot capture the laser light.

As described above, if a problem occurs in the measurement of the light source vector $L^L$ and the surface normal vector $N^L$, which are necessary when increasing the resolution of the object image IIN, it influences the estimation precision at the LR illumination equation parameter estimating section 103, thus failing to satisfy a predetermined estimation precision. Such problems in the measurement or in the estimation of the illumination equation parameters, etc., are in all determined by comparing the error evaluation function with a threshold. The result of distinction between a qualified pixel and an unqualified pixel is output to the switcher section 108 as the qualification indicating image $ASI^L$, as in Embodiment 1. In order to improve the estimation precision for unqualified pixels, it is necessary to add new information and then again estimate the unqualified pixels. In view of this, a database-based type process is used as the super-resolution process, wherein a super-resolution process is performed with high-resolution parameters from the database, and a parameter estimation is performed again while using high-resolution parameters as new additional information. Specifically, the super-resolution process is performed by the material-based interpolation section 105 and the texture super-resolution section 107, but the texture super-resolution section 107 obtains high-resolution information by referring to the database as described above. The obtained high-resolution information is new additional information that cannot be obtained from the object imaging device OBJS or the shape measurement device NS and, therefore, the possibility of improving the estimation precision for an unqualified pixel is increased by performing the parameter estimation again after adding the parameters, which have been subjected to the super-resolution process by the texture super-resolution section 107.

The switcher section 108 refers to the qualification indicating image $ASI^L$ to detect the presence/absence of an unqualified pixel and switch the output destination of the resolution-increased parameters from one to another. If all the pixels are qualified pixels, it means that the calculation of the high-resolution image has been completed. If an unqualified pixel is detected, an unqualified pixel is estimated again by the LR illumination equation parameter estimating section 103 via the HR illumination equation parameter estimating section 109 and the resolution decreasing section 110 to perform the parameter estimation again. All the parameters and the qualification indicating image $ASI^L$ are output to the HR illumination equation parameter estimating section 109 as a group of high-resolution parameters HRP.

If all pixels have become qualified pixels in the HR illumination equation parameter estimating section 109, the parameters are returned to the switcher section 108 as output high-resolution parameters OUTHRP and are output to the illumination equation parameter synthesis section 111. If it is determined that there remains an unqualified pixel as a result of the estimation by the HR illumination equation parameter estimating section 109, the results are returned to the LR illumination equation parameter estimating section 103 to perform the parameter estimation process again with a low-resolution image. For this, it is necessary to decrease the resolution of the resolution-increased parameters. Therefore, the high-resolution parameters estimated by the HR illumination equation parameter estimating section 109 are output to the resolution decreasing section 110 as unknown high-resolution parameters NHRP, where a resolution-decreasing process is performed, and are then input to the LR illumination equation parameter estimating section 103.

The resolution decreasing section 110 performs the resolution-decreasing process on the unknown high-resolution parameters NHRP to output the results as the unknown low-resolution parameters NLRP. The specific method of the resolution-decreasing process is as described above in Embodiment 1.

There may be a case where no matter how many times the parameter estimation is repeated by the LR illumination equation parameter estimating section 103, the threshold t does not decrease to a predetermined value and the estimation precision does not reach the target level. This means that there are too many unqualified pixels for the target estimation level. In such a case, the process needs to be ended by lowering the estimation precision. In view of this, the switcher section 108 is provided with a counter, wherein when the parameter estimation is repeated more than a predetermined number of times, the process stops feeding back to the LR illumination equation parameter estimating section 103, and ends the resolution-increasing process by outputting the parameters to the illumination equation parameter synthesis section 111.

Figure 25:
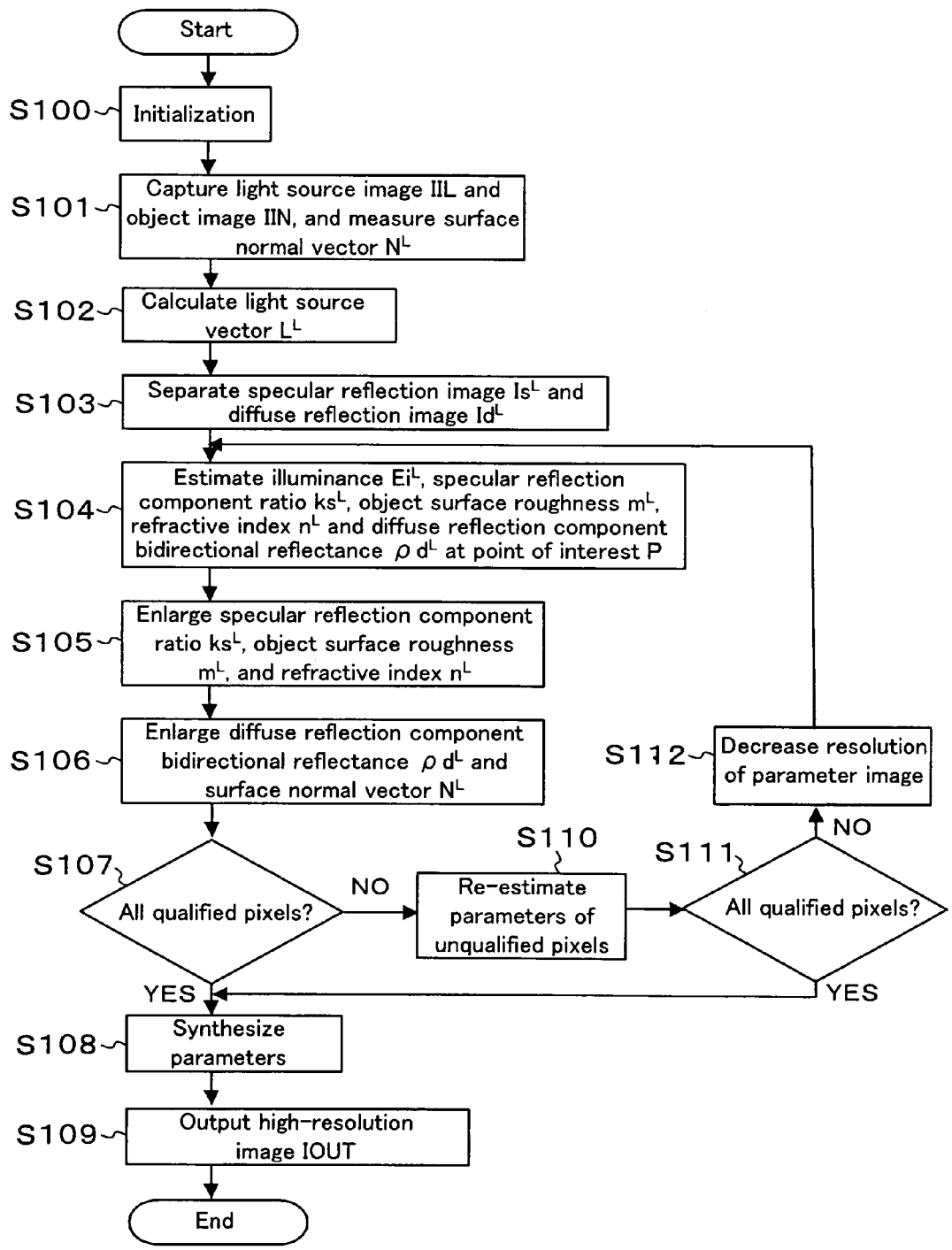
FIG. 25 shows an operation flow of an image processing device according to Embodiment 2.

FIG. 25 shows an operation flow of the block diagram of the image processing device 100 shown in FIG. 17. Step S100 measures the ambient light Ia and sets initial values, threshold values, the branching condition, etc., for use in the estimation process performed by the LR illumination equation parameter estimating section 103 or the HR illumination equation parameter estimating section 109, as an initialization process. In order to detect unqualified pixels, all pixel values of all the parameter images are initialized to 255. In step S101, the light source imaging device ILS images the light source IL to obtain the light source image IIL, the object imaging device OBJS images the object OBJ to obtain the object image IIN, and the shape measurement device NS measures the surface normal vector $N^L$ of the object OBJ. In step S102, the light source direction calculating section 101 calculates the light source vector $L^L$ from the light source image IIL.

Step S103 divides the object image IIN into the specular reflection image $Is^L$ and the diffuse reflection image $Id^L$. Step S104 estimates the illuminance $Ei^L$, the specular reflection component ratio $ks^L$, the object surface roughness $m^L$, the refractive index $n^L$ and the diffuse reflection component bidirectional reflectance $\rho d^L$ at the point of interest P from the light source vector $L^L$, the specular reflection image $Is^L$ and the diffuse reflection image $Id^L$. In step S105, the material-based interpolation section 105 enlarges, via the texture analysis A section 104, the specular reflection component ratio $ks^L$, the object surface roughness $m^L$ and the refractive index $n^L$ into the specular reflection component ratio $ks^H$, the object surface roughness $m^H$ and the refractive index $n^H$. In step S106, the texture super-resolution section 107 enlarges, via the texture analysis B section 106, the diffuse reflection component bidirectional reflectance $\rho d^L$ and the surface normal vector $N^L$ into the diffuse reflection component bidirectional reflectance $\rho d^H$ and the surface normal vector $N^H$.

Step S107 checks the presence/absence of an unqualified pixel. If all pixels of all the parameter images are qualified pixels, the process proceeds to step S108, where a parameter synthesis process is performed in step S108 and the high-resolution image IOUT is output in step S109. If an unqualified pixel is detected in step S107, the process proceeds to step S110, and an unqualified pixel is estimated in step S110 by using the resolution-increased illumination equation parameters. Step S111 again checks the presence/absence of an unqualified pixel. If all pixels of all the parameter images are qualified pixels, the process proceeds to step S108, and the high-resolution image IOUT is output in step S109. If an unqualified pixel is detected in step S111, the process proceeds to step S112, the resolution of the high-resolution parameter image is decreased in step S112, and the process returns to step S104 to re-estimate an unqualified pixel with the low-resolution parameter image.

Thus, the image processing device 100 can output an image of a higher resolution than that of the object imaging sensor based on the light source image IIL, the object image IIN and the surface normal vector $N^L$, and is capable of enlarging an image without deteriorating the edge sharpness, the texture or the image quality. Even if there is an unqualified pixel because the measurement of the geometric and optical parameters of the object or the visual environment is incomplete or because the estimation of the illumination equation parameters is incomplete, it is possible to estimate parameters by using additional information for increasing the resolution, which are used in the super-resolution process, and to perform an image enlargement using illumination equation parameters. For example, when imaging a quickly-moving object, it is necessary to move the object imaging device and the shape measurement device in hand, thereby naturally imposing size or weight limitations. There may be a case where ideal design conditions in terms of the device performance cannot be ensured for such reasons, thereby resulting in an unqualified pixel. Where the object imaging device and the shape measurement device are used in a battery-powered application, there may be a case where ideal design conditions in terms of the device performance cannot be ensured as a result of ensuring an operation over a predetermined length of time, thereby resulting in an unqualified pixel. Similarly, there may be limitations imposed by the price settings. The present invention realizes an image enlargement even if parameters of the low-resolution image cannot all be measured due to such limitations, and can advantageously widen the applicability in terms of the applicable environments, device configurations, etc.

(Embodiment 3)

In the present embodiment, a light source imaging device is used to image the light source, a lighting arranged via a polarizing filter is used to illuminate the object with completely-polarized light, and an object imaging device arranged via a polarizing filter is used to capture the reflected light from the object. Then, based on the measured information, the image processing device outputs an image of a higher resolution than that of an object imaging sensor.

Figure 26:
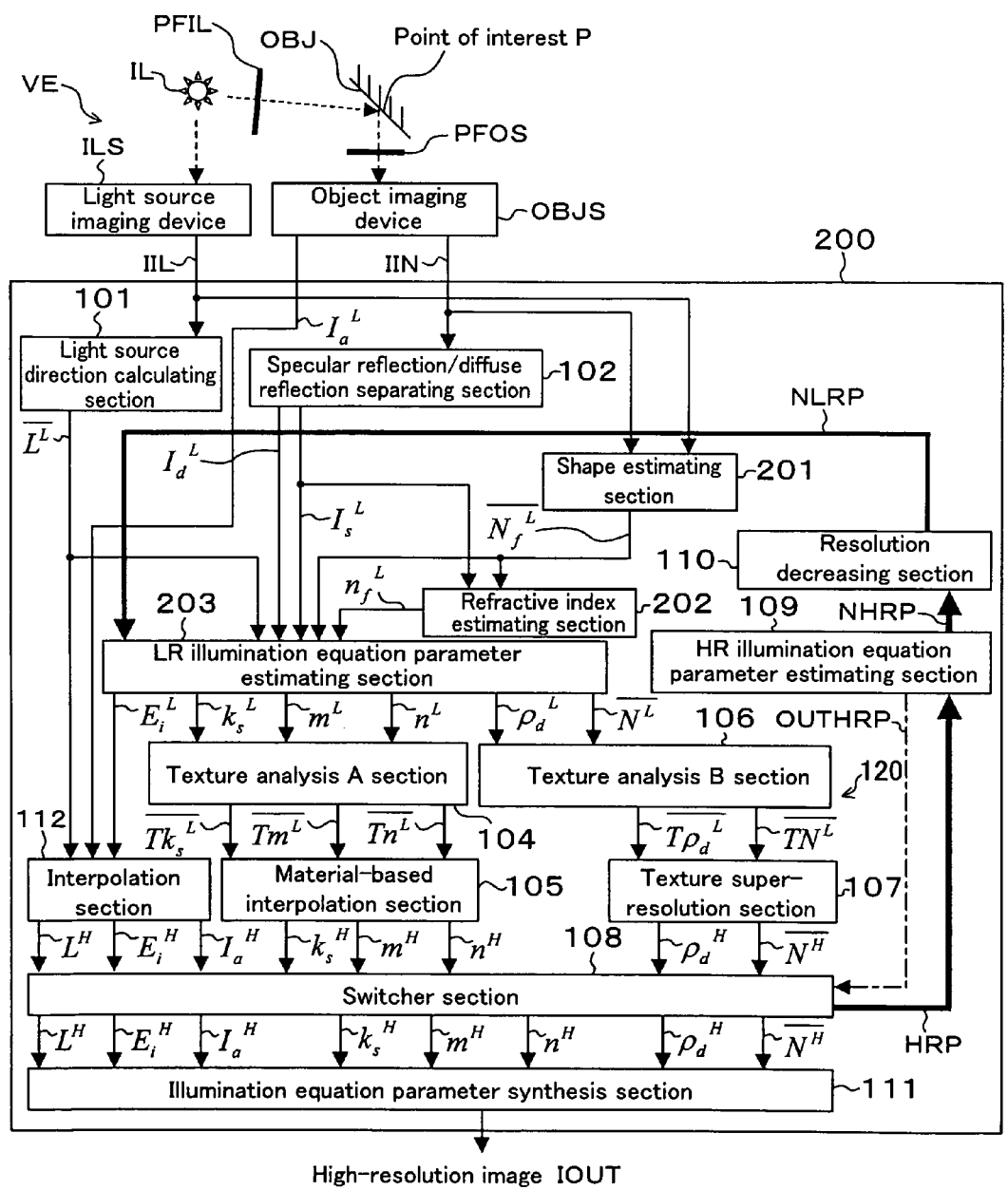
FIG. 26 is a block diagram showing a configuration of an image processing device according to Embodiment 3 of the present invention.

FIG. 26 is a block diagram showing a configuration of an image processing device according to Embodiment 3 of the present invention. Like elements to those of the image processing device shown in FIG. 17 are denoted by like reference numerals and will not be further described below. An image processing device 200 is a device for enlarging the object image IIN of the object imaging device OBJS, and includes the light source direction calculating section 101, the specular reflection/diffuse reflection separating section 102, an LR illumination equation parameter estimating section 203, the texture analysis A section 104, the material-based interpolation section 105, the texture analysis B section 106, the texture super-resolution section 107, the switcher section 108, the HR illumination equation parameter estimating section 109, the resolution decreasing section 110, the illumination equation parameter synthesis section 111, the interpolation section 112, a shape estimating section 201, and a refractive index estimating section 202.

Figure 27:
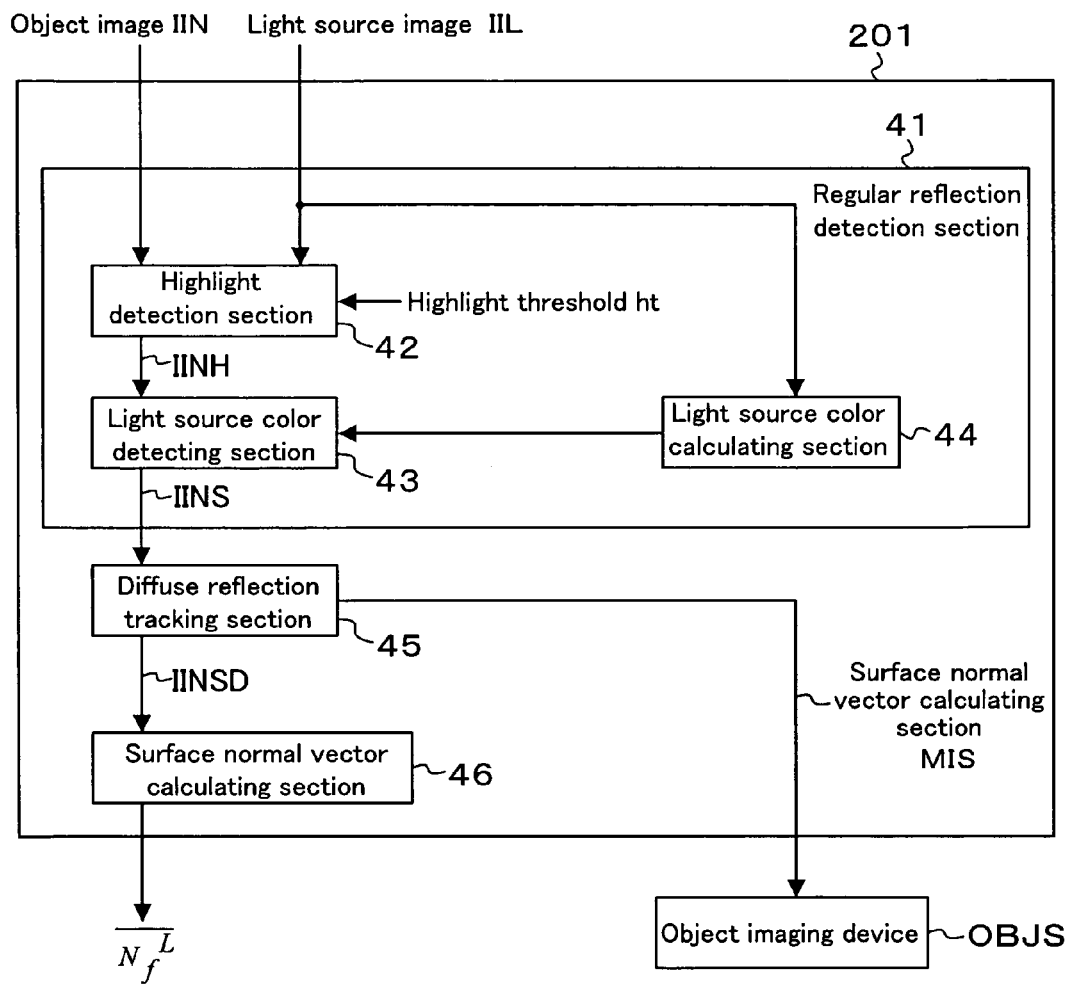
FIG. 27 is a block diagram showing an inside of a shape estimating section.

The shape estimating section 201 estimates the surface normal vector (the regular reflection surface normal vector $Nf^L$) of the object OBJ from the object image IIN and the light source image IIL. FIG. 27 is a block diagram showing the inside of the shape estimating section 201.

A regular reflection detection section 41 detects a pixel from the object image IIN where the light from the light source IL is regularly reflected. Since a regular reflection portion is reflecting the light from the light source while retaining the intensity and the color, a regularly-reflecting pixel can be identified by detecting a brightest pixel in the image that has the color of the light source. In view of this, a highlight detection section 42 of the regular reflection detection section 41 compares all the pixels in the object image IIN with the highlight threshold ht to output those exceeding the highlight threshold ht as the object highlight images IINH. Then, a light source color detecting section 43 detects those of the object highlight images IINH that have the same color as the light source color to output them as the regularly-reflected object image IINS. While the light source color is calculated by a light source color calculating section 44 from the light source image IIL, any method can be used, e.g., a method in which the average value of the RGB values is calculated only from bright pixels in the light source image IIL.

A diffuse reflection tracking section 45 tracks the pixel determined by the regularly-reflected object image IINS to be a regularly-reflecting pixel to determine to which position the pixel moves in the next object image IIN to be captured. The purpose of this is to estimate the three-dimensional position of the regularly-reflecting pixel by the principle of triangulation shown in FIG. 41 and to calculate the surface normal vector. Specifically, in two dimensions, the position (x, y) of the point of interest P can be calculated if two images, i.e., the image PA obtained by imaging the point of interest P from the point A and the image PB obtained by imaging the point of interest P from the point B, wherein the point of interest P captured in the image PA needs to be detected also on the image PB. This is a problem typically referred to as tracking, and can be done in image processing by detecting, in the image PB, a pixel having the same color as that of the point of interest P in the image PA. Since the color is determined by the diffuse reflection component in illumination equation shown in (Expression 1), the point of interest P is tracked based on the color of the diffuse reflection component of a pixel regularly-reflecting in the regularly-reflected object image IINS. The result of tracking based on the diffuse reflection component is output as a diffuse reflection tracking image IINSD.

Figure 28:
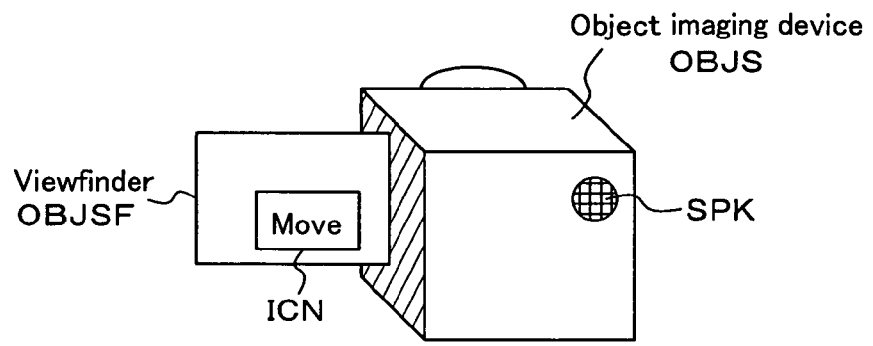
FIG. 28 is a diagram illustrating showing an example of a method for notifying a cameraman of the need for moving the object imaging device.

In order for the point of interest P to move on an image, it is necessary that the relative positional relationship between the object OBJ and the object imaging device OBJS changes. Therefore, where the object OBJ is stationary, it is necessary to move the object imaging device OBJS. In a case where the cameraman does not move the object imaging device OBJS, and the diffuse reflection tracking section 45 cannot therefore detect a movement, it is preferred that the cameraman is notified of the need to move the object imaging device OBJS. For example, as shown in FIG. 28, a notification icon ICN may be displayed on a viewfinder OBJSF of the object imaging device OBJS, or a notification sound may be output from a speaker SPK. For this notification, the diffuse reflection tracking section 45 outputs the motion information to the object imaging device OBJS as a motion information signal MIS. In a case where it is guaranteed that the object will not move as when imaging a stationary object, it is only necessary to calculate the motion of the object imaging device OBJS. In view of this, an orientation sensor 406 may be provided in the object imaging device OBJS to detect the motion of the camera by the orientation sensor 406, as described above with reference to FIG. 20, thus tracking the point of interest P on the image PB.

A surface normal vector calculating section 46 calculates the surface normal vector of the regularly-reflecting pixel from the diffuse reflection tracking image IINSD by using the principle of triangulation of FIG. 41 as described above, and outputs the result as the regular reflection surface normal vector $Nf^L$. While the positional relationship between the point A and the point of interest P and the positional relationship between the point B and the point of interest P shown in FIG. 41 are obtained over two image-capturing operations, this is for illustration in two dimensions. Thus, with the image processing device 200, which requires three-dimensional information, the surface normal vector is calculated over three image-capturing operations.

The refractive index estimating section 202 estimates the refractive index $nf^L$ from the specular reflection image $Is^L$ and the regular reflection surface normal vector $Nf^L$. As shown in FIG. 24, as the camera-side polarizing filter PFOS is rotated, the luminance value of the transmitted light changes in a sine wave pattern according to the direction of the polarization plane. Therefore, the ratio between the specular reflection component being completely-polarized light and the diffuse reflection component being unpolarized light will represent the degree of polarization. In view of this, the polarization degree γ, representing the degree of polarization, is defined by the following expression.

[Formula 17]

$$\gamma = \frac{I_{max} - I_{min}}{I_{max} + I_{min}} \qquad \text{(Expression 17)}$$

The polarization degree γ being 0 represents unpolarized light, and the polarization degree γ being 1 represents completely-polarized light. The polarization degree γ being neither 0 nor 1 represents partially-polarized light. A specular reflection component being completely-polarized light can be divided into an S wave and a P wave oscillating perpendicular to and parallel to the plane of incidence, respectively. At a particular angle of incidence called the "Brewster's angle", the P wave has no reflected component, and there will be only the S wave. This state corresponds to Imin on the sine wave, and Imin is given as follows, where the Fresnel reflection coefficients of the P wave and the S wave are denoted as Fp and Fs, respectively.

[Formula 18]

$$I_{min} = \frac{F_p}{F_s + F_p} I_s \qquad \text{(Expression 18)}$$

On the other hand, the sum of the maximum intensity Imax and the minimum intensity Imin of completely-polarized light coincides with the intensity of specular reflection, whereby Imax is given as follows.

[Formula 19]

$$I_{max} = \frac{F_s}{F_s + F_p} I_s \qquad \text{(Expression 19)}$$

Figure 29:
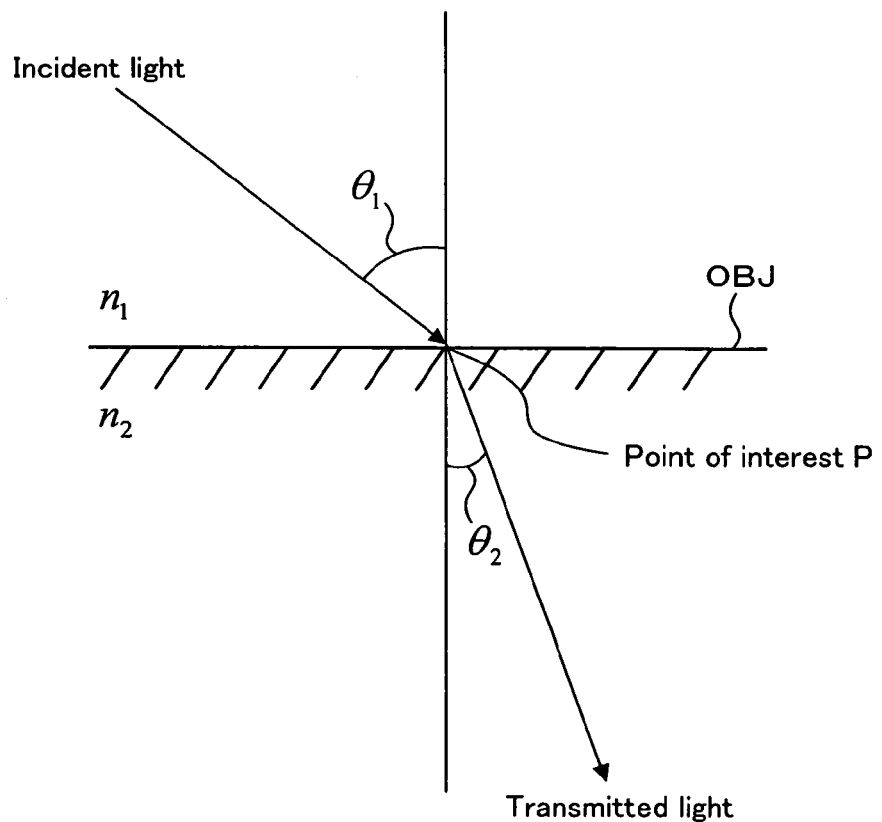
FIG. 29 is a diagram illustrating the Fresnel's law of reflection.

Moreover, based on the Fresnel's law of reflection, the Fresnel reflection coefficient can be defined as follows with the angle of incidence $\theta_1$ and the angle of transmission $\theta_2$ shown in FIG. 29.

[Formula 20]

$$F_s = \frac{\sin^2(\theta_1 - \theta_2)}{\sin^2(\theta_1 + \theta_2)} \quad \text{(Expression 20)}$$

[Formula 21]

$$F_p = \frac{\tan^2(\theta_1 - \theta_2)}{\tan^2(\theta_1 + \theta_2)} \quad \text{(Expression 21)}$$

Substituting (Expression 18) to (Expression 21) into (Expression 17) and taking the Snell's law given by (Expression 22) into consideration, the polarization degree γ is given by (Expression 23).

Formula 22

$$n_1 \sin \theta_1 = n_1 \sin \theta_2 \quad \text{(Expression 22)}$$

[Formula 23]

$$\gamma = \frac{2\sin\theta_i \tan\theta_i \sqrt{n^2 - \sin^2\theta_i}}{n^2 - \sin^2\theta_i + \sin^2\theta_i \tan^2\theta_i} \quad \text{(Expression 23)}$$

Thus, it is possible to obtain Imax and Imin from the specular reflection image $Is^L$ to calculate the polarization degree γ from (Expression 17), and to calculate the refractive index n based on (Expression 23) from the angle of incidence θi calculated from the regular reflection surface normal vector $Nf^L$ and the polarization degree γ. The refractive index n is for pixels having regular reflection, and the refractive index estimating section 202 outputs this as the regular reflection refractive index $nf^L$.

The LR illumination equation parameter estimating section 203 estimates the unknown illumination equation parameters from the light source vector $L^L$, the diffuse reflection image $Id^L$, the specular reflection image $Is^L$, the regular reflection surface normal vector $Nf^L$ and the regular reflection refractive index $nf^L$.

Since the regular reflection refractive index $nf^L$ is calculated with only pixels having regular reflection, pixels PS1 to PS10 being portions of the specular reflection image $Is^L$ have the regular reflection refractive index as shown in FIG. 30, for example. The refractive index n is an optical characteristic depending on the material, and pixels having similar values of refractive index n are likely to belong to the same material. Thus, in the case of FIG. 30(a), it can be determined that the pixels PS1 to PS3 are of a material MS1, the pixels PS4 to PS6 are of a material MS2, and the pixels PS8 to PS10 are of a material MS3.

Then, boundaries between different materials are detected based on the difference in the luminance value of the specular reflection image. For example, assume that the luminance values of the specular reflection image are generally grouped into three values (($Is^L$)$_1$≈226, ($Is^L$)$_2$≈238 and ($Is^L$)$_3$≈252), and boundary lines BL1, BL2 and BL3 are drawn on the specular reflection image $Is^L$, as shown in FIG. 30(b). The area NOS is a collection of pixels where no specular reflection component exists. Pixels belonging to the material MS1 should have the same refractive index n as that of the pixels PS1 to PS3, and therefore pixels in the material MS1 whose refractive index n is unknown can all be assumed to be known. Specifically, the average refractive index n of the pixels PS1 to PS3 (1.42 in FIG. 30) is obtained, and it is used as the refractive index $n_{MS1}$ of the material MS1 and expanded to all pixels belonging to the material MS1. This is similarly applied to the material MS2 and the material MS3, thereby obtaining refractive indices n of the pixels having the specular reflection component. In FIG. 30(b), for example, the refractive index $n_{MS2}$ of the material MS2 is 1.77, and the refractive index $n_{MS3}$ of the material MS3 is 2.04.

Thus, the refractive index n of pixels other than those of regular reflection becomes known, and moreover the angle of incidence θi becomes known by using the relationship of the polarization degree γ of (Expression 17) and (Expression 23), thereby obtaining the surface normal vector. The diffuse reflection is typically according to the Lambert's law shown in (Expression 24), and the diffuse reflection component luminance changes according to the inner product between the surface normal vector and the viewpoint vector. Since the viewpoint vector coincides with the optical axis of the object imaging device OBJS and is known, the diffuse reflection component bidirectional reflectance pd can be calculated if the surface normal vector is known.

[Formula 24]

$$I_d = E_i \rho_d (\overline{N} \cdot \overline{L}) \quad \text{(Expression 24)}$$
$$= E_i \rho_d \cos\theta_i$$

As described above, once the surface normal vector of the pixels having regular reflection is made known by the shape estimating section 201, it then becomes possible to estimate various parameters, thus obtaining the illumination equation parameters of the low-resolution image.

However, unknown parameters remain in the area NOS shown in FIG. 30 where no specular reflection component exists. As described above with reference to FIG. 30(a), there may be a case where there is no regular reflection pixel in areas grouped based on the specular reflection component luminance value. For such a reason, an unqualified pixel may occur in the LR illumination equation parameter estimating section 203, whereby it is necessary to perform the parameter estimation again in the HR illumination equation parameter estimating section 109. Moreover, the parameter estimation is performed while the illumination equation parameters whose resolution has been decreased through the resolution decreasing section 110 are fed back to the LR illumination equation parameter estimating section 203. In the present invention, however, parameters, which have been subjected to the super-resolution process by the texture super-resolution section 107, are added to the qualified pixels, as described above, thereby increasing the possibility of estimating unqualified pixels. Thus, by repeating such a process, the high-resolution image can be calculated. Based on a physical fact that material-dependent illumination equation parameters, such as the refractive index, have the same value within the same material, the material-based interpolation section 105 performs the super-resolution process by spatially copying pixels of the low-resolution illumination equation parameter image. As a result, even for an unqualified pixel whose estimation precision with the low-resolution image does not satisfy a predetermined criterion, the estimation precision of some parameters may satisfy the criterion following the resolution-increasing process. Specifically, the material-based interpolation section 105 or the interpolation section 112 has an advantageous effect of increasing the number of qualified pixels by interpolation or by spatially copying the same pixel values, and it is possible that the estimation precision of an unqualified pixel may improve by estimating the illumination equation parameters again with the resolution-increased parameters.

From the above point of view, the HR illumination equation parameter estimating section 109 estimates unqualified pixels in the group of high-resolution parameters HRP. The group of high-resolution parameters HRP include:

(a) the light source vector $L^H$ being the output of the interpolation section 112;

(b) the ambient light luminance $Ia^H$ being the output of the interpolation section 112;

(c) the illuminance $Ei^H$ being the output of the interpolation section 112;

(d) the specular reflection component ratio $ks^H$ being the output of the material-based interpolation section 105;

(e) the object surface roughness $m^H$ being the output of the material-based interpolation section 105;

(f) the refractive index $n^H$ being the output of the material-based interpolation section 105;

(g) the diffuse reflection component bidirectional reflectance being the output of the texture super-resolution section 107 $\rho d^H$; and (h) the surface normal vector $N^H$ being the output of the texture super-resolution section 107.

The diffuse reflection component bidirectional reflectance $\rho d^H$ and the surface normal vector $N^H$, among these parameters, include those obtained as the parameter output image feature vector PIOUTFV by referring to the output image feature vector database section 35. The parameter output image feature vector PIOUTFV is new additional information that cannot be obtained by the object imaging device OBJS and the shape measurement device NS. Therefore, it is possible that a parameter that could not be estimated by the LR illumination equation parameter estimating section 103 can now be estimated. In view of this, the HR illumination equation parameter estimating section 109 estimates unqualified pixels in the group of high-resolution parameters HRP. While any estimation method may be used, an example where a simplex method is used will now be described with reference to FIG. 31.

Figure 31:
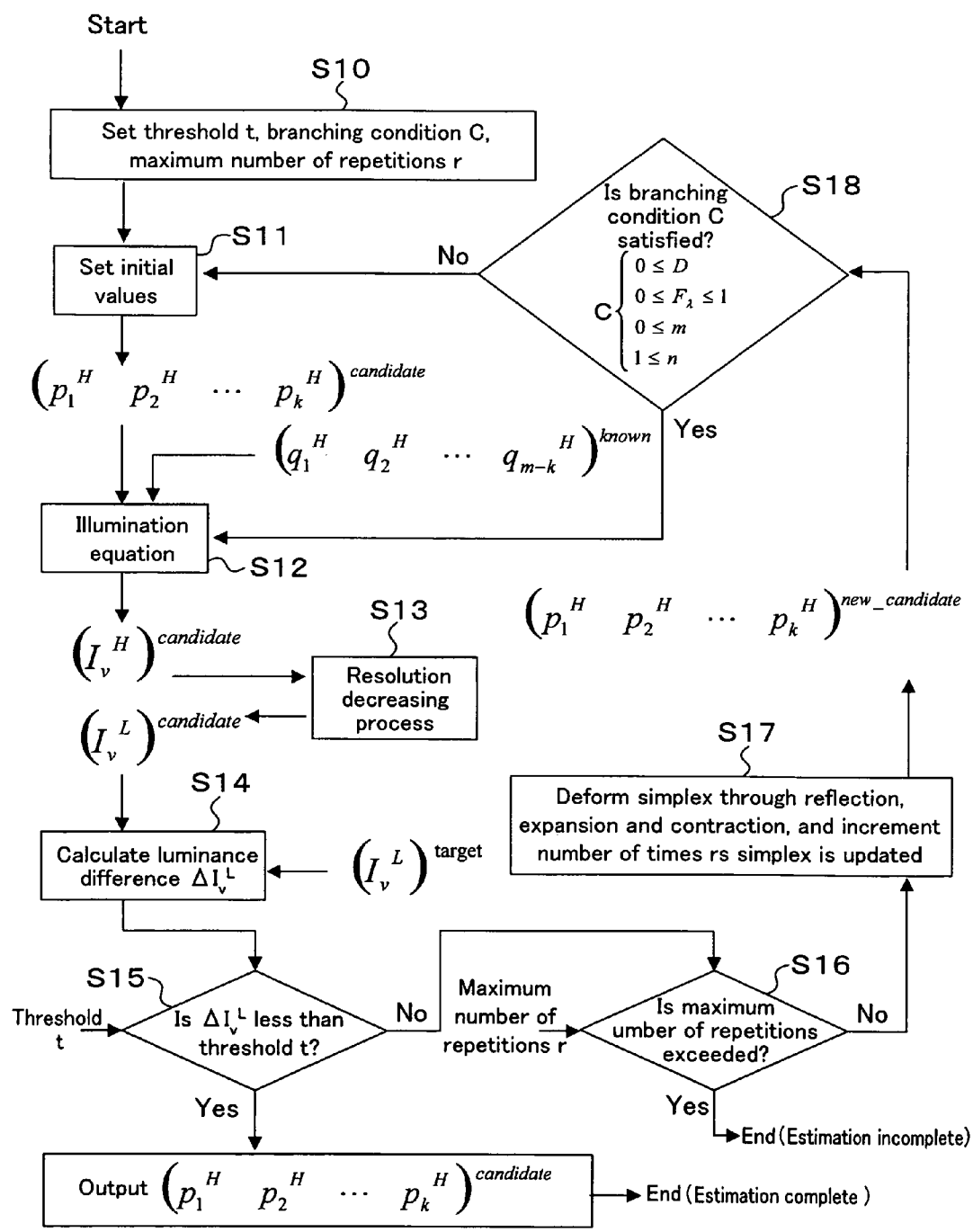
FIG. 31 is a flow chart showing a method for estimating an unqualified pixel by a simplex method.
Figure 40:
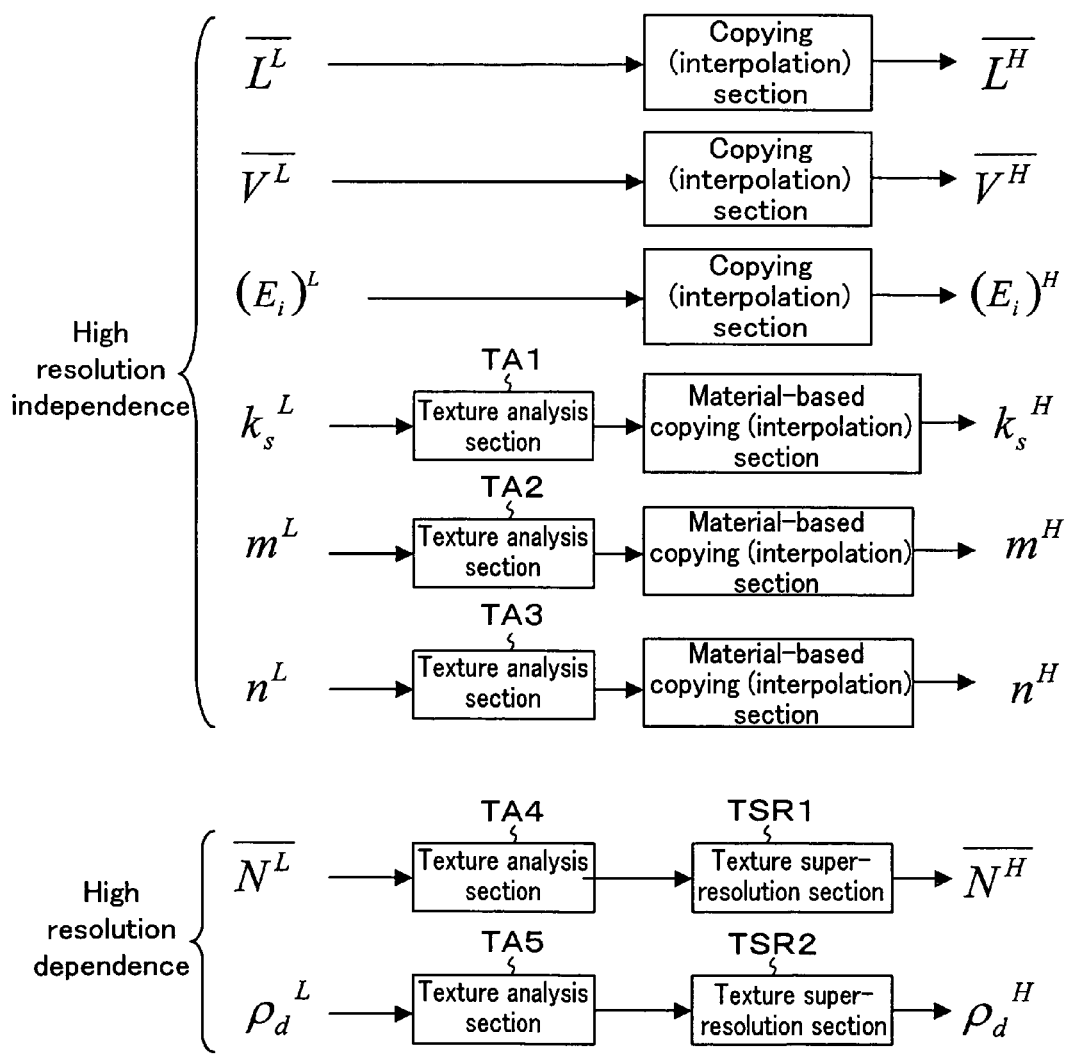
FIG. 40 is a diagram illustrating an example of a super-resolution process using illumination equation parameters.

FIG. 31 shows a work flow of a simplex method of estimating illumination equation parameters of unqualified pixels based on the information of qualified pixels obtained from the material-based interpolation section 105 or the interpolation section 112. The illumination equation has m parameters, (m−k) parameters of which are the information of qualified pixels obtained from the material-based interpolation section 105 or the interpolation section 112. As described above with reference to FIG. 40, the illumination equation includes parameters that are highly independent of the resolution, and the resolution-increasing process therefor is performed by the material-based interpolation section 105 or the interpolation section 112. Therefore, even for pixels that are unqualified in the process by the LR illumination equation parameter estimating section 203, the estimation precision of some illumination equation parameters may satisfy a predetermined criterion following the qualified pixel interpolation process performed by the material-based interpolation section 105 or the interpolation section 112. Therefore, in FIG. 31, the estimation is performed for unqualified pixels, but with a group of (m−k) parameters $(q1^H, q2^H, \ldots, qm-k^H)^{known}$ being excluded from the object of estimation and treated as known parameters. A group of k parameters $(p1^H, p2^H, \ldots, pk^H)$ are the object of estimation.

Step S10 sets the threshold t, the branching condition C and the maximum number of repetitions r for the threshold process and the branching process and for checking the number of iterations of the repeated process. Step S11 sets initial values o the candidate estimate values $(p1^H, p2^H, \ldots, pk^H)^{candidate}$ of unqualified pixels. Specifically, random number generation, or the like, is used. Step S12 inputs the candidate estimate values $(p1^H, p2^H, \ldots, pk^H)^{candidate}$ and the group of known parameters $(q1^H, q2^H, \ldots, qm-k^H)^{known}$ to (Expression 1) being an illumination equation to calculate the candidate $(Iv^H)^{candidate}$ of the luminance Iv at the point of interest P.

Step S13 decreases the resolution of the candidate $(Iv^H)^{candidate}$ of the luminance Iv at the point of interest P, being the luminance value of the high-resolution image, to thereby convert it to the candidate $(Iv^L)^{candidate}$ of the luminance lv at the point of interest P. The purpose of this is because the true value that is necessary for the following luminance difference determination can be obtained only with the low-resolution image. The specific method of the resolution-decreasing process depends on the imaging characteristics of the object imaging device OBJS. Specifically, the process obtains a high-resolution image obtained by the object imaging device OBJS imaging the object OBJ at a short distance and a low-resolution image obtained by the object imaging device OBJS imaging the object OBJ at a long distance, and the variations in the luminance value therebetween are reflected in step S13. Specifically, the correspondence between parameter image feature vectors is constructed by pixels as shown in FIG. 13, and a low-resolution image can be obtained by following the flow of FIG. 10 in the reverse direction. Approximate methods include those in which a two-dimensional Gaussian function is convoluted to calculate a low-resolution image, and those in which the average value between adjacent pixels is used as a low-resolution image. With any method, the resolution-decreasing process is a process of downsampling a plurality of pixels of the high-resolution image into a single pixel. Therefore, step S13 requires a plurality of pixels of the high-resolution image. More specifically, they are the pixel for which parameters are estimated by the simplex method of FIG. 31 and a plurality of pixels surrounding the pixel. However, the surrounding pixels may include unqualified pixels on which the resolution-decreasing process cannot be performed. Therefore, the resolution-decreasing process of step S13 uses only the qualified pixels of the surrounding pixels.

Step S14 calculates the luminance difference $\Delta Iv^L$ between the candidate of the luminance at the point of interest P $(Iv^L)^{candidate}$ and the true value $(Iv^L)^{target}$ being the target, and step S15 compares it with the threshold t (t=0.01, for example, where the luminance value is expressed in 8-bit 256 steps from 0 to 255). Where the luminance difference $\Delta Iv^L$ is smaller than the threshold t, the candidate estimate values $(p1^H, p2^H, \ldots, pk^H)^{candidate}$ are output as the estimation results to end the process of FIG. 31.

Where the luminance difference $\Delta Is^L$ is greater than or equal to the threshold t, step S16 compares the number of times rs the simplex is updated with the maximum number of repetitions r, wherein if the number of times rs the simplex is updated is higher than the maximum number of repetitions r, the parameter estimation is discontinued and the simplex method process is ended with the estimation process being incomplete. If the number of times rs the simplex is updated is not higher than the maximum number of repetitions r, step S17 deforms the simplex by (Expression 15) to update the candidate estimate values $(p1^H, p2^H, \ldots, pk^H)^{candidate}$ and calculate the next candidate estimate values $(p1^H, p2^H, \ldots, pk^H)^{new\_candidate}$.

Step S18 checks whether the next candidate estimate values $(p1^H, p2^H, \ldots, pk^H)^{new\_candidate}$ and the known parameters satisfy all of the branching condition C. If so, the process returns to step S12 to again perform a comparison with the threshold t. If the next candidate estimate values ($p1^H$, $p2^H, \ldots, pk^H)^{new\_candidate}$ and the known parameters do not satisfy all of the branching condition C, the process returns to step S11 to re-set the initial values. For example, the branching condition C is that the refractive index n of (Expression 2) is 1 or more, the Fresnel coefficient Fλ is 0 or more and 1 or less, the object surface roughness m is 0 or more, and the microfacet distribution function D is 0 or more. These conditions are for confirming whether the parameter values are physically legitimate, and if even one of these conditions is not satisfied, it is determined that the illumination equation parameters contain a physical contradiction and the illumination equation parameters are then discarded. Even though the function optimization appears to be progressing from an estimation method point of view, it can be considered to be moving into a contradicting solution space from a physical point of view. Thus, if the process continues to update the simplex, it will not be able to move out of a physically contradicting solution space. Therefore, the process returns to step 11 to re-set the initial values and to thereby move out of the physically contradicting solution space.

Thus, based on FIG. 31, ($p1^H, p2^H, \ldots, pk^H$) are determined and output from the HR illumination equation parameter estimating section 109.

If all pixels have become qualified pixels in the HR illumination equation parameter estimating section 109, the parameters are returned to the switcher section 108 as output high-resolution parameters OUTHRP and are output to the illumination equation parameter synthesis section 111. If it is determined that there remains an unqualified pixel as a result of the estimation by the HR illumination equation parameter estimating section 109, the results are returned to the LR illumination equation parameter estimating section 103 to perform the parameter estimation process again with a low-resolution image. For this, it is necessary to decrease the resolution of the resolution-increased parameters. Therefore, the high-resolution parameters estimated by the HR illumination equation parameter estimating section 109 are output to the resolution decreasing section 110 as the unknown high-resolution parameters NHRP, where a resolution-decreasing process is performed, and are then input to the LR illumination equation parameter estimating section 203 as the unknown low-resolution parameters NLRP.

Thus, the image processing device 200 can output an image of a higher resolution than that of the object imaging sensor based on the light source image IIL and the object image IIN, and is capable of enlarging an image without deteriorating the edge sharpness, the texture or the image quality. Even if there is an unqualified pixel because the measurement of the geometric and optical parameters of the object or the visual environment is incomplete or because the estimation of the illumination equation parameters is incomplete, it is possible to estimate parameters by using additional information for increasing the resolution, which are used in the super-resolution process, and to perform an image enlargement using illumination equation parameters. Particularly, an unqualified pixel occurring because of a pixel where no specular reflection component exists or an unqualified pixel occurring because a pixel of regular reflection cannot be used can be estimated by using new information, which is added for the super-resolution process. For example, when imaging a quickly-moving object, it is necessary to move the object imaging device and the shape measurement device in hand, thereby naturally imposing size or weight limitations. There may be a case where ideal design conditions in terms of the device performance cannot be ensured for such reasons, thereby resulting in an unqualified pixel. Where the object imaging device and the shape measurement device are used in a battery-powered application, there may be a case where ideal design conditions in terms of the device performance cannot be ensured as a result of ensuring an operation over a predetermined length of time, thereby resulting in an unqualified pixel. Similarly, there may be limitations imposed by the price settings. The present invention realizes an image enlargement even if parameters of the low-resolution image cannot all be measured due to such limitations, and can advantageously widen the applicability in terms of the applicable environments, device configurations, etc. Particularly, the present invention can eliminate the need for the shape measurement device, thus providing an advantageous effect in reducing the size and weight of the device.

(Embodiment 4)

In the present embodiment, a light source imaging device is used to image the light source, a lighting arranged via a polarizing filter is used to illuminate the object with completely-polarized light, and an object imaging device arranged via a polarizing filter is used to capture the reflected light from the object. Then, based on the measured information, the image processing device outputs an image of a higher resolution than that of an object imaging sensor.

Figure 32:
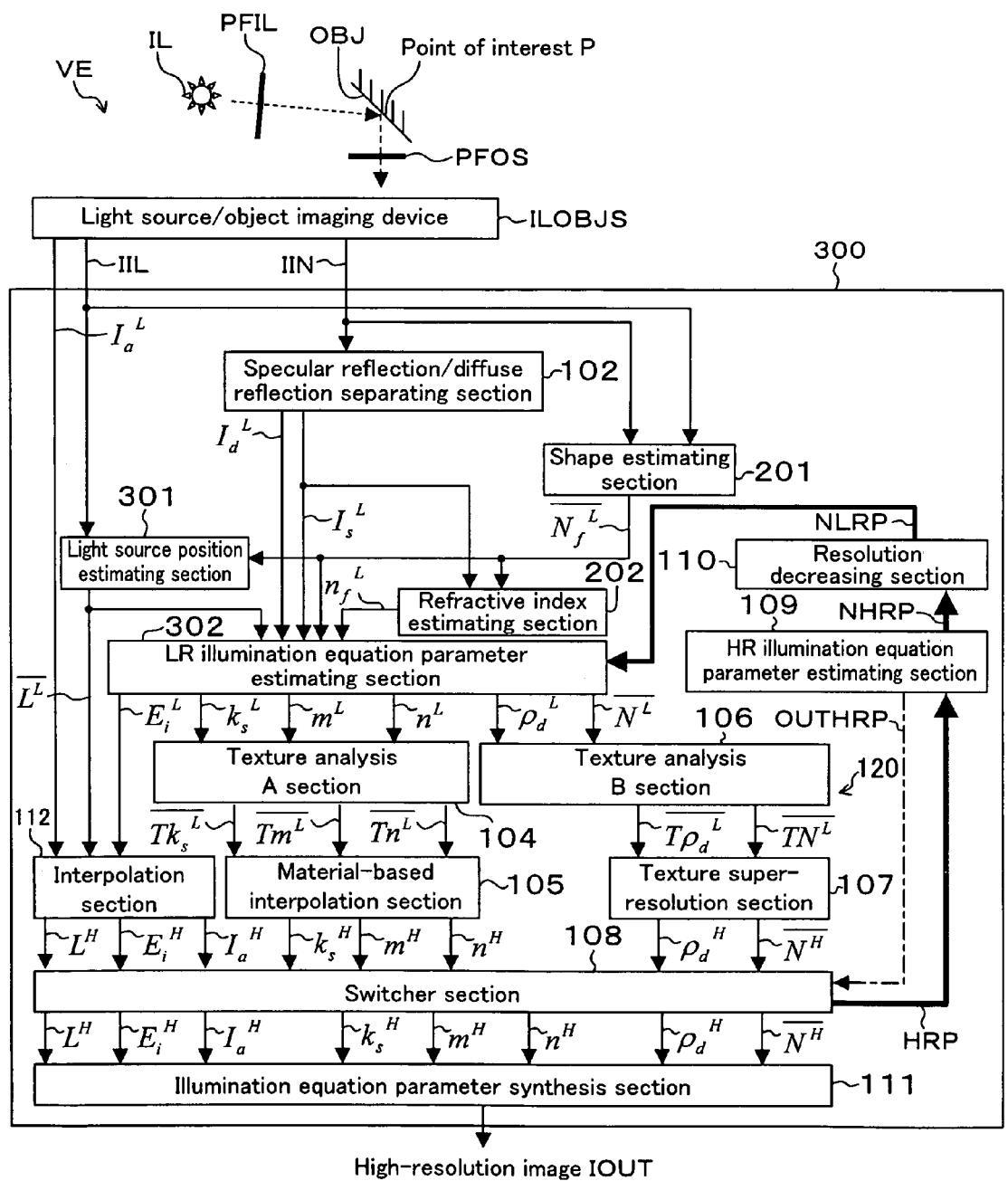
FIG. 32 is a block diagram showing a configuration of an image processing device according to Embodiment 4 of the present invention.

FIG. 32 is a block diagram showing a configuration of an image processing device according to Embodiment 4 of the present invention. Like elements to those of the image processing devices shown in FIGS. 16 and 26 are denoted by like reference numerals and will not be further described below. An image processing device 300 is a device for enlarging the object image IIN of a light source/object imaging device ILOBJS, and includes a light source position estimating section 301, the specular reflection/diffuse reflection separating section 102, an LR illumination equation parameter estimating section 302, the texture analysis A section 104, the material-based interpolation section 105, the texture analysis B section 106, the texture super-resolution section 107, the switcher section 108, the HR illumination equation parameter estimating section 109, the resolution decreasing section 110, the illumination equation parameter synthesis section 111, the interpolation section 112, the shape estimating section 201, and the refractive index estimating section 202. The light source/object imaging device ILOBJS uses a wide-angle lens to capture the light source IL and the object OBJ together within the angle of view. The light source position estimating section 301 estimates the position of the light source IL from the light source image IIL and the regular reflection surface normal vector $Nf^L$.

FIG. 33(a) shows the positional relationship between the light source IL, the point of interest P and an imaging device IMSR of the light source/object imaging device ILOBJS. The shape estimating section 201 can calculate the distance dP between the imaging device IMSR and the point of interest P by using the diffuse reflection tracking section 45. The direction of a straight line drawn from the point of interest P to the light source IL is light source vector $L^L$, and the position of the light source IL is determined once the distance dILP between the point of interest P and the light source IL is obtained. The shape estimating section 201 performs the process for pixels having regular reflection, and light from the light source IL is regularly reflected at the point of interest P to enter the imaging device IMSR. Then, the regular reflection surface normal vector $Nf^L$ bisects the angle between the light source vector $L^L$ and the optical axis IMSROA of the imaging device IMSR. Therefore, the angle between the light source vector $L^L$ and the axis IMSROA is twice as large as the angle of incidence θi. On the other hand, the vector L2 extending from the imaging device IMSR to the light source IL can be calculated by the method described above with reference to FIG. 19 and is given by (Expression 8). Therefore, the angle φ between the optical axis IMSROA and the vector L2 is known. The angle 2θi between the light source vector $L^L$ and the axis IMSROA and the angle φ between the optical axis IMSROA and the vector L2 are known, and the distance dP between the point of interest P and the imaging device IMSR is also known. This geometric condition is the same as that of triangulation shown in FIG. 41. The point of interest P in FIG. 41 corresponds to the light source IL in FIG. 33(a). Therefore, the position (x, y) of the light source IL can be calculated by (Expression 3). While FIG. 41 is drawn in two dimensions, it can be expanded to three dimensions. If the vectors in FIG. 33(a) are represented as three-dimensional vectors, the three-dimensional position of the light source IL can be calculated.

FIG. 33(b) shows the relationship between the regular reflection surface normal vector $Nf^{L'}$ and the light source vector $L^{L'}$ at the point of interest P' being different from the point of interest P. The angle of incidence is θi', being smaller than the angle of incidence θi of the point of interest P. The reason for this is because the direction of the surface normal vector such that light from the light source IL is regularly reflected to enter the imaging device IMSR differs between the point P and the point P'. Therefore, the light source vector $L^{L'}$ is also different from the light source vector $L^L$, and the distance between the point of interest P' and the light source IL is also different from the distance dILP. This means that light rays radiating with various angles from the light source IL can be described individually, whereby it is not necessary to use parallel beams, which is a prerequisite with the image processing devices 100 and 200. Therefore, it can be said that it is possible to estimate illumination equation parameters under a more general visual environment VE, and the capability of estimating unqualified pixels in the LR illumination equation parameter estimating section 302 or the HR illumination equation parameter estimating section 109 is enhanced.

The light source/object imaging device ILOBJS may be divided into the light source imaging device ILS and the object imaging device OBJS, as in FIG. 17 or FIG. 26. This is because the coordinate system of the light source imaging device ILS can be converted to the coordinate system of the object imaging device OBJS by using the matrix M shown in (Expression 10).

Thus, the image processing device 300 can output an image of a higher resolution than that of the object imaging sensor based on the light source image IIL and the object image IIN, and is capable of enlarging an image without deteriorating the edge sharpness, the texture or the image quality. Even if there is an unqualified pixel because the measurement of the geometric and optical parameters of the object or the visual environment is incomplete or because the estimation of the illumination equation parameters is incomplete, it is possible to estimate parameters by using additional information for increasing the resolution, which are used in the super-resolution process, and to perform an image enlargement using illumination equation parameters. Particularly, an unqualified pixel occurring because of a pixel where no specular reflection component exists or an unqualified pixel occurring because a pixel of regular reflection cannot be used can be estimated by using new information, which is added for the super-resolution process. Moreover, since the position of the light source can be estimated, the capability of estimating unqualified pixels can be said to be higher than other processes where light from the light source is assumed to be parallel beams. For example, when imaging a quickly-moving object, it is necessary to move the object imaging device and the shape measurement device in hand, thereby naturally imposing size or weight limitations. There may be a case where ideal design conditions in terms of the device performance cannot be ensured for such reasons, thereby resulting in an unqualified pixel. Where the object imaging device and the shape measurement device are used in a battery-powered application, there may be a case where ideal design conditions in terms of the device performance cannot be ensured as a result of ensuring an operation over a predetermined length of time, thereby resulting in an unqualified pixel. Similarly, there may be limitations imposed by the price settings. The present invention realizes an image enlargement even if parameters of the low-resolution image cannot all be measured due to such limitations, and can advantageously widen the applicability in terms of the applicable environments, device configurations, etc. Particularly, the present invention can eliminate the need for the shape measurement device, thus providing an advantageous effect in reducing the size and weight of the device. Moreover, the present invention can also be used in a visual environment where the light source and the object are within a short distance from each other, whereby the direction of the incident light from the light source varies depending on the position on the object.

The image processing method of any embodiment described above can be implemented by using a computer to execute a program recorded on a computer-readable recording medium, for example.

An exemplary configuration for implementing the present invention will now be described.

FIRST CONFIGURATION EXAMPLE

Figure 34:
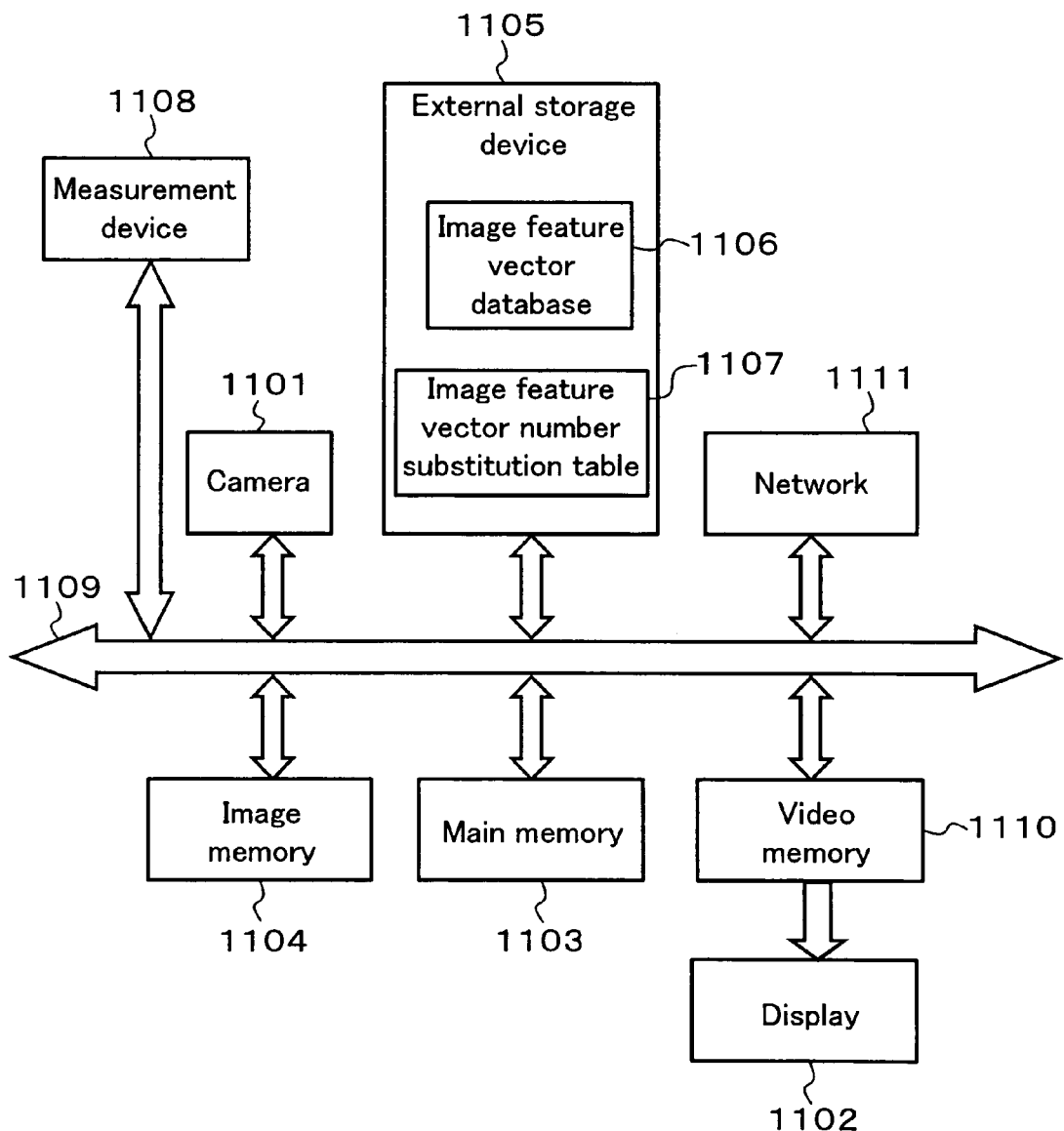
FIG. 34 is a diagram showing a first configuration example.

FIG. 34 is a diagram showing a first configuration example, being an example of a configuration for performing an image enlargement of the present invention by using a personal computer. The resolution of a camera 1101 is lower than the resolution of a display 1102, and an enlarge image is produced by an image conversion program loaded on a main memory 1103 in order to make use of the maximum display capability of the display 1102. The low-resolution image of the light source and the object taken by the camera 1101 are recorded on an image memory 1104. An image feature vector database 1106 and an image feature vector number substitution table 1107 are prepared in advance in an external storage device 1105, and can be referred to from the image conversion program on the main memory 1103. The content and the method of production of the image feature vector database 1106 and the image feature vector number substitution table 1107 are as shown in FIG. 13.

According to Embodiment 2, a measurement device 1108 corresponds to the shape measurement device NS of FIG. 17, and the surface normal vector $N^L$ is recorded in the image memory 1104. According to Embodiment 3 or Embodiment 4, the measurement device 1108 is not needed.

The operation of the image conversion program is according to Embodiment 1 and Embodiment 4, and the process estimates illumination equation parameters of the low-resolution image, performs the super-resolution process for each material based on the texture analysis, and repeatedly performs the parameter estimation using information, which is added for higher resolutions, if there remains an unqualified pixel, thus calculating a high-resolution image. The image conversion program on the main memory 1103 reads the low-resolution image in the image memory 1104 via a memory bus 1109, coverts it to a high-resolution image according to the resolution of the display 1102, and transfers the converted image to a video memory 1110 again via the memory bus 1109. The high-resolution image transferred to the video memory 1110 can be viewed on the display 1102.

The present invention is not limited to the configuration of FIG. 34, but may employ various other configurations. For example, the low-resolution image and the surface normal vector may be obtained from a network 1111. The camera 1101 may be any type of an imaging device, such as a camera-equipped mobile telephone, a digital still camera or a video movie camera, and may also be a reproduction device for reproducing a previously recorded image.

SECOND CONFIGURATION EXAMPLE

Figure 35:
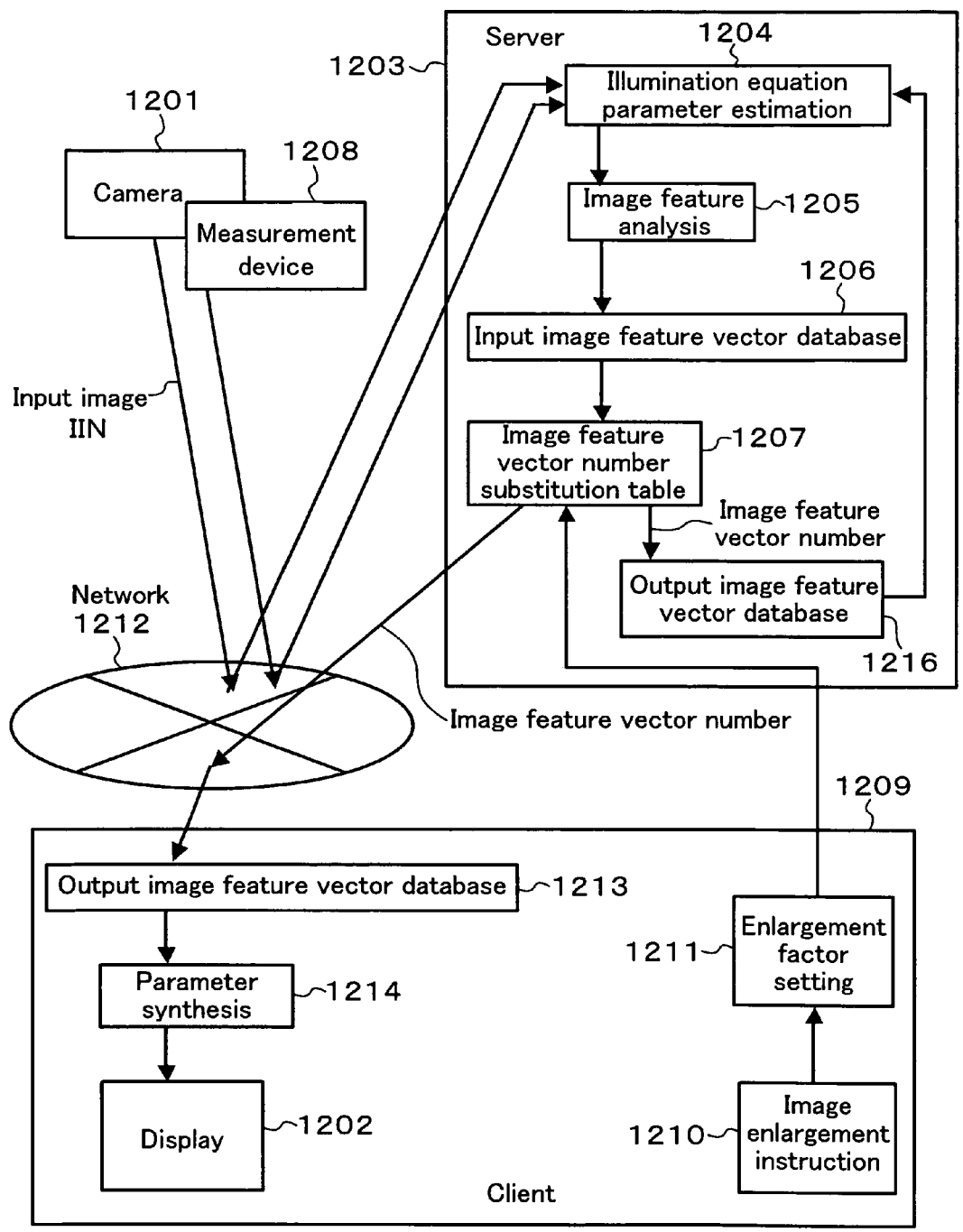
FIG. 35 is a diagram showing a second configuration example (1st variation).

FIG. 35 is a diagram showing a second configuration example, being an example of a configuration for performing an image conversion of the present invention by using a server-client system. The resolution of a camera 1201 is lower than the resolution of a display 1202, and an image enlargement is performed in the server-client system in order to make use of the maximum display capability of the display 1202. A server 1203 outputs a resolution-increased image feature vector number by using an illumination equation parameter estimation 1204, an image feature analysis 1205, an input image feature vector database 1206 and an image feature vector number substitution table 1207. Where the illumination equation parameter estimation 1204 operates according to Embodiment 2, a measurement device 1208 is needed. Specifically, the surface normal vector is obtained from the shape measurement device NS. Where the illumination equation parameter estimation 1204 operates according to Embodiment 3 and Embodiment 4, the measurement device 1208 is not needed. The content and the method of production of the input image feature vector database 1206 and the image feature vector number substitution table 1207 are as shown in FIG. 13. By producing these from a plurality of resolution pairs, it is possible to accommodate a plurality of image enlarging factors.

If there remains an unqualified pixel at the point where the process has reached the image feature vector number substitution table 1207, the parameter estimation is started over again as in Embodiments 1 to 4. Then, the image feature vector number being the output of the image feature vector number substitution table 1207 is given to an output image feature vector database 1216 in the server, and a parameter resolution-increasing process is performed at the output image feature vector database 1216. This being new additional information, the parameter estimation is performed again at the illumination equation parameter estimation 1204. The method for re-doing the parameter estimation according to the estimation precision as described above in Embodiment 2 can also be realized by a feedback via the output image feature vector database 1216.

In a client 1209, the image enlargement factor is set by an image enlargement instruction 1210, and is passed as the enlargement factor by an enlargement factor setting section 1211 to the image feature vector number substitution table of the server 1203. In the image feature vector number substitution table 1207, a image feature vector number substitution table is selected according to the enlargement factor. For example, where the enlargement factor is set in three steps of ×2, ×4 and ×4, three image feature vector number substitution tables are stored in the image feature vector number substitution table 1207, and an appropriate table is selected according to the enlargement factor. The selected image feature vector number is given to the client 1209 via a network 1212. In the client 1209 receiving the image feature vector number, the image feature vector number is converted by an output image feature vector database 1213 to the image feature vector, thus obtaining resolution-increased illumination equation parameters. They are converted to a luminance image at a parameter synthesis 1214 and displayed on the display 1202.

Figure 36:
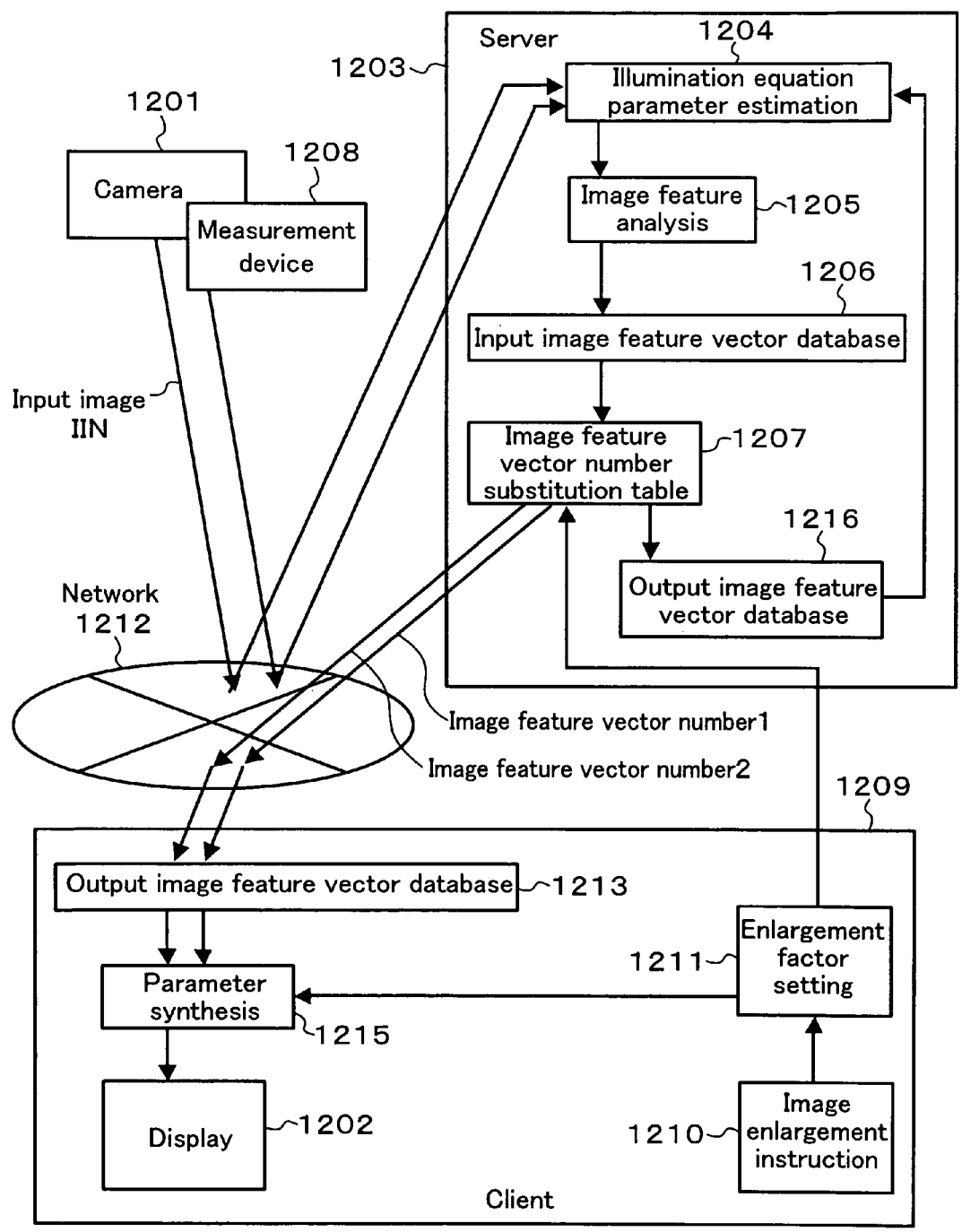
FIG. 36 is a diagram showing a second configuration example (2nd variation).
Figure 39:
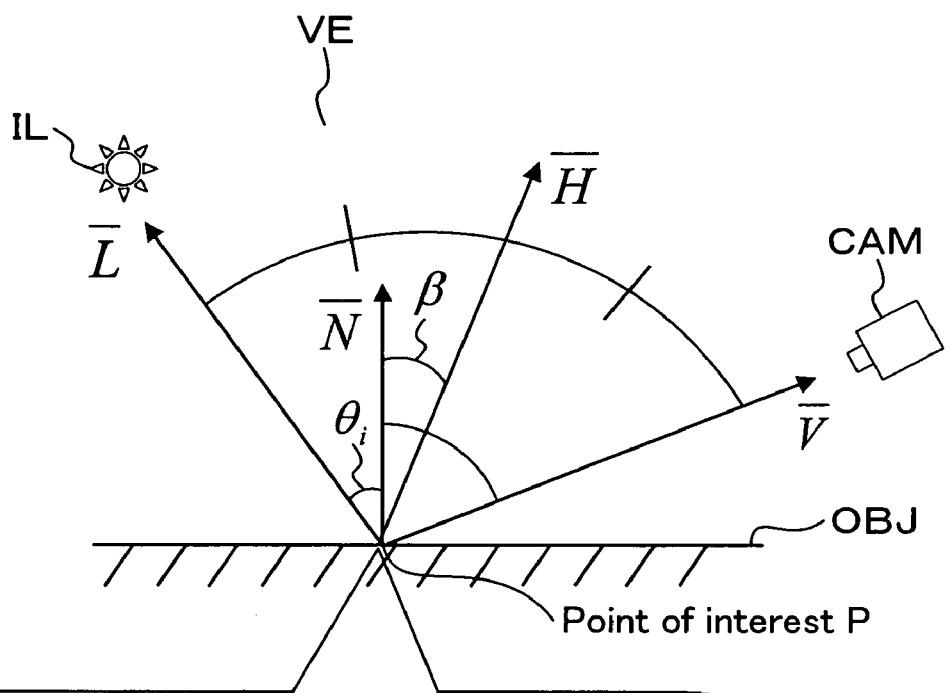
FIG. 39 is a diagram illustrating geometric characteristics and optical characteristics of the object and the visual environment.

In a case where the enlargement factor setting 1211 sets continuous factors in ×0.2 steps between ×2 and ×4, i.e., ×2.2, ×2.4, ×2.6, ..., for example, the image feature vector number "1" and the image feature vector number "2" are output to the client 1209 from the image feature vector number substitution table of an enlargement factor of ×2 and the image feature vector number substitution table of an enlargement factor of ×4, respectively, and the output image feature vector of an enlargement factor of ×2 and the output image feature vector of an enlargement factor of ×4 are obtained from the output image feature vector database 1213, as shown in FIG. 36. The two output image feature vectors are input to an illumination equation parameter synthesis section 1215 and are added in weighted addition according to the enlargement factors. For example, the weighted addition may be performed as follows.

[Formula 25]

$$FV = \frac{m - m_1}{m_2 - m_1} FV_2 + \frac{m_1 - m}{m_2 - m_1} FV_1 \qquad \text{(Expression 25)}$$

Herein, m1 is the smaller enlargement factor and m2 is the larger enlargement factor, corresponding to ×2 and ×4, respectively, in the above example. Moreover, FV1 is the output image feature vector of the smaller enlargement factor, and FV2 is the output image feature vector of the larger enlargement factor.

The present invention is not limited to the configurations of FIGS. 35 and 36, and the position of each means on the system (e.g., whether each means belongs to the server 1203, to the client 1209 or to something else) is not limited to the illustrated examples. The camera 1201 may be any type of an imaging device, such as a camera-equipped mobile telephone, a digital still camera or a video movie camera, and may also be a reproduction device for reproducing a previously recorded image.

THIRD CONFIGURATION EXAMPLE

FIG. 37 is a diagram showing a third configuration example, being an example of a configuration for performing an image conversion of the present invention by using camera-equipped mobile telephone. A camera-equipped mobile telephone 1300 of FIG. 37(*a*) includes a lighting device 1301 as the light source IL for illuminating the point of interest P via the light source-side polarizing filter PFIL. Since the positional relationship between the lighting device 1301 and the object imaging device OBJS is fixed, the position of the light source IL is known. Therefore, it is possible to calculate the light source vector L by measuring the distance to the point of interest P. The object imaging device OBJS images the point of interest P via the camera-side polarizing filter PFOS. The camera-side polarizing filter PFOS includes a rotating mechanism, and the luminance of the object image IIN changes in a sine wave pattern as shown in FIG. 24. The object imaging device OBJS images the object without lighting the lighting device 1301 before the start of the image-capturing to thereby measure the ambient light luminance Ia. For example, a distance measurement device 1302 radiates infrared light or an ultrasonic wave and measures the amount of time until they come back to the distance measurement device 1302 after being reflected on the object, thus measuring the distance from the distance measurement device 1302 to the object. The surface normal vector N at the point of interest P can be obtained if it is possible to measure the distance of three points surrounding the point of interest P as described above with reference to FIG. 18.

With the above configuration, the camera-equipped mobile telephone 1300 can obtain the light source vector L, the object image IIN and the surface normal vector N, and it is possible to calculate the high-resolution image IOUT by the image processing device 100 provided therein and output the high-resolution image IOUT from an external output 1303. For example, where the imaging device of the object imaging device OBJS has 320×240 pixels, and the image processing device 100 performs an enlargement process by a factor of 4 vertically and horizontally, the number of pixels of the high-resolution image IOUT is 1280×960. Therefore, if the external output 1303 is connected to a high-definition television, an image captured by a camera of a mobile telephone with a small number of pixels can be viewed on a household high-definition television.

A camera-equipped mobile telephone 1400 of FIG. 37(b) has the same configuration as that of the camera-equipped mobile telephone 1300 of FIG. 37(a), except for the absence of the image processing device 100. An external output 1401 outputs the light source vector L, the object image IIN and the surface normal vector N, and an image enlargement is performed on the image processing device 100 provided in a high-definition television, a personal computer having the configuration of FIG. 34 or a server-client system having the configuration of FIG. 35, for example.

The present invention is not limited to the configuration of FIG. 37, but may employ various other configurations. For example, in a case where the camera-equipped mobile telephone does not have the distance measurement device 1302, the image processing device 200 of FIG. 26 or the image processing device 300 of FIG. 32 may be used.

FOURTH CONFIGURATION EXAMPLE

FIG. 38 is a diagram showing a fourth configuration example, being an example of a configuration for performing an image conversion of the present invention by using a video camera. A video camera 1500 of FIG. 38(a) includes a lighting device 1501 as the light source IL for illuminating the point of interest P via the light source-side polarizing filter PFIL. Since the positional relationship between the lighting device 1501 and the object imaging device OBJS is fixed, the position of the light source IL is known. Therefore, it is possible to calculate the light source vector L by measuring the distance to the point of interest P. The object imaging device OBJS images the point of interest P via the camera-side polarizing filter PFOS. The camera-side polarizing filter PFOS includes a rotating mechanism, and the luminance of the object image IIN changes in a sine wave pattern as shown in FIG. 24. For example, a distance measurement device 1502 radiates infrared light or an ultrasonic wave and measures the amount of time until they come back to the distance measurement device 1502 after being reflected on the object, thus measuring the distance from the distance measurement device 1502 to the object. The surface normal vector N at the point of interest P can be obtained if it is possible to measure the distance of three points surrounding the point of interest P as described above with reference to FIG. 18.

With the above configuration, the video camera 1500 can obtain the light source vector L, the object image IIN and the surface normal vector N, and it is possible with the image processing device 100 provided therein to calculate the high-resolution image IOUT and output the high-resolution image IOUT from an external output 1503. For example, where the imaging device of the object imaging device OBJS has 320×240 pixels, and the image processing device 100 performs an enlargement process by a factor of 4 vertically and horizontally, the number of pixels of the high-resolution image IOUT is 1280×960. Then, if the external output 1503 is connected to a high-definition television, videos taken by a video camera with a small number of pixels can be viewed on a household high-definition television. With the size of the imaging device being fixed, the smaller the number of pixels is, the greater amount of light each pixel receives, thus reducing the influence of noise. Moreover, since the shutter speed can be increased, it is possible to capture a quickly-moving object and to suppress the image quality deterioration due to camera shake.

A video camera 1600 of FIG. 38(b) has the same configuration as that of the video camera 1500 of FIG. 38(a), except for the absence of the image processing device 100. An external output 1601 outputs the light source vector L, the object image IIN and the surface normal vector N, and an image enlargement is performed on the image processing device 100 provided in a high-definition television, a personal computer having the configuration of FIG. 34 or a server-client system having the configuration of FIG. 35, for example.

The present invention is not limited to the configuration of FIG. 38, but may employ various other configurations. For example, where the video camera does not have the distance measurement device 1502, the image processing device 200 of FIG. 26 or the image processing device 300 of FIG. 32 may be used.

As described above, the present invention can be carried out with widespread personal computers, server-client systems, or video devices in general, such as camera-equipped mobile telephones, digital still cameras, video movie cameras, and television sets.

Industrial Applicability

The image processing device of the present invention realizes an image enlargement even if parameters of the low-resolution image cannot be measured because the measurement equipment cannot be used under ideal conditions due to limitations of the size and weight of the device, the power consumption, the price, etc., and can advantageously widen the applicability in terms of the applicable environments, device configurations, etc. Thus, the present invention can be used in making a digital archive of precious cultural and historical heritages, for which image-capturing under sufficient conditions is difficult. Then, it is possible to perform image-capturing and measurements without damaging the object. Digital archives of precious cultural and historical heritages can be freely observed in detail with an image processing device, and are useful in various researches and viewing. If it is provided in a video camera, it is possible to film sport and entertainment events at ease, which are difficult to film under sufficient conditions, and it is possible to view or edit the video at an arbitrary factor of magnification. If it is provided in a surveillance camera, it is possible to capture important objects without missing the objects with a wide angle of view, and it is possible to record detailed image information by zooming.

The invention claimed is:

1. An image processing method for increasing a resolution of an image of an object, comprising:
a first step of estimating illumination equation parameters of the object, the illumination equation parameters including illuminance at a point of interest, specular reflection component ratio, object surface roughness and refractive index;
a second step of performing a resolution-increasing process on the estimated illumination equation parameters; and
a third step of synthesizing together the resolution-increased illumination equation parameters to produce a high-resolution image,
wherein if there exists a pixel for which an estimation precision of the illumination equation parameters estimated in the first step does not satisfy a predetermined precision, the illumination equation parameters are estimated again while feeding back the resolution-increased illumination equation parameters obtained in the second step.

2. An image processing device for increasing a resolution of an image of an object, comprising:
a low-resolution illumination equation parameter estimating section for estimating illumination equation parameters of the object and determining an estimation precision thereof to distinguish between a qualified pixel that satisfies a predetermined precision and an unqualified pixel that does not satisfy the predetermined precision;
an illumination equation parameter resolution increasing section for performing a resolution-increasing process on the illumination equation parameters estimated by the low-resolution illumination equation parameter estimating section;
a high-resolution illumination equation parameter estimating section for estimating a resolution-increased illumination equation parameter of the unqualified pixel by using a resolution-increased illumination equation parameter of the qualified pixel output from the illumination equation parameter resolution increasing section; and
a resolution decreasing section for, if there exists an unqualified pixel in an output of the high-resolution illumination equation parameter estimating section, decreasing a resolution of the resolution-increased illumination equation parameter of the qualified pixel and the output of the high-resolution illumination equation parameter estimating section and feeding the decreased parameters back to the low-resolution illumination equation parameter estimating section.

3. An image processing method for increasing a resolution of an image of an object, comprising:
a first step of separating a specular reflection image and a diffuse reflection image from a plurality of object images obtained by imaging the object via a polarizing filter while illuminating the object by a light source via a polarizing filter;
a second step of estimating illumination equation parameters by using the specular reflection image and the diffuse reflection image obtained in the first step;
a third step of performing a resolution-increasing process on a group of low-resolution parameters including the illumination equation parameters estimated in the second step to obtain a group of high-resolution parameters, and performing a database-based super-resolution process on a surface normal vector and a diffuse reflection component bidirectional reflectance of the object among the group of low-resolution parameters;
a fourth step of, if an unqualified pixel does not exist in the group of high-resolution parameters obtained in the third step, synthesizing together the group of high-resolution parameters into a luminance image and outputting the luminance image as a high-resolution image;
a fifth step of, if an unqualified pixel exists in the group of high-resolution parameters obtained in the third step, estimating the unqualified pixel in the group of high-resolution parameters; and
a sixth step of, if an unqualified pixel still exists in the group of high-resolution parameters obtained in the fifth step, performing a resolution-decreasing process on the group of high-resolution parameters and performing the second step again by using the obtained group of low-resolution parameters as qualified pixels.

4. An image processing program for instructing a computer to perform an image processing method for increasing a resolution of an image of an object, the program instructing the computer to perform:
a first step of separating a specular reflection image and a diffuse reflection image from a plurality of object images obtained by imaging the object via a polarizing filter while illuminating the object by a light source via a polarizing filter;
a second step of estimating illumination equation parameters by using the specular reflection image and the diffuse reflection image obtained in the first step;
a third step of performing a resolution-increasing process on a group of low-resolution parameters including the illumination equation parameters estimated in the second step to obtain a group of high-resolution parameters, and performing a database-based super-resolution process on a surface normal vector and a diffuse reflection component bidirectional reflectance of the object among the group of low-resolution parameters;
a fourth step of, if an unqualified pixel does not exist in the group of high-resolution parameters obtained in the third step, synthesizing together the group of high-resolution parameters into a luminance image and outputting the luminance image as a high-resolution image;
a fifth step of, if an unqualified pixel exists in the group of high-resolution parameters obtained in the third step, estimating the unqualified pixel in the group of high-resolution parameters; and
a sixth step of, if an unqualified pixel still exists in the group of high-resolution parameters obtained in the fifth step, performing a resolution-decreasing process on the group of high-resolution parameters and performing the second step again by using the obtained group of low-resolution parameters as qualified pixels.

* * * * *